(12) United States Patent
Lim et al.

(10) Patent No.: US 11,175,676 B2
(45) Date of Patent: Nov. 16, 2021

(54) MOBILE ROBOT AND METHOD OF CONTROLLING THE SAME

(71) Applicant: LG ELECTRONICS INC., Seoul (KR)

(72) Inventors: Seungwook Lim, Seoul (KR); Taekyeong Lee, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 382 days.

(21) Appl. No.: 16/343,599

(22) PCT Filed: Oct. 20, 2017

(86) PCT No.: PCT/KR2017/011699
§ 371 (c)(1),
(2) Date: Apr. 19, 2019

(87) PCT Pub. No.: WO2018/074904
PCT Pub. Date: Apr. 26, 2018

(65) Prior Publication Data
US 2020/0050213 A1 Feb. 13, 2020

(30) Foreign Application Priority Data
Oct. 20, 2016 (KR) .................. 10-2016-0136521

(51) Int. Cl.
*G05D 1/00* (2006.01)
*G05D 1/02* (2020.01)
(Continued)

(52) U.S. Cl.
CPC ............ *G05D 1/0251* (2013.01); *B25J 5/007* (2013.01); *B25J 13/089* (2013.01); *B25J 19/023* (2013.01);
(Continued)

(58) Field of Classification Search
CPC .. G05D 1/0251; G05D 1/0221; G05D 1/0274; G05D 2201/0203; G05D 1/0246;
(Continued)

(56) References Cited

U.S. PATENT DOCUMENTS

2009/0210092 A1* 8/2009 Park .................... B25J 5/00
700/259

FOREIGN PATENT DOCUMENTS

| KR | 10-2009-0088516 | 8/2009 |
| KR | 10-2010-0045585 | 5/2010 |

(Continued)

OTHER PUBLICATIONS

International Search Report dated Feb. 21, 2018 issued in Application No. PCT/KR2017/011699.

*Primary Examiner* — Ian Jen
(74) *Attorney, Agent, or Firm* — Ked & Associates, LLP

(57) ABSTRACT

A method of controlling a mobile robot includes a learning initial operation of acquiring images for respective points, generating descriptors that respectively correspond to a plurality of feature points extracted from the images, and generating nodes that correspond to the images acquired at the respective points, a label generation operation of generating a label descriptor based on the plurality of descriptors, a localization initial operation of acquiring a localization image when a jumping case occurs, and generating respective localization descriptors corresponding to a plurality of localization feature points extracted from the localization image, a comparison target selection operation of matching the label descriptor to each of the localization descriptors and selecting one or more comparison target nodes corresponding to the matched label descriptor, and a
(Continued)

last node selection operation of selecting a node estimated as the current position among the one or more comparison target node.

24 Claims, 30 Drawing Sheets

(51) Int. Cl.
    *G06T 7/73*         (2017.01)
    *B25J 5/00*         (2006.01)
    *B25J 13/08*       (2006.01)
    *B25J 19/02*       (2006.01)

(52) U.S. Cl.
    CPC ......... *G05D 1/0221* (2013.01); *G05D 1/0274* (2013.01); *G06T 7/74* (2017.01); *G06T 2207/10021* (2013.01); *G06T 2207/30252* (2013.01)

(58) Field of Classification Search
    CPC ............. G06T 7/74; G06T 2207/10021; G06T 2207/30252; B25J 5/007; B25J 13/089; B25J 19/023; B25J 9/00; B25J 11/00; B25J 19/02; B25J 9/0003; B25J 9/162; B25J 9/1664; B25J 11/0085; A47L 9/28; A47L 9/0477; A47L 9/0488; A47L 9/0411; A47L 2201/022; A47L 2201/14; A47L 9/2852; G06K 9/6272; G06K 9/00201; G06K 9/6219; G06K 9/6282; G06K 9/00664; G01C 21/206
    See application file for complete search history.

(56) References Cited

FOREIGN PATENT DOCUMENTS

| | | |
|---|---|---|
| KR | 10-2010-0104581 | 9/2010 |
| KR | 10-2011-0011424 | 2/2011 |
| KR | 10-1460313 | 11/2014 |

\* cited by examiner

FIG. 14
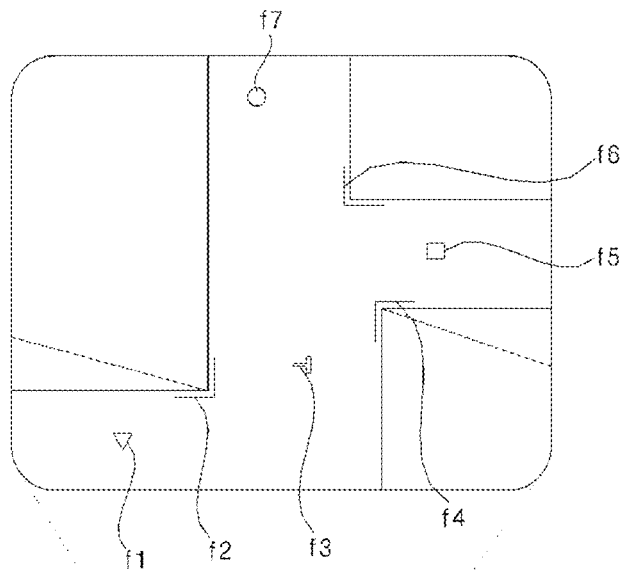
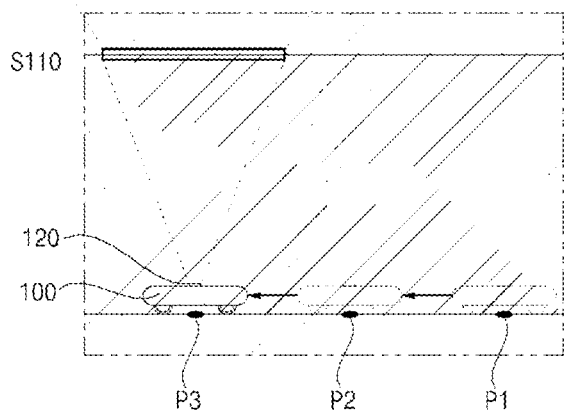
| FEATURE POINT | S120 | DESCRIPTOR |
|---|---|---|
| f1 | ⟶ | $\vec{F1}\{f1(1), f1(2), f1(3), \cdots f1(n)\}$ |
| f2 | ⟶ | $\vec{F2}\{f2(1), f2(2), f2(3), \cdots f2(n)\}$ |
| f3 | ⟶ | $\vec{F3}\{f3(1), f3(2), f3(3), \cdots f3(n)\}$ |
| ⋮ | ⋮ | ⋮ |
| fm | ⟶ | $\vec{Fm}\{fm(1), fm(2), fm(3), \cdots fm(n)\}$ |

S140'

FIG. 25
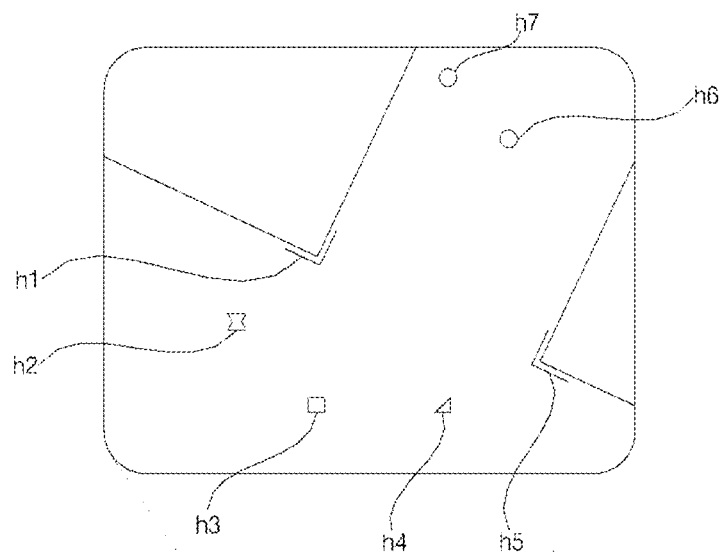
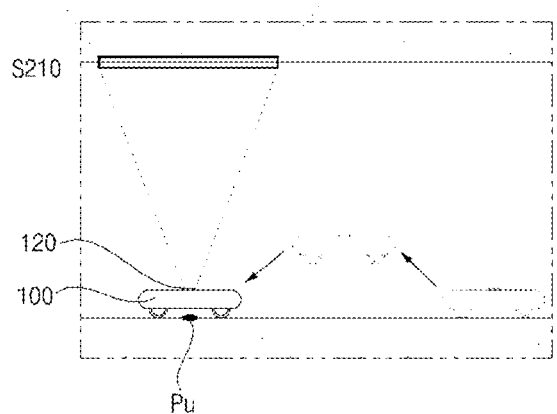
| LOCALIZATION FEATURE POINT | S220 | SECOND PREDETERMINED LABEL RULE |
|---|---|---|
| h1 | → | $\vec{H1}\{h1(1), h1(2), h1(3), \cdots \cdot h1(n)\}$ |
| h2 | → | $\vec{H2}\{h2(1), h2(2), h2(3), \cdots \cdot h2(n)\}$ |
| h3 | → | $\vec{H3}\{h3(1), h3(2), h3(3), \cdots \cdot h3(n)\}$ |
| h4 | → | $\vec{H4}\{h4(1), h4(2), h4(3), \cdots \cdot h4(n)\}$ |
| h5 | → | $\vec{H5}\{h5(1), h5(2), h5(3), \cdots \cdot h5(n)\}$ |
| h6 | → | $\vec{H6}\{h6(1), h6(2), h6(3), \cdots \cdot h6(n)\}$ |
| h7 | → | $\vec{H7}\{h7(1), h7(2), h7(3), \cdots \cdot h7(n)\}$ |

MOBILE ROBOT AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2017/011699, filed Oct. 20, 2017, which claims priority to Korean Patent Application No. 10-2016-0136521, filed Oct. 20, 2016, whose entire disclosures are hereby incorporated by reference.

BACKGROUND OF THE INVENTION

1. Field of the Invention

The present invention relates to a mobile robot and a method of controlling the same, and more particularly, to technology in which a mobile robot learns a map or localizes a position on the map.

2. Description of the Related Art

Robots have been developed for industrial use to manage some parts of factory automation. Recently, application fields of robots have been further expanded to develop medical robots, aerospace robots, etc. and to manufacture robots used in a general home for domestic use. Among such robots, an autonomous mobile robot is referred to as a mobile robot. A representative example of a mobile robot used in a home is a robot cleaner.

There is a method of detecting an infrared (IR) signal transmitted from a desired destination such as a charging stand in order to accurately move the mobile robot to the destination. However, this enables the mobile robot to move only to a limited destination that transmits an IR signal or the like and does not enable the mobile robot to move to any destination and, thus, when the mobile robot is not capable of detecting a transmitted IR signal for the reason such as a distance or an obstacle, there is a problem in that the mobile robot wanders looking for a destination.

Thus, in order to move to any place in a driving area, a current position of a mobile robot on a map needs to be localized.

To this end, conventionally, there are various well known methods of continuously localizing a current position of a mobile robot based on driving information (information on a moving direction and moving speed, information on comparison of continuously captured floor images, or the like) at a position just before the current position of the mobile robot during continuous movement of the mobile robot. In addition, various methods whereby a mobile robot autonomously learns a map have been well known.

However, when a position of a driving mobile robot is forcibly changed for the external reason, the mobile robot is not capable of localizing an unknown current position based on driving information at a position just before the current position. An example of this case is a kidnapping case in which a user lifts and moves a driving mobile robot.

A jumping case as well as the kidnapping case also has the above problem even if the mobile robot uses the IR signal transmitted from a specific point in order to localize a current position on a map. In addition, a method using a laser sensor or an ultrasonic sensor may be used to localize a current position in the jumping case, but there is a limit in that the cost thereof is largely increased and it is not possible to acquire detailed information on a surrounding environment.

Accordingly, the related art (Korean Patent Publication No. 10-2010-0104581) discloses technology of localizing an unknown current position using an image that is captured at a current position through a camera.

In the above related art, a 3D map is generated from feature points extracted from an image captured in a driving area, and three or more pairs of features points that are matched with feature points in the 3D map among feature points in an image captured at an unknown current position. Then, distances from three or more matched features points are computed using 2D coordinate of the three or more matched features points in the image captured at the current position, 3D coordinates of the three or more matched features points on the 3D map, and focal distance information of a camera at the current position, and the current position is localized from the computed distances, the technology of which is disclosed in the related art.

The above related art discloses technology of re-acquiring an image while rotating a camera in a horizontal direction at the current position when three or more features points matched with features points on the 3D map are not detected in the image captured at the current position.

CITED REFERENCE

Patent Document

Korean Patent Publication No. 10-2010-0104581 (published on Sep. 29, 2010)

DISCLOSURE

Technical Problem

A first object proposes effective and accurate localization technology in a global zone.

In the above related art, a considerably long time is taken to match three or more features points acquired at an unknown current position with three or more feature points on a pre-stored 3D map and, in particular, when there is a large amount of feature point information on a 3D map due to a wide global zone, there is a problem in that an excessively long time is taken to match a pair of feature points. A second object is to minimize a time taken to compare a feature point acquired from a current image with data on the map.

In the above related art, a feature point acquired at an unknown current position is matched with a feature point in a feature point cluster (dense feature points configuring a group) on the 3D map and, in this case, even if the acquired feature point needs to be actually matched with feature point present other than the feature point cluster, this may be disregard and, thus, there is a problem in terms of degraded accuracy in estimation of a position. A third object is to propose technology of minimizing time consumption while using all feature point data (descriptors) on a map.

In the above related art, a distance between a camera and three or more features points acquired from a current image need to be computed, and the distance with the feature point may be computed based on a focal point of the camera and a 2D coordinate value of a feature point in the current image. However, camera focal distance information is inaccurate for the reason such as surrounding brightness and, when three or more feature points in an image are not disposed on a plan perpendicular to a photograph direction of the camera and are disposed on an inclined plane for the reason such as a slope or a protrusion surface, a distance between the feature point and the camera, which is computed based on the 2D coordinate value, may be largely different from an actual distance and, thus, there is a problem in that estimation accuracy is degraded. A fourth object is to propose technology of localizing a current position without focal distance information of the camera and a 2D coordinate value of a feature point of an image.

In the above related art, a map needs to be generated in 3D and, thus, there is a problem in that storage with high capacity is required to store the map. A fifth object is to propose technology of localizing a current position using only a 2D map.

Among descriptors generated to correspond to a feature point, there are descriptors with weak scarcity whereby the number of similar descriptors is relatively great and descriptors with strong scarcity whereby the number of similar descriptors is relatively low. However, conventionally, scarcity between such descriptors is not considered and, thus, there is a problem in terms of degraded estimation accuracy. A sixth object is to propose technology of localizing a position in consideration of a scarcity degree of feature points.

According to a seventh object, in order to achieve the first to sixth objects, a driving area may be divided into a plurality of local zones, and a local label descriptor of the divided local zone may be first generated, thereby further enhancing the efficiency of a learning operation. Furthermore, technology of first determining one local zone to which a current position of a plurality of local zones belongs may further enhance accuracy of estimation of a local zone to which the current position belongs.

However, objects to be accomplished by the invention are not limited to the above-mentioned objects, and other objects not mentioned will be clearly understood by those skilled in the art from the following description.

Technical Solution

To achieve the first to seventh objects, the present invention proposes technology of generating a descriptor based on features points in a driving area, generating a label descriptor based on descriptors, and effectively and rapidly localizing a current position even in a state in which a large amount of learning data is stored.

To achieve the first to seventh objects, the present invention proposes technology of selecting comparison target nodes among nodes on a map and selecting a last node through a comparison operation with comparison target nodes to select a last node.

To achieve the first to sixth objects, a method of controlling a mobile robot according to the present invention may include a learning initial operation of acquiring images for respective points, generating descriptors that respectively correspond to a plurality of feature points extracted from the images, and generating nodes that correspond to the images acquired at the respective points. The control method may include a label generation operation of generating a label descriptor based on the plurality of descriptors. The control method may include a localization initial operation of acquiring a localization image when a jumping case occurs, and generating respective localization descriptors corresponding to a plurality of localization feature points extracted from the localization image. The control method may include a comparison target selection operation of matching the label descriptor to each of the localization descriptors and selecting one or more comparison target nodes corresponding to the matched label descriptor. The control method may include a last node selection operation of selecting a node estimated as the current position among the one or more comparison target nodes.

The label generation operation may be performed when a predetermined reference is satisfied while the learning initial operation is performed In order to provide a control method of effectively and fairly determining whether a current target is a comparison target, technologies of a predetermined classification rule, a predetermined label rule, and a matching operation may be provided.

To achieve the seventh object, the control method may include a local zone classification operation of classifying the plurality of nodes as a local zone according to a predetermined reference prior to the label generation operation. The label generation operation may include a first label generation operation of classifying a plurality of descriptors in a local zone as a plurality of groups, for each local zone, and generating a local label descriptor representing descriptors classified as the same group. The label generation operation may include a second label generation operation of classifying local label descriptors that are respectively generated in the plurality of local zones, and generating a great-local label descriptor or a global label descriptor representing local label descriptors classified as the same group.

When at least one local zone is classified in the local zone classification operation while the learning initial operation is performed, the first label generation operation of generating the local label descriptor of the classified local zone may be performed.

The control method may include a local zone classification operation of classifying the plurality of nodes as a local zone according to a predetermined reference. The label generation operation may include a local zone label generation operation of classifying a plurality of descriptors in a local zone as a plurality of groups according to a first predetermined classification rule for each local zone, and generating a local label descriptor based on the descriptors classified as the same group according to a first predetermined label rule, and a global label generation operation of classifying a plurality of local label descriptors in a global zone as a plurality of groups according to a second predetermined classification rule and generating a global label descriptor based on local label descriptors classified as the same group according to a second predetermined label rule.

In order to further enhance the reliability of a localization operation, technology of selecting a node estimated as a current position based on many localization images may be provided. To this end, the localization initial operation may include acquiring primary to pth localization images while the mobile robot changes a point or a photograph angle and generating primary to pth localization descriptors based on the primary to pth localization images. In addition, the last node selection operation may include computing pth cumulative similarity for each comparison target node and selecting a node estimated as the current position.

A program for executing the control method may be embodied, and a computer readable recording medium having the program recorded thereon may be embodied.

A program for executing various rules or computation or a computer readable recording medium having the program recorded thereon may be embodied.

To achieve these objects, a mobile robot according to the present invention may include a driving unit configured to move a main body, an image acquisition unit configured to acquire an image around the main body, and a controller configured to perform control to acquire images for respective points while driving, to generate descriptors that respectively correspond to a plurality of feature points extracted from the images, to generate nodes that correspond to the images acquired at the respective points, to be preset to classify the plurality of nodes as a local zone according to a predetermined reference, to be preset to classify a plurality of descriptors in a local zone for each local zone as a plurality of groups and to generate a local label descriptor representing descriptors classified as the same group, and to be preset to classify local label descriptors that are respectively generated in the plurality of local zones, as a plurality of groups and to generate a global label descriptor representing local label descriptors classified as the same group.

The controller may be i. preset to start generation of the global label descriptor after all nodes in the global zone are generated when a jumping case does not occur until all nodes in the global zone are generated, and ii. may be preset to start generating of the global label descriptor after the jumping case occurs based on a plurality of nodes generated up to a time point when the jumping case occurs when the jumping case occurs before all nodes in the global zone are generated. iii. The controller may be preset to select a node estimated as a current position based on the acquired localization image and the global label descriptor when the jumping case occurs.

Advantageous Effects

Based on the technical solution, a current position on a map may be localized even in a jumping case of a mobile robot. In detail, even in a kidnapping case, global kidnapping recovery may be possible.

When a mobile robot is positioned at a position on a pre-stored map during a driving case that is not a jumping case, newly acquired image information may be compared with pre-stored image information to more accurately update the map.

Even if there is no transmission signal in a desired destination, the mobile robot may be moved to the corresponding destination using the map.

A small number of comparison target nodes may be first selected among a plurality of nodes in a global zone and the current position in the comparison target nodes may be estimated and, thus, a time period taken compare image information of the current position with pre-stored feature point data may be remarkably reduced. Simultaneously, all feature point data on the map may be used without being omitted, thereby accurately estimating a position.

Descriptors may be classified and labeled to generate a label descriptor and, thus, the amount of data to be stored may be reduced to a predetermined level or less and a time period taken for a comparison operation for localization may be reduced.

A global zone may be classified as a plurality of local zones to generate a local label descriptor based on the feature point data (descriptor) in the local zone and, thus, a time period taken to classify and label descriptors may be remarkably reduced.

When all descriptors in one specific local zone are acquired, a local label descriptor of the specific local zone may also be generated during driving and, thus, a time point at which a map learning operation including classification and labeling operations of descriptors may be advanced.

Even if a jumping case occurs before whole global zone is learned during a learning (mapping) operation, when a local label descriptor of the specific local zone is already generated, the local label descriptor generated in the localization operation may be used.

When the local label descriptor is generated to estimate an unknown current position based thereon, there is a problem in terms of an unfair factor when similarity between two comparison target nodes Nx and Ny belonging to different local zone is determined. For example, when two descriptors a and b are spaced apart from each other by a specific distance, the descriptors a and b are classified as the same group to generate one local label descriptor in a local zone Ax but are classified as different groups and are used as different local label descriptors in another local zone Ay. In this case, when a descriptor c that is closer to the descriptor a and is not closer to the descriptor b is acquired from an image acquired at the current position, it may be determined that the number of descriptors a and b similar to the descriptor c is much greater in the comparison target node Nx in the local zone Ax, and the number of descriptors a similar to the descriptor c is much low in the comparison target node (Ny) in the local zone (Ay) and, thus, there is a problem in terms of an unfair factor when similarity between two comparison target nodes Nx and. Local label descriptors generated for respective plural local zones may be classified and labeled to generate a global label descriptor and, thus, the unfair factor may be overcome while achieving the effect obtained using the local label descriptor. In addition, even if a jumping case occurs before a global zone is entirely learned during a learning (mapping) operation, global label descriptors may be generated based on nodes generated up to a time point when a jumping case occurs and, thus, the unfair problem may be still overcome.

The present technology may be embodied using only a ceiling image and, thus, an apparatus may be remarkably and simply embodied.

A current position may be localized without camera focal distance information and 2D coordinates of a feature point in an image and, thus, the accuracy of estimation of the current position may be enhanced while simplifying embodying the technology.

The present technology may be embodied using only a 2D map and, thus, a memory may be effectively used.

In consideration of scarcity of feature points, weights may be changed for respective feature points during position estimation and, thus, it may be more accurately estimate a position.

In addition, a plurality of acquisition images may be used even in a jumping case may be used and, thus, a possibility of errors of localization may be reduced and a position may be estimated with a predetermined reliable level or more.

BRIEF DESCRIPTION OF THE DRAWINGS

FIG. 8 illustrates learning operation S100 and

FIG. 9 illustrates localization operation S200 on a map learned in learning operation S100.

FIG. 10 illustrates learning operation S100' and

FIG. 11 illustrates localization operation S200' on a map learned in learning operation S100'.

FIG. 12 illustrates learning operation S100" and

FIG. 13 illustrates localization operation S200" on a map learned in learning operation S100".

FIG. 14 is a diagram of a concept of an example of driving and image acquisition operation S110 and descriptor generation operation S120 of FIGS. 8, 10, and 12. FIG. 14 illustrates images acquired in operation S110 and a plurality of feature points f1, f2, f3, f4, f5, f6, and f7 in the image and illustrates generation of descriptors $\vec{F1}, \vec{F2}, \vec{F3}, \ldots, \vec{Fm}$ that is an n-dimensional vector corresponding to a plurality of feature points f1, f2, f3, . . . ,fm in operation S120.

FIG. 20 illustrates a relationship between a plurality of local zones A1, A2, A3, A4, and A5 included in a global zone X on a map and a global zone, and a plurality of nodes N1, N2, N3, . . . included in each local zone.

FIG. 21 illustrates classification of a plurality of descriptors $\vec{F1}, \vec{F2}, \vec{F3}, \ldots, \vec{Fa}, \vec{Fb}, \vec{Fc}$ into a plurality of groups A1G1, A1G2, A1G3, . . . , A1Gl from images corresponding to nodes N1, N2, . . . ,N30 belonging to one local zone A1 according to a first predetermined classification rule. FIG. 21 is a diagram showing generation of local label descriptors $\overrightarrow{A1F1}, \overrightarrow{A1F2}, \overrightarrow{A1F3}, \ldots, \overrightarrow{A1Fl}$ from descriptors classified as the same group according to a first predetermined label rule.

FIG. 22 illustrates classification of a plurality of label descriptors $\overrightarrow{A1F1}, \overrightarrow{A1F2}, \overrightarrow{A1F3}, \ldots, \overrightarrow{A1Fl}$ generated in the plurality of local zones A1, A2, A3, A4, and A5 as a plurality of groups XG1, XG2, XG3, . . . , XGk according to a second predetermined classification rule. FIG. 22 illustrates generation of global label descriptors $\overrightarrow{XF1}, \overrightarrow{XF2}, \overrightarrow{XF3}, \ldots, \overrightarrow{XFk}$ from local label descriptors classified as the same group according to a second predetermined label rule.

FIG. 25 is a diagram of a concept showing an example of operation S210 of acquiring the localization image and generation operation S220 of the localization descriptor of FIGS. 9, 11, and 13. FIG. 25 illustrates an image acquired in operation S210 and a plurality of localization feature points h1, h2, h3, h4, h5, h6, and h7 in the image and illustrates generation of localization descriptors $(\vec{H1}, \vec{H2}, \vec{H3}, \vec{H4}, \vec{H5}, \vec{H6}, \vec{H7})$ as an n-dimensional vector corresponding to each of a plurality of localization feature points h1, h2, h3, h4, h5, h6, and h7 in operation S220.

FIG. 26 illustrates matching global label descriptors $\overrightarrow{XF1}, \overrightarrow{XF3}, \overrightarrow{XF5}, \overrightarrow{XF32}$ with the localization descriptors $(\vec{H1}, \vec{H2}, \vec{H3}, \vec{H4}, \vec{H5}, \vec{H6}, \vec{H7})$ and illustrates groups XG1, XG2, XG5, and XG32 to which the matched global label descriptors $\overrightarrow{XF1}, \overrightarrow{XF3}, \overrightarrow{XF5}, \overrightarrow{XF32}$ belong among a plurality of global label descriptors.

FIG. 27 illustrates selection of comparison target nodes N1, N14, N15, N38, N45, N62, N63, and N64 that respectively correspond to images based to generate the matched global label descriptors $\overrightarrow{XF1}, \overrightarrow{XF3}, \overrightarrow{XF5}, \overrightarrow{XF32}$ and shows the comparison target nodes N1, N14, N15, N38, N45, N62, N63, and N64 selected among a plurality of nodes.

In FIG. 28 shows a histogram indicating localization image feature distribution and image feature distribution corresponding to each comparison target node. In the histogram of the localization image feature distribution of FIG. 28, a plurality of localization descriptors in a localization image are substituted with global label descriptors $\overrightarrow{XF1}, \overrightarrow{XF3}, \overrightarrow{XF5}, \overrightarrow{XF32}$ corresponding to respective localization descriptors. In the histogram of the image feature distribution corresponding to each comparison target node of FIG. 28, a descriptor in an image is substituted with global label descriptors $\overrightarrow{XF1}$, $\overrightarrow{XF3}$, $\overrightarrow{XF5}$, $\overrightarrow{XF32}$ corresponding to respective descriptors.

FIG. 30 illustrates an mth image acquired at a time point tm and a plurality of mth localization feature points h1$tm$, h2$tm$, h3$tm$, h4$tm$, h5$tm$, h6$tm$, and h7$tm$ in the mth image in operation S310 and illustrates generation of mth localization descriptors $\overrightarrow{H1Tm}$, $\overrightarrow{H2Tm}$, $\overrightarrow{H3Tm}$, $\overrightarrow{H3Tm}$, H4Tm, H5Tm, H6Tm, H7Tm that is an n-dimensional vector corresponding to a plurality of mth localization feature points h1$tm$, h2$tm$, h3$tm$, h4$tm$, h5$tm$, h6$tm$, and h7$tm$ in operation S320.

FIG. 31 shows an embodiment in which cumulative similarity (SI) for each of comparison target nodes Na, Nb, Nc, . . . , Nx is increased along with an increase in an order using a histogram in which a size of the cumulative similarity (SI) as a degree for each of the comparison target nodes Na, Nb, Nc, . . . , Nx.

FIG. 32 illustrates an algorithm of a start time point of operations S161 and S162 of generating a global label descriptor based on a time point in which jumping occurs.

FIG. 33 is a concept of a concept of an example of operations S150 and S172 of generating the local label descriptor and operation S162 of generating the global label descriptor when jumping occurs S50 during learning operation S100".

Figure 1:
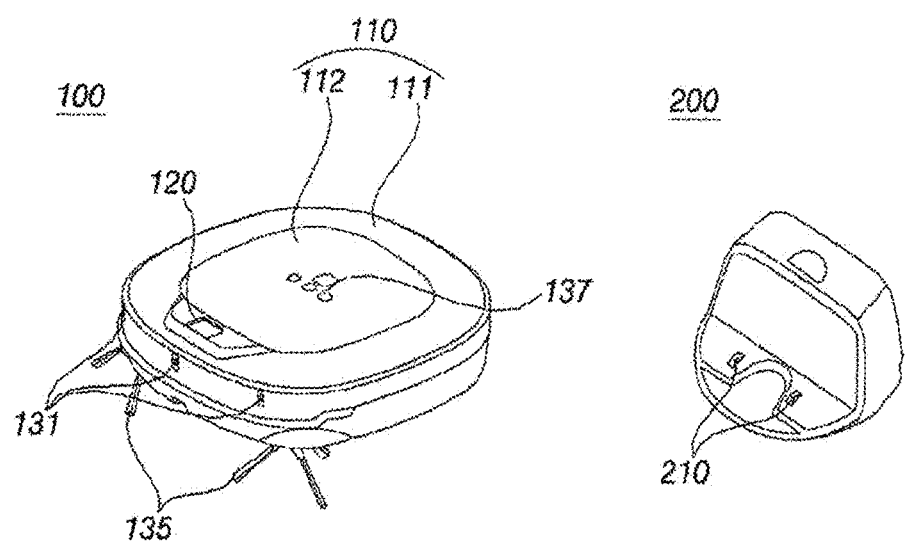
FIG. 1 is a perspective view of a mobile robot and a charging stand for charging the mobile robot according to an embodiment of the present invention.
Figure 2:
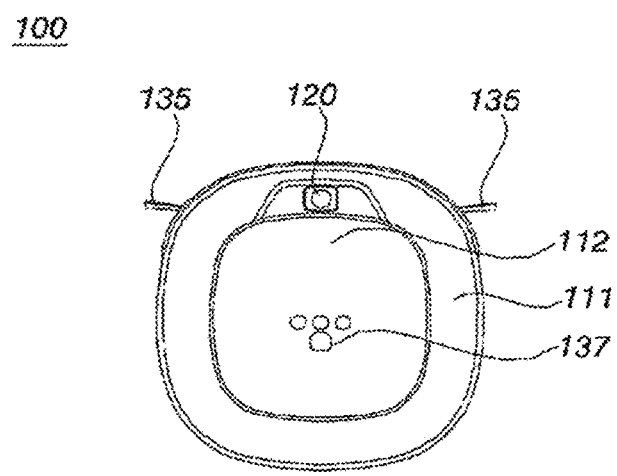
FIG. 2 illustrates a surface portion of the mobile robot shown in FIG. 1.
Figure 3:
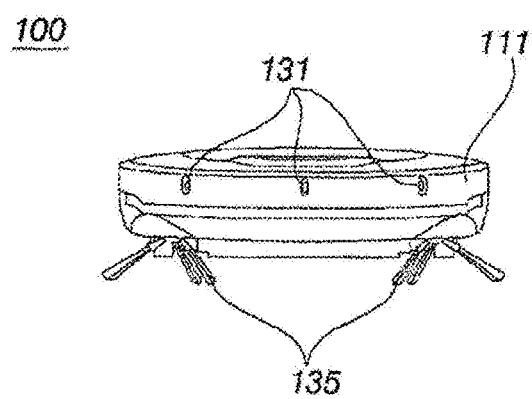
FIG. 3 illustrates a front surface portion of the mobile robot shown in FIG. 1.
Figure 4:
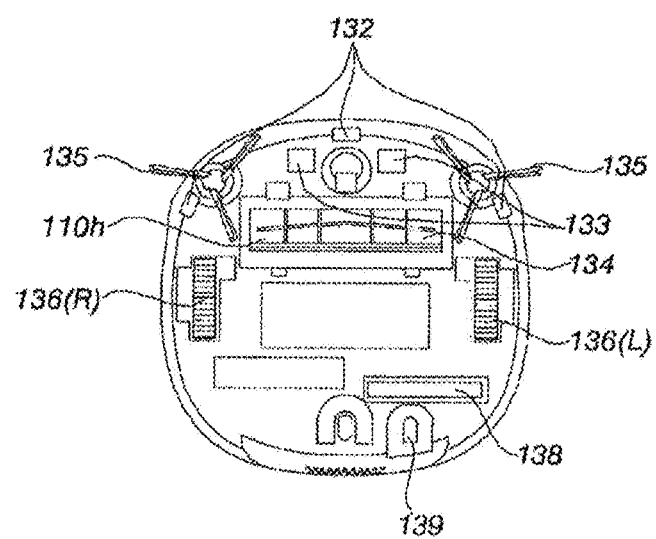
FIG. 4 illustrates a bottom surface portion of the mobile robot shown in FIG. 1.

To differentiate between embodiments of the present invention, comma (') or double comma (") are added in the end of reference numerals used in an embodiment to indicate a difference from another embodiment. In addition, throughout this specification, the same reference numerals are used for the same or extremely similar parts.

DETAILED DESCRIPTION OF THE PREFERRED EMBODIMENTS

Main terminologies used throughout this specification will now be described.

The term 'generate' means that data that is not pre-stored is newly created. The expression 'object B is generated based on object A' means that object B is generated as a result of information processing using object A as an input value.

The term 'represent' means that the characteristics of a group is indicated by one value.

The expression 'object A is compared with object B' mean that similarity between objects A and B is determined via already known art or technology according to an embodiment of the present invention disclosed in the specification.

The term 'compute' mean that mathematical data is computed to generate data as a result value.

The term 'select' means that any one of a plurality of objects is determined.

When object B is determined for object A, the expression 'object B corresponds to object A' is used (e.g., images correspond to nodes, respectively). When object B corresponds to object A and object C corresponds to object B, the expression 'object C corresponds to object A' may be used.

When at least element of group B is determined for each element of group A, the expression 'group B corresponds to group A' may be used (e.g., a label descriptor group corresponds to a descriptor group.).

The term 'correspond' refers to at least one of univalent correspondence, one-to-many correspondence, or one-to-one correspondence. When one object B corresponds to object A, the expression 'object B corresponds to object A according to univalent correspondence' may be used. When only one element of group B corresponds to each element of group A, the expression 'group B corresponds to group A according to univalent correspondence' may be used. When a plurality of objects B corresponds to object A, the expression 'group B corresponds to group A according to one-to-many correspondence' may be used. When a plurality of elements of group B corresponds to at least one element of group A, the expression 'group B corresponds to group A according to one-to-many correspondence' may be used. When one object B corresponds to one object A, the expression 'group B corresponds to group A according to one-to-one correspondence' may be used. When the number of elements of group A is the same as that of group B and different elements of group B correspond to elements of group A, respectively, the expression 'group B corresponds to group A according to one-to-one correspondence' may be used. For example, when feature point B is extracted from one acquired image A and descriptor C is generated based on feature point B, image A corresponds to descriptor C according to univalent correspondence. For example, when one label descriptor C is generated based on a plurality of descriptors A and B that are classified to the same group according to a predetermined classification rule, the plurality of descriptors A and B corresponds to the label descriptor C according to one-to-many correspondence. For example, when the number of a plurality of nodes is the same as the number of a plurality of images and different images corresponds to nodes, respectively, the plurality of images corresponds to the plurality of nodes according to one-to-one correspondence.

When a relationship whereby object B corresponds to object A is generated, the expression 'object B is matched with object A' may be used. For example, a global label descriptor is matched with a localization descriptor.

The term 'map' refers to data obtained by storing predetermined information in a driving area of a mobile robot in a predetermined format.

The term 'jumping case' refers to a situation in which a mobile robot is moved in a state in which it is not possible to track a moving path on a map. In detail, the jumping case may occur when the mobile robot is moved in a state in which it is not possible to measure a driving displacement by a driving displacement measurement unit 165 that will be described below. An example of the jumping case includes a kidnapping case in which a user forcibly lift and moves a driving mobile robot or a situation in which a position of a mobile robot is forcibly moved in a state in which the mobile robot is powered off.

The 'learning operation' refers an operation of generating or updating a map using information acquired in a driving area.

The 'localization operation' refers to an operation of recognizing a current position of a mobile robot on a map in a broad sense, and refers to an operation of recognizing the current position of the mobile robot on the map when the jumping case occurs in a narrow sense.

The learning operation and the localization operation may be simultaneously performed during driving of a mobile robot, which may be referred to as simultaneous localization and mapping (SLAM).

The 'global zone X' refers to a whole driving area of a mobile robot on a map and, when the term 'global' is added to the head of a term, this means that the corresponding term is related to the whole driving area on the map. The global zone X may be changed (e.g., expand) according to additional driving experiences of the mobile robot or additional data input.

The 'local zone' refers to a partial area of the global zone according to a predetermined reference, and when the term 'local' is added to the head of a term, this means that the corresponding term is related to the partial area of the global zone.

The 'great-local zone' refers to an area obtained by grouping the plurality of local zones and, when the term 'great-local' is added to the head of a term, this means that the corresponding term is related to an area obtained by grouping the plurality of local zones.

The 'point' refers to one position in an actual driving area but not a map.

The 'node' refers to data indicating one position on a map, corresponding to the point.

The 'node information' refers to various data corresponding to the node. The map may include a plurality of nodes and node information corresponding thereto.

The 'image' refers an image acquired via photograph of a mobile robot 100. The 'localization image' refers to an image acquired at a current position in order to recognize the current position on a map.

The 'image corresponding to a node' refers to an image acquired at a point corresponding to a node.

The 'feature point' refers to a portion of an image as any one of various features of the image. The 'localization feature point' refers to a portion of a localization image as any one of various feature of the localization image.

The 'descriptor' refers to a predetermined format of data for indicating the feature point and refers to mathematical data with a format based on which a distance or similarity between descriptors is computable. For example, the descriptor may be n-dimensional vector (n being a natural number) or matrix format of data.

When a descriptor is indicated in the form of an n-dimensional vector, a 'distance' between two descriptors A and B may refer to a distance d between n-dimensional vectors and may be computed according to Equation 1 below (n being a natural number).

$$d = |\vec{A} - \vec{B}|$$ [Equation 1]

When a descriptor is indicated in the form of an n-dimensional vector, an 'average' $\vec{A}$ (n-dimensional vector) of x (x being a natural number) descriptors $\vec{A1}, \vec{A2}, \vec{A3}, \ldots, \vec{Ax}$ may be computed according to Equation 2 below. (x and n being a natural number)

$$\vec{A} = \frac{\vec{A1} + \vec{A2} + \vec{A3} + \ldots + \vec{Ax}}{x}$$ [Equation 2]

The 'localization descriptor' refers to a predetermined format of data for indicating the localization feature point and refers to the same format of data as that of the descriptor.

The 'label descriptor' refers to data representing at least one descriptor classified according to a predetermined rule and refers to the same format of data as the descriptor. The label descriptor is a concept that broadly includes a local label descriptor, a great-local label descriptor, and a global label descriptor, which will be described below.

The 'plurality of descriptors in a local zone' refers to a plurality of descriptors for respectively indicating all features points extracted from a plurality of images that correspond to a plurality of nodes included in one local zone, respectively.

The 'local label descriptor' refers to data representing at least one descriptor classified according to a predetermined rule among the plurality of descriptors in a local zone and refers to the same format of data as that of the descriptor.

The 'plurality of label descriptors in a local zone' refers to a plurality of label descriptors generated based on a plurality of descriptors in one local zone. The 'plurality of local label descriptors in a local zone' refers to a plurality of local label descriptors generated based on a plurality of descriptors in one local zone.

The 'plurality of label descriptors in a great-local zone' refers to a plurality of label descriptors generated based on a plurality of descriptors in a plurality of local zones included in one great-local zone. The 'plurality of local label descriptors in a great-local zone' refers to a plurality of local label descriptors generated based on a plurality of descriptors in a plurality of local zones included in one great-local zone.

The 'great-local label descriptor' refers to data representing at least one local label descriptor classified according to a predetermined rule among a plurality of local label descriptors in the great-local zone and refers to the same format of data as the descriptor. The 'plurality of great-local label descriptors in a great-local zone' refers to a plurality of great-local label descriptors generated based on a plurality of local label descriptors in one great-local zone.

The 'plurality of label descriptors in a global zone' refers to a plurality of label descriptors generated based on a plurality of descriptors in a plurality of local zones included in a global zone. The 'plurality of local label descriptors in a global zone' refers to a plurality of local label descriptors generated based on a plurality of descriptors in a plurality of local zones included in a global zone. The 'plurality of global label descriptors in a global zone' refers to a plurality of global label descriptors generated based on a plurality of local label descriptors in a global zone.

The 'global label descriptor' refers to data representing at least one local label descriptor classified according to a predetermined rule among a plurality of local label descriptors in the global zone and refers to the same format of data as that of the descriptor.

The 'plurality of descriptors in an image' refers to a plurality of descriptors for indicating a plurality of feature points extracted from one image. The 'plurality of label descriptors in an image' means that a plurality of descriptors in an image is substituted with a label descriptor corresponding to each descriptor. The 'plurality of localization descriptors in a localization image' refers to a plurality of localization descriptors for respectively indicating a plurality of localization feature points extracted from one localization image. The 'plurality of label descriptors in a localization image' means that a plurality of localization descriptors in a localization image is substituted with a label descriptor corresponding to each localization descriptor.

The 'image feature distribution' refers to data specified based on types of a plurality of label descriptor in one image and the number of label descriptors for each type (weight w). The 'localization image feature distribution' refers data specified based on types of a plurality of label descriptors in a localization image and the number of label descriptors for each type (localization weight w). The 'local feature distribution' refers to data specified based on types of a plurality of label descriptors in one local zones and the number of label descriptors for each type (weight w). The 'great-local feature distribution' refers to data specified based on types of a plurality of label descriptors in one great-local zone and the number of label descriptors for each type (weight w).

Here, the 'weight w' refers to the number of one or more descriptors represented by one type of label descriptor. The 'localization weight wh' refers to the number of one or more localization descriptors substituted with one type of label descriptor. For example, when a label descriptor A representing five descriptors is generated according to a predetermined label rule, a weight w of the label descriptor A may be 5. For example, when a local label descriptor A representing 7 descriptors is generated according to a first predetermined label rule, the weight w of the local label descriptor A may be 7. For example, when the local label descriptor A representing 5 descriptors and the local label descriptor B representing 7 descriptors are generated according to the first predetermined label rule and a global label descriptor C (or a great-local label descriptor C) representing the local label descriptor A or the local label descriptor B is generated according to a second predetermined label rule, the weight w of the global label descriptor C (or the great-local label descriptor C) may be 12. For example, when 9 localization descriptors among a plurality of localization descriptors in the localization image are substituted with the label descriptor A, the localization weight wh of the label descriptor A may be 9. In the specification, a histogram may be used to indicate a feature distribution, but it is not required that the present invention is limited thereto.

The 'image information' is a data of one image and is a concept that broadly includes an image itself, a plurality of feature points extracted from an image, a plurality of descriptors in an image, a plurality of label descriptors in an image, and image feature distribution. The 'localization image information' is data of one localization image and is a concept that broadly includes a localization image itself, a plurality of localization feature points extracted from a localization image, a plurality of localization descriptors in a localization image, a plurality of label descriptors in a localization image, and localization image feature distribution.

The mobile robot 100 according to the present invention may refer to a robot that autonomously moves using a wheel or the like and may include a home help robot, a robot cleaner, and the like. Hereinafter, with reference to FIGS. 1 to 4, a robot cleaner as the mobile robot 100 is exemplified, but it is not required that the present invention is limited thereto.

Referring to FIGS. 1 to 5, the mobile robot 100 may include a main body 110 and an image acquisition unit 120 for acquiring an image around the main body 110. Hereinafter, when portions of the main body 110 are defined, a portion of the main body 110, which are directed toward a ceiling of a driving area, may be defined as upper surface portion (refer to FIG. 2), a portion of the main body 110, which are directed toward a bottom of the driving area, may be defined as a bottom surface portion (refer to FIG. 4), and a portion of a circumference of the main body 110 between the upper surface portion and the bottom surface portion, which corresponds to a main driving direction, may be defined as a front surface portion (refer to FIG. 3).

The mobile robot 100 may include a driving unit 160 for moving the main body 110. The driving unit 160 may include at least one driving wheel 136 for moving the main body 110. The driving unit 160 may include a driving motor. The driving wheel 136 may be installed on the left and right of the main body 110 and, hereinafter, will be referred to as a left wheel 136(L) and a right wheel 136(R).

The left wheel 136(L) and the right wheel 136(R) may be driven by one driving motor but, as necessary, may include a left wheel driving motor for driving the left wheel 136(L) and a right wheel driving motor for driving the right wheel 136(R). A driving direction of the main body 110 may be changed to the left or to the right by forming a difference of rotation speed between the left wheel 136(L) and the right wheel 136(R).

An absorption inlet 110h for absorbing air may be formed in the bottom surface portion of the main body 110, and the main body 110 may include an absorption device (not shown) for providing absorption force to absorb air through the absorption inlet 110h, and a dust container (not shown) for collecting absorbed dust with air through the absorption inlet 110h.

The main body 110 may include a case 111 for forming a space for accommodating various components included in the mobile robot 100. An opening for insertion and separation of the dust container may be formed in the case 111, and a dust container cover 112 that opens and closes the opening may be rotatably installed on the case 111.

The main body 110 may include a main brush 134 with a roll type, which has brushes exposed through the absorption inlet 110h, and an auxiliary brush 135 that is positioned at a front side of the bottom surface portion of the main body 110 and has brushes including a plurality of wings that radially extends. Dusts may be removed from the floor in a cleaning area via rotation of the brushes 134 and 135, and dusts separated from the floor may be absorbed through the absorption inlet 110h and may be collected in the dust container.

A battery 138 may supply power required for an overall operation of the mobile robot 100 as well as the driving motor. When the battery 138 is discharged, the mobile robot 100 may drive to return to a charging stand 200 for charging, and during driving to return, the mobile robot 100 may autonomously detect a position of the charging stand 200.

The charging stand 200 may include a signal transmitter (not shown) for transmitting a predetermined return signal. The return signal may be an ultrasonic signal or an infrared (IR) signal, but is not limited thereto.

The mobile robot 100 may include a signal detector (not shown) for receiving the return signal. The charging stand 200 may transmit an IR signal through a signal transmitter, and the signal detector may include an IR sensor for detecting the IR signal. The mobile robot 100 may be moved to a position of the charging stand 200 and may be docked on the charging stand 200 according to the IR signal transmitted from the charging stand 200. Through such docking, charging may be performed between a charging terminal 133 of the mobile robot 100 and a charging terminal 210 of the charging stand 200.

The image acquisition unit 120 may photograph a cleaning area and may include a digital camera. The digital camera may include an image sensor (e.g., a CMOS image sensor) including at least one optical lens, and a plurality of photodiodes (e.g., pixels) on which an image is formed by light passing through the optical lens, and a digital signal processor (DSP) for configuring an image based on a signal output from the photodiodes. The DSP may generate a video image including frames including still images as well as a still image.

The image acquisition unit 120 may be installed on the upper surface portion of the main body 110 and may acquire an image of the ceiling in the cleaning area, but a position and a photograph range of the image acquisition unit 120 are not limited thereto. For example, the image acquisition unit 120 may be installed to acquire an image of a front side of the main body 110.

The mobile robot 100 may further include an obstacle detection sensor 131 for detecting a forward obstacle. The mobile robot 100 may further include a cliff detection sensor 132 for detecting whether a cliff is present on the floor in the cleaning area, and a lower camera sensor 139 for acquiring an image of the floor.

The mobile robot 100 may include a manipulation unit 137 for inputting On/Off or various commands.

Figure 5:
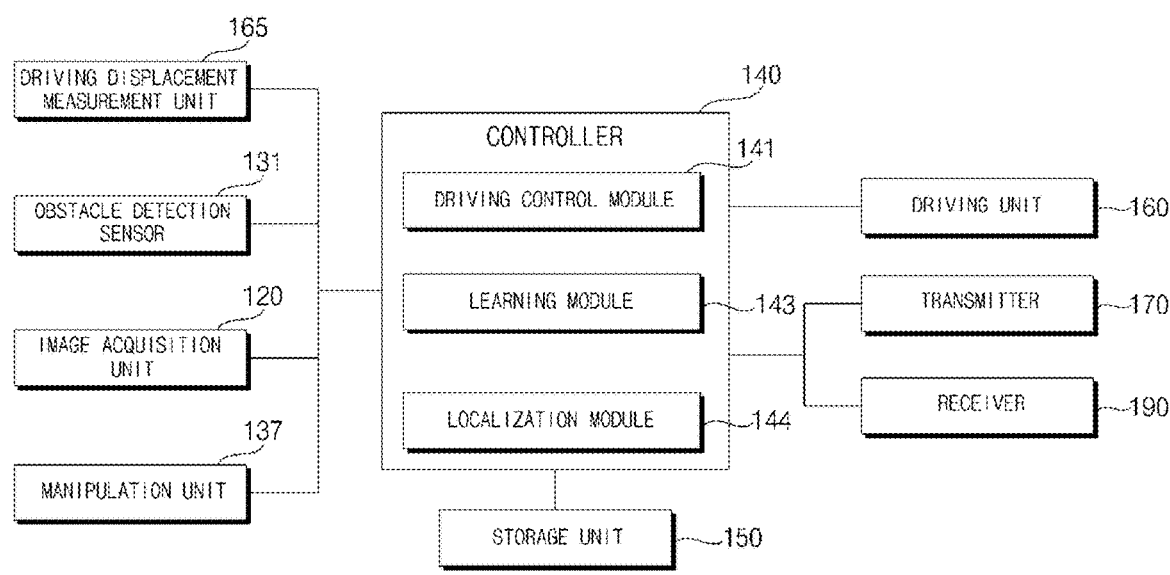
FIG. 5 is a block diagram showing a control relationship between main components of the mobile robot shown in FIG. 1.

Referring to FIG. 5, the mobile robot 100 may include a storage unit 150 for storing various data. Various data required to control the mobile robot 100 may be recorded in the storage unit 150. The storage unit 150 may include a volatile or non-volatile recording medium. The recording medium may store data readable by a microprocessor and may include a hard disk drive (HDD), a solid state disk (SSD), a silicon disk drive (SDD), ROM, RAM, CD-ROM, a magnetic tape, a floppy disk, an optical data storage device, and so on.

The storage unit 150 may store a map of a driving area. The map may be input by an external terminal that exchanges information with the mobile robot 100 by wire or wirelessly and may be generated via autonomous learning of the mobile robot 100. In the former case, the external terminal may be, for example, a remote controller, a PDA, a laptop, a smart phone, or a tablet PC, in which an application for map setting is installed.

Positions of a plurality of nodes corresponding to a plurality of points in the driving area (according to one-to-one correspondence) may be indicated on the map. Each local zone in the driving area may be indicated on the map. The current position of the mobile robot 100 may be indicated on the map. The current position of the mobile robot 100 on the map may be updated during a driving procedure.

The driving displacement may be a concept including a moving direction and a moving distance of a mobile robot. Assuming that the bottom surface of the driving area is positioned on a plane to which the X and Y axes are orthogonal, the driving displacement may be indicated as ($\Delta x$, $\Delta y$, $\theta$). $\Delta x$ and $\Delta y$ refer to displacement in the X-axis and Y-axis directions, respectively, and $\theta$ refers to a rotation angle.

The driving displacement measurement unit 165 may measure a driving displacement based on the image acquired by the lower camera sensor 139. For example, the driving displacement measurement unit 165 may measure the driving displacement via comparison of continuous pixels of a floor image that is changed along with continuous movement of the mobile robot 100.

The driving displacement measurement unit 165 may measure the driving displacement of the mobile robot 100 based on an operation of the driving unit 160. For example, a driving control module 141 may measure a current or past moving speed, or a driving distance of the mobile robot 100, or the like based on a rotation speed of the driving wheel 136, and may also measure a current or past procedure of changing a direction in a rotation direction of each of the driving wheels 136(L) and 136(R).

The driving displacement measurement unit 165 may measure the driving displacement using at least one of the obstacle detection sensor 131 and the image acquisition unit 120.

A controller 14 may localize a position of the mobile robot 100 on a map based on the driving displacement measured as described.

A transmitter 170 may transmit information on a mobile robot to another mobile robot or a central server. A receiver 190 may receive information from another mobile robot or a central server. The information transmitted from the transmitter 170 or the information received by the receiver 190 may include information of a configuration of a node N of the mobile robot, which will be described below.

The mobile robot 100 may include the controller 140 for processing and determining various pieces of information. The controller 140 may perform information processing for learning a driving area. The controller 140 may perform image processing for localizing a current position on a map. The controller 140 may control an overall operation of the mobile robot 100 through control of various components (e.g., the driving displacement measurement unit 165, the obstacle detection sensor 131, the image acquisition unit 120, the manipulation unit 137, the driving unit 160, the transmitter 170, or the receiver 190 included in the mobile robot 100. The controller 140 may include the driving control module 141, a learning module 143, and a localization module 144.

The control method according to the present embodiment may be performed by the controller 140. The present invention may be related to the method of controlling the mobile robot 100 or may be related to the mobile robot 100 including the controller 140 for performing the control method. The present invention may be related to a computer program including each operation of the control method or may be related to a recording medium with a program recorded thereon for executing the control method by a computer. The 'recording medium' refers to a computer readable recording medium. The present invention relates to a mobile robot control system including both hardware and software.

The driving control module 141 may control driving of the mobile robot 100. The driving control module 141 may control driving of the driving unit 160 according to driving setting.

The learning module 143 may generate a map of a driving area. To localize a position in a global zone, the learning module 143 may match an image acquired from at each point with each node N on the map. The acquired images may correspond to nodes according to one-to-one correspondence.

The learning module 143 may generate a node on the map based on the driving displacement information. For example, node coordinate information may be generated based on a driving displacement measured based on a start point node O that will be described below. The generated node coordinate information D186 of the node N may be a relative coordinates value of the start point node O. The node information may include image information D183 corresponding to a node.

The learning module 143 may generate a map based on a driving displacement between the node N and a node.

The learning module 143 may update a pre-generated map. For example, the learning module 143 may update the node coordinate information D186 that is pre-stored, based on a loop constraint LC that will be described below.

The learning module 143 may divide the global zone X into a plurality of local zones according to a predetermined reference. The learning module 143 may divide the global zone X into a plurality of great-local zones according to a predetermined reference. The learning module 143 may divide a great-local zone into a plurality of local zones according to a predetermined reference. A plurality of local zones may be grouped according to the predetermined reference to obtain a great-local zone.

The localization module 144 may localize a current position using at least one of the obstacle detection sensor 131 or the image acquisition unit 120. The localization module 144 may localize an unknown current position in a jumping case. The localization module 144 may localize a current position on the map. The localization module 144 may select a node that corresponds to a current position (according to univalent correspondence) among a plurality of nodes on a map. Hereinafter, a procedure of recognizing an unknown current position using the image acquisition unit 120 will be exemplified, but it is not required that the present invention is limited thereto.

A method of controlling a mobile robot according to an embodiment of the present invention may include learning operations S100, S100', S100", and S190. The method of controlling the mobile robot may include localization operations S200, S200', and S200".

Figure 6:
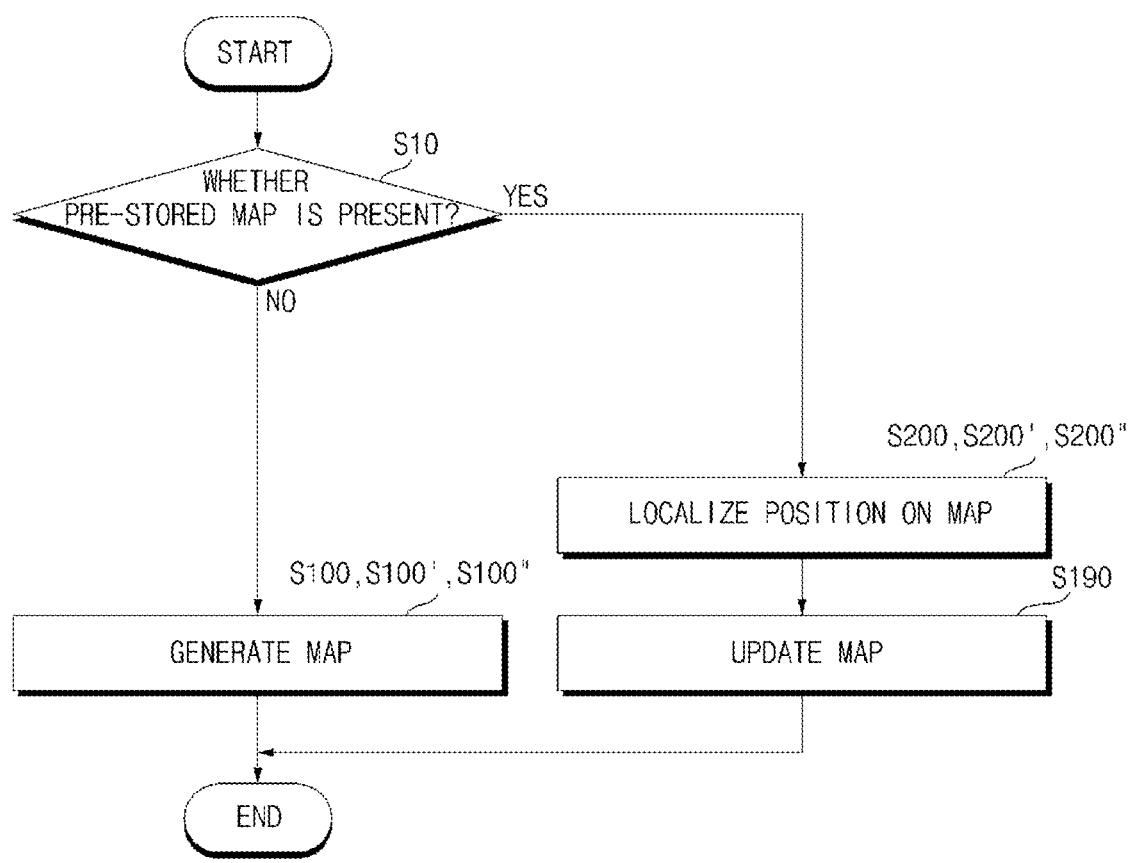
FIG. 6 is a flowchart showing a scenario of one case in which the mobile robot of FIG. 1 performs localizations S200, S200', and S200" on a map.
Figure 7:
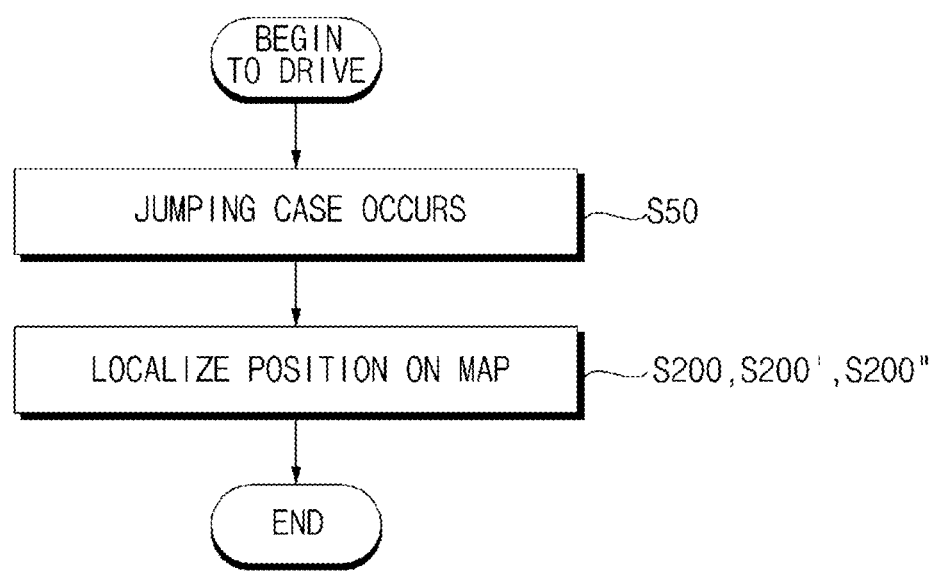
FIG. 7 is a flowchart showing a scenario of another case in which the mobile robot of FIG. 1 performs localizations S200, S200', and S200" on a map.

With reference to FIGS. 6 and 7, a scenario for starting learning operations S100, S100', S100", and S190 or localization operations S200, S200', and S200" will be exemplified.

In one scenario that refers to FIG. 6, when the mobile robot 100 begins to drive, whether a pre-stored map is present may be determined (S10). Determination of whether the pre-stored map is present may be an operation of determining whether the map is stored in the storage unit ( ) of the mobile robot ( ). As a result of operation S10, when the pre-stored map is not stored, the mobile robot 100 may begin to perform learning operations S100, S100', and S100" of generating a new map. As a result of operation S10, when the pre-stored map is present, operations S200, S200', and S200" of localizing a current position of the mobile robot 100 on the map may begin. After operations S200, S200', and S200", learning operation S190 of updating the pre-stored map may begin. In operation S190, the pre-stored map may be updated based on image information that is newly acquired by the mobile robot 100. Operation S190 may include an operation of generating a new node on the pre-stored map based on information in a new driving area. Operation S190 may include an operation of updating some of information of a node on a pre-stored merging map based on environment information acquired from a driving area. In this manner, position localization operations S200, S200', and S200" and learning operation S190 may be continuously and simultaneously performed (simultaneous localization and mapping: SLAM). For example, the control method will be described in terms of learning operations S100, S100', and S100" of generating the map, but it is not required that the present invention is limited thereto, and the following description may be applied to learning operation S150 of updating the map.

In another scenario that refers to FIG. 7, a jumping case may occur (S50). After the jumping case occurs (S50), the mobile robot 100 may begin to perform operations S200, S200', and S200" of localizing a current position on the pre-stored map.

The method of controlling the mobile robot may include learning initial operations S110, S120, and S130, label generation operations S150, S156, and S160 of generating a label descriptor based on a plurality of descriptors, localization initial operations S210 and S220, and last node selection operation S270 of selecting a node estimated as a current position.

The label generation operations S150, S156, and S160 may include at least one of local label descriptor generation operation S150, great-local label descriptor generation operation S156, or global label descriptor generation operation S160, which will be described below. In label generation operations S150, S156, and S160, the plurality of descriptors may be classified into a plurality of groups based on a distance between the descriptors. In label generation operations S150, S156, and S160, the plurality of descriptors may be classified into a plurality of groups according to a predetermined classification rule that will be described below. In label generation operations S150, S156, and S160, a label descriptor representing descriptors that are classified as the same group may be generated. In label generation operations S150, S156, and S160, a label descriptor may be generated from descriptors classified as the same group according to a predetermined label rule.

Label generation operations S150, S156, and S160 may begin to be performed after learning initial operations S110, S120, and S130 but, may be performed when the predetermined reference is satisfied during the learning initial operation.

For example, while learning initial operations S110, S120, and S130 are performed, if at least some of nodes that have been generated thus far are grouped and are classified as a local zone, a local label descriptor of the classified local zone may be generated. That is, the local label descriptor may be generated during driving.

While learning initial operations S110, S120, and S130 are performed, if at least some of nodes that have been generated thus far are grouped and are classified as a great-local zone, a great-local label descriptor of the classified great-local zone may be generated. That is, the great-local label descriptor may be generated during driving.

Figure 8:
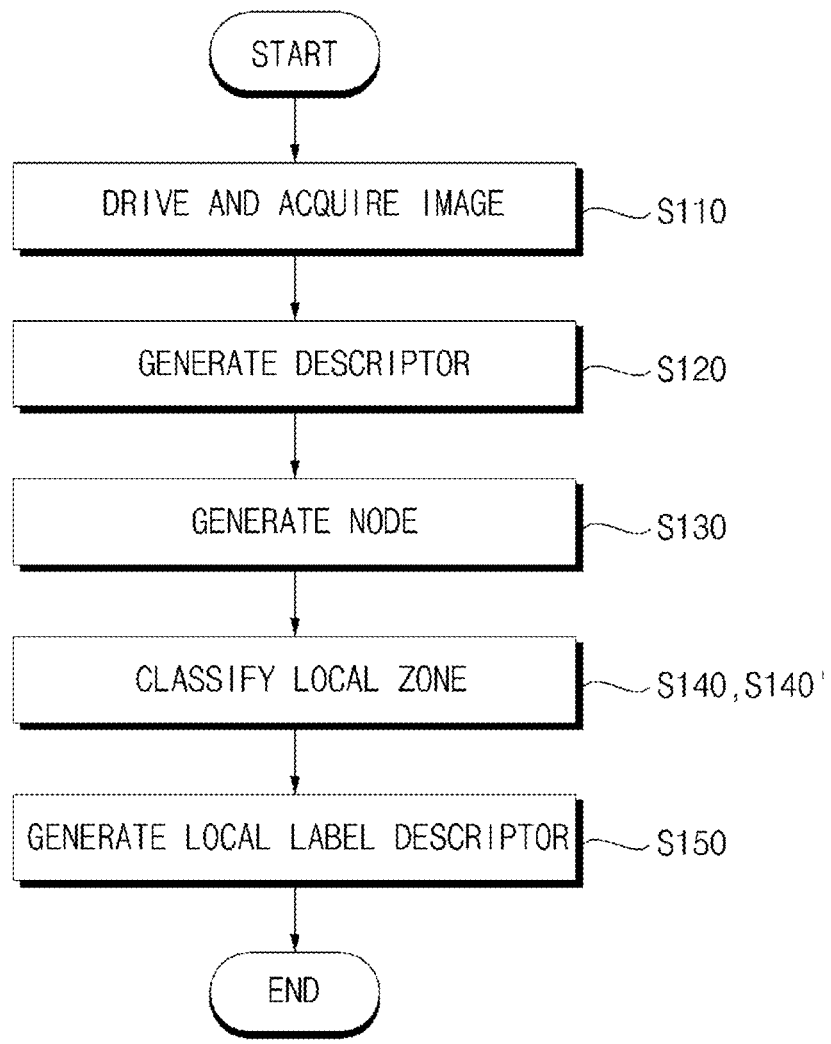
FIGS. 8 and 9 are flowcharts showing learning operation S100 and localization operation S200 according to a first embodiment of the mobile robot of FIG. 1.

Referring to FIG. 8, learning operation S100 according to a first embodiment may include a learning initial operation. The learning initial operation may include driving and image acquisition operation S110, operation S120 of generating a descriptor, and operation S130 of generating a node.

Learning operation S100 may include driving and image acquisition operation S110. In operation S110, an image for each of spaced points may be acquired while the mobile robot 100 drives. Acquires images may correspond to points, respectively. A plurality of acquired images may correspond to a plurality of points, respectively according to one-to-one correspondence.

Learning operation S100 may include operation S120 of generating descriptors that correspond to a plurality of feature points extracted from the acquired image, respectively. A plurality of descriptors may correspond to a plurality of feature points according to one-to-one correspondence. Operation S120 may be performed during movement to a next point after an image is acquired at one point. Operation S120 may be performed while operation S110 is performed.

Learning operation S100 may include operation S130 of generating a node. In operation S130, a plurality of nodes may be generated. Each node may correspond to coordinates information of each point. Each node may correspond to each image acquired at each point. Each piece of image information may correspond to each node. A plurality of acquired images may correspond to a plurality of nodes, respectively, according to one-to-one correspondence. Operation S130 may be performed during movement to a next point from one point. Operation S130 may be performed while operation S110 and/or operation S120 are performed.

Learning operation S100 may include operations S140 and S140' of classifying the plurality of nodes as a local zone according to a predetermined reference. Operations S140 and S140' may be referred to as local zone classification operations S140 and S140'. Operations S140 and S140' of classifying one local zone A may be performed prior to operation S150 of generating the local label descriptor of one local zone A. Operations S140 and S140' may be performed while operation S130 of generating a node is performed. Some of the plurality of nodes may be grouped and may be classified as one local zone. Operations S140 and S140' may be performed when a new node is generated to satisfy a predetermined local zone classification condition while the learning initial operation is performed.

Learning operation S100 may include operation S150 of generating a local label descriptor based on the plurality of descriptors. Operation S150 may be referred to as first label generation operation S150 or local label generation operation S150. In operation S150, a plurality of descriptors in a local zone may be classified as a plurality of groups, for each local zone. In operation S150, for each local zone, a plurality of descriptors in a local zone may be classified as a plurality of groups according to a first predetermined classification rule. In operation S150, a local label descriptor representing descriptors classified as the same group may be generated. In operation S150, a local label descriptor may be generated based on descriptors classified as the same group according to a first predetermined label rule that will be described below.

Figure 9:
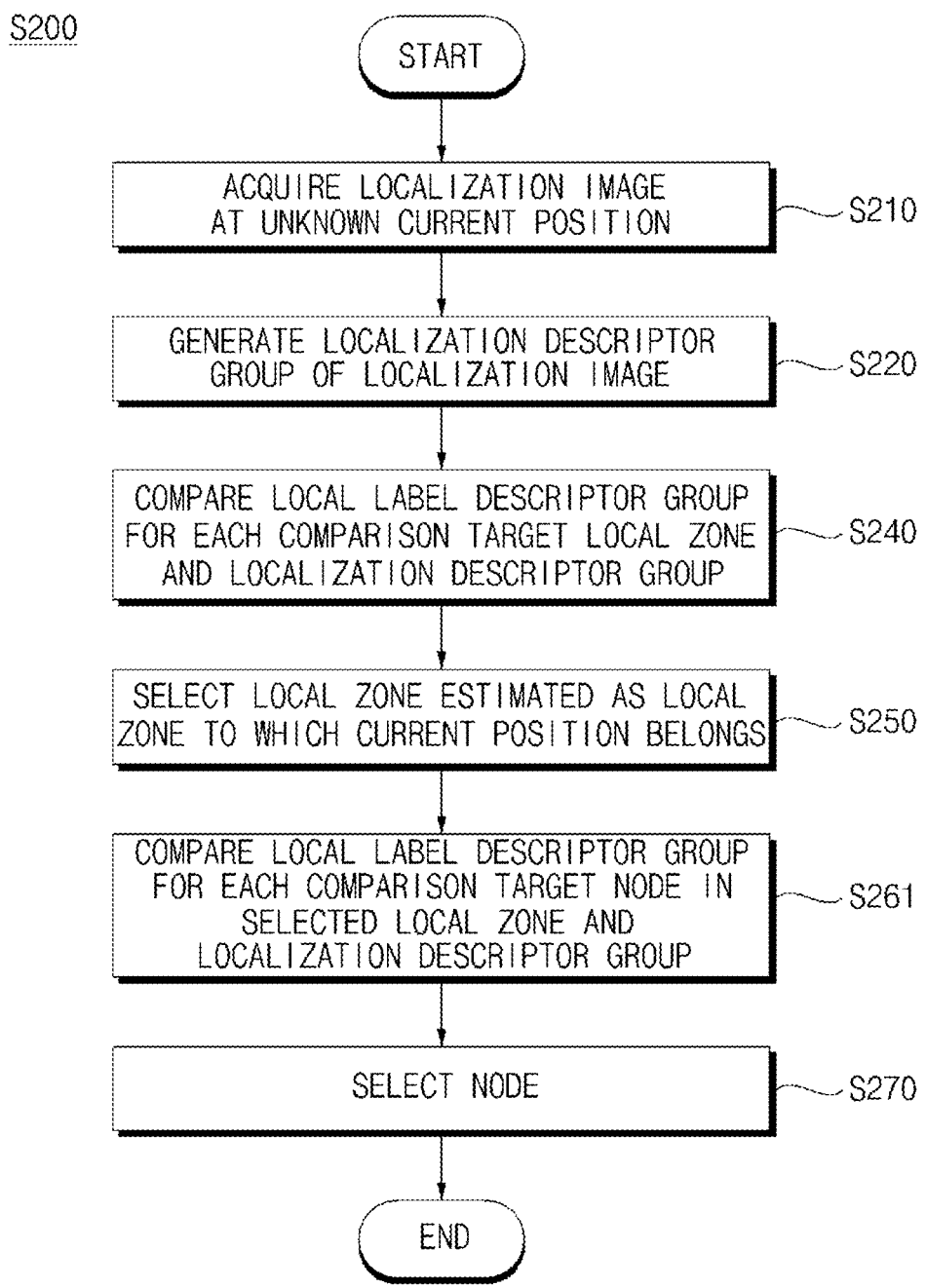

Referring to FIG. 9, localization operation S200 according to a first embodiment may include a localization initial operation. The localization initial operation may include localization image acquisition operation S210 and operation S220 of generating a localization descriptor group.

Localization operation S200 may include localization image acquisition operation S210. In operation S210, the mobile robot 100 may acquire a localization image at an unknown current position. Operation S210 may be performed when a jumping case occurs. Operation S210 may be performed when a pre-stored map is present in the mobile robot 100.

Localization operation S200 may include operation S220 of generating localization descriptors that respectively correspond to the plurality of localization feature points extracted from the acquired localization image. A plurality of localization descriptors may correspond to a plurality of localization feature points, respectively, according to one-to-one correspondence. Operation S220 may be performed after at least one localization image is acquired at an unknown current position.

Localization operation S200 may include operation S240 of comparing a plurality of local label descriptors in a local zone (a local label descriptor group) and the plurality of localization descriptor (a localization descriptor group) after operation S220 is performed.

Localization operation S200 may include operation S250 of selecting one local zone to which an unknown current position belongs among a plurality of local zones after comparison operation S240 is performed.

In comparison operation S240, local feature distribution may be generated based on types of a plurality of local label descriptors in a local zone and a weight w for each type.

In comparison operation S240, the localization image feature distribution may be compared with local feature distribution for each local zone to select a local zone with the highest similarity (S250). In comparison operation S240, the localization image feature distribution may be generated in a data form that is comparable for each local feature distribution, and localization image feature distribution compared with feature distribution of one local zone A may be different from localization image feature distribution compared with feature distribution of another local zone B. The 'comparable' refer to a state in which two objects are compared with each other to compute similarity. As a figurative example, in order to compare the number of objects with the same color between two combinations including objects with various colors, when colors of respective objects included in a combination are classified according to a color classification reference of the other combination among the two combinations, the two combinations may be expressed to be 'comparable'.

According to the first embodiment, in order to compare feature distribution of one local zone A and localization image feature distribution to compute similarity therebetween, a plurality of localization descriptors in a localization image may be substituted with the 'local label descriptor in the local zone A' corresponding to each localization descriptor to generate localization image feature distribution. In order to compare feature distribution of another one local zone B and localization image feature distribution to compute similarity therebetween, a plurality of localization descriptors in a localization image may be substituted with the 'local label descriptor in the local zone B' corresponding to each localization descriptor to generate localization image feature distribution. In this case, a type of the 'local label descriptor in the local zone A' and a type of the 'local label descriptor in the local zone B' are different and, thus, the 'localization image feature distribution comparable with the feature distribution of the local zone A' and the 'localization image feature distribution comparable with the feature distribution of the local zone B may be differently generated.

In order to generate localization image feature distribution comparable with local feature distribution of one local zone A1, a plurality of localization descriptors in the localization image may be respectively substituted with local label descriptors closest thereto among a plurality of local label descriptors in the local zone A1. For example, $\vec{H1}$ and $\vec{H5}$ among localization descriptor $\vec{H1}, \vec{H2}, \vec{H3}, \ldots, \vec{H7}$ may each be substituted with $\vec{A1F4}$, closest thereto among a plurality of local label descriptors $\vec{A1F1}, \vec{A1F2}, \vec{A1F3}, \ldots, \vec{A1Fl}$ in the local zone A1. In this case, the local label descriptor $\vec{A1F4}$. may correspond to the localization descriptors $\vec{H1}$ and $\vec{H5}$, according to univalent correspondence. When a distance between a localization descriptor and a local label descriptor closest thereto is greater than a predetermined value, it may also be possible to exclude the corresponding localization descriptor and to generate localization image feature distribution based on only the remaining localization descriptors.

The local feature distribution of one local zone A1 may be expressed as a local feature distribution histogram using a type of each local label descriptor as a representative value (a value in the horizontal axis) and a score s1 computed based on a weight w for each type as a degree number (a value in the vertical axis).

The local feature distribution of one local zone A1 may be expressed as a local feature distribution vector using a type of each local label descriptor as each dimension and a score s1 computed based on a weight w for each type as a value of each dimension. A plurality of local feature distribution vectors corresponding to a plurality of local zones A1, A2, . . . Ai on a map according to one-to-one correspondence may be generated (i being a natural number).

In the local feature distribution of one local zone A1, the score s1 of one local label descriptor $\overrightarrow{A1F1}$. may be computed according to Equation 3 below.

$$s1 = \frac{w1}{\sum w} \times IDF1 \quad \text{[Equation 3]}$$

Here, s1 is a score of one local label descriptor $\overrightarrow{A1F1}$. in corresponding local feature distribution, w1 is a weight of the local label descriptor $\overrightarrow{A1F1}$. in the corresponding local zone A1, $\Sigma w$ is the sum of weights of all local label descriptors in the corresponding local zone A1, and is a value obtained by dividing the 'total number of images' in the corresponding local zone A1 by the 'number of images with the generated local label descriptor $\overrightarrow{A1F1}$'.

The localization image feature distribution comparable with one comparison target local zone A1 may be expressed as a localization image feature distribution histogram using types of a plurality of local label descriptors in a localization image as a representative value (a value in the horizontal axis) and a localization score sh computed based on a localization weight wh for each type as a degree number (a value in the vertical axis).

The localization image feature distribution comparable with one comparison target local zone A1 may be expressed as a localization image feature distribution vector using types of a plurality of local label descriptors in a localization image as respective dimensions and localization score sh1 for each type as a value of each dimension. Localization image feature distribution vectors comparable with local feature distributions corresponding to a plurality of comparison target local zones A1, A2, . . . Ai may be generated (i being a natural number).

For example, in the localization image feature distribution of the comparison target local zone A1, the localization score sh1 of one local label descriptor $\overrightarrow{A1F1}$. may be computed according to Equation 4 below.

$$sh1 = \frac{wh1}{\sum wh} \times IDF1 \quad \text{[Equation 4]}$$

Here, sh1 is a localization score of one local label descriptor $\overrightarrow{A1F1}$. in a corresponding localization image, wh1 is a localization weight of the local label descriptor in a corresponding localization image, $\Sigma wh$ is the sum of localization weights of all local label descriptors in a corresponding localization image, and is a value obtained by dividing the 'total number of images' in the corresponding local zone A1 by the 'number of images with the generated local label descriptor $\overrightarrow{A1F1}$. (which is the same as the definition of Equation 3).

In comparison operation S240, local feature distribution and localization feature distribution may be compared for each local zone to compute similarity therebetween. For example, the similarity may be computed according to Equation 5 using cosine similarity.

$$\cos\theta = \frac{X \cdot Y}{|\vec{X}| \times |\vec{Y}|} \quad \text{[Equation 5]}$$

Here, $\cos \theta$ is a possibility that is similarity, $\vec{X}$ is a local feature distribution vector of one comparison target local zone, $\vec{Y}$ is a localization image feature distribution vector comparable with $\vec{X}$, $|\vec{X}| \times |\vec{Y}|$ is a product of absolute values of two vectors, and $\vec{X} \cdot \vec{Y}$ is an inner product of two vectors.

In local zone selection operation S250, a local zone with the highest similarity among similarities computed for each local zone may be selected as a local zone to which a current position belongs.

Localization operation S200 may include operation S261 of comparing image information corresponding to a node for each comparison target node with localization image information. In comparison operation S261, the comparison target node may be a plurality of nodes in the local zone selected in local zone selection operation S250. For example, in comparison operation S261, a plurality of label descriptors in an image corresponding to each node and a plurality of label descriptors in the localization image may be compared with each other to compute similarity for each comparison target node.

Localization operation S200 may include operation s270 of selecting a node estimated as a current position among one or more comparison target nodes. Operations S261 and S270 may be referred to as last node selection operations S261 and S270. In last node selection operations S261 and S270, node information for each comparison target node and localization image information acquired at the current position may be compared with each other to select a node estimated as the current position.

In node selection operation S270, a node with the highest similarity among similarities computed for each comparison target node may be selected. The mobile robot 100 may localize the node selected in operation s270 as a current position and, then, may continuously drive based on the localization result.

Figure 10:
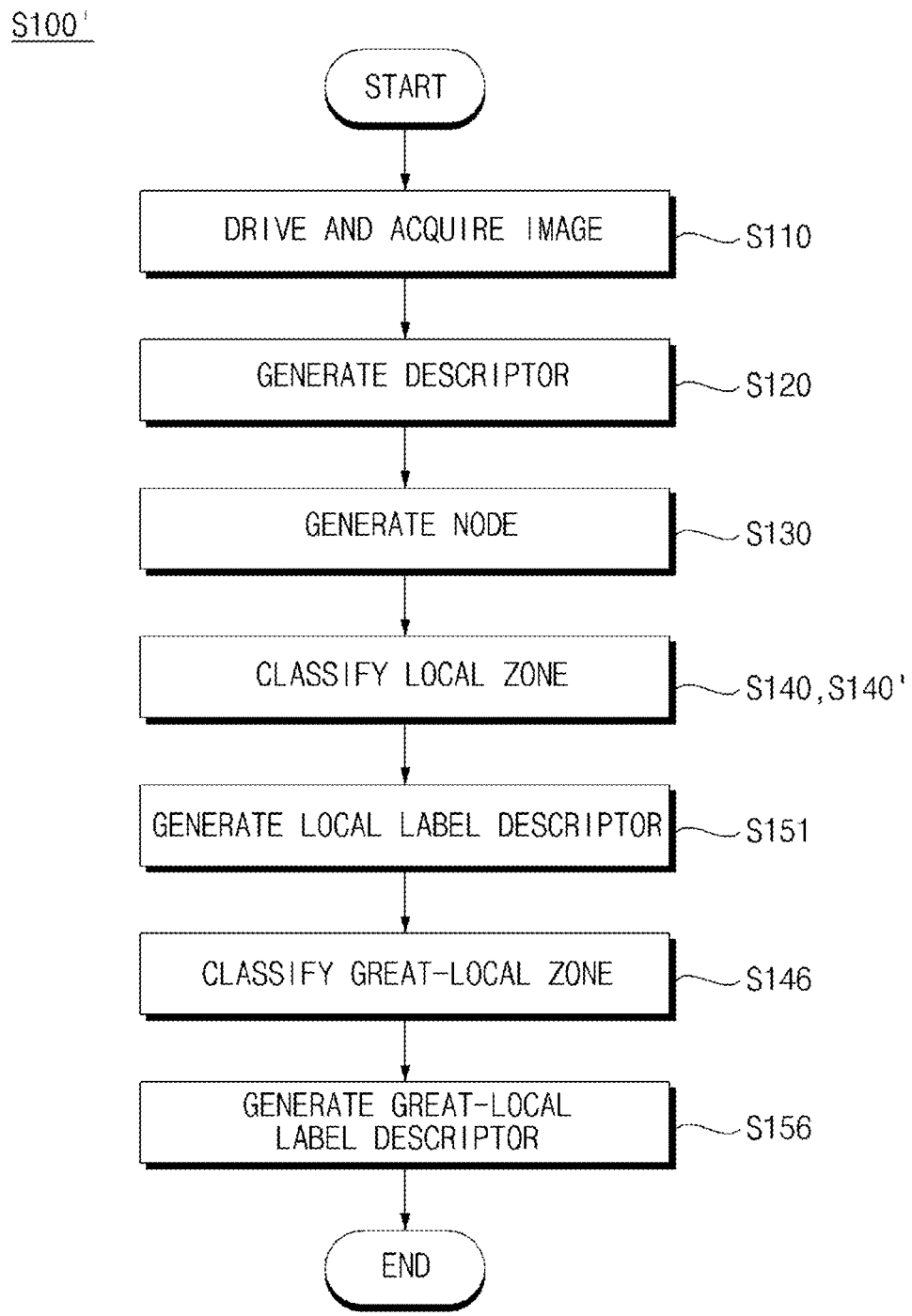
FIGS. 10 and 11 are flowchart showing learning operation S100' and localization operation S200' according to a second embodiment of the mobile robot of FIG. 1.

Referring to FIG. 10, the same operations of learning operation S100' according to a second embodiment as those of learning operation S100 according to the first embodiment are denoted by the same reference numerals and, thus, a repeated description will be omitted.

Learning operation S100' may include operation S146 of classifying the plurality of local zones as a great-local zone according to a predetermined reference. Operation S146 may be referred to as local zone classification operation S140, S140', and S146. Operation S146 of classifying one great-local zone A may be performed before operation S156 of generating a great-local label descriptor of one great-local zone A. Operation S146 may be performed after local zone classification operation S130 begins to be performed. Some of the plurality of local zones may be grouped and may be classified as one great-local zone. Operation S146 may be performed when a new local zone is classified and a predetermined great-local zone classification condition is satisfied while local zone classification operations S140 and S140' are performed.

Learning operation S100' may include operation S156 of generating a great-local label descriptor based on the plurality of local label descriptor. Operation S156 may be referred to as second label generation operation S156. In operation S156, a plurality of local label descriptors in a great-local zone may be classified as a plurality of groups for each great-local zone. In operation S156, local label descriptors generated in a plurality of local zones in a great-local zone may be classified as a plurality of groups. In operation S156, a plurality of local label descriptors in a great-local zone may be classified as a plurality of groups for each local zone according to a second predetermined classification rule that will be described below. In operation S156, a great-local label descriptor representing local label descriptors classified as the same group may be generated. In operation S156, a great-local label descriptor may be generated based on local label descriptors classified as the same group according to a second predetermined label rule that will be described below.

Operation S156 may be performed when a new great-local zone is classified after operation S150 begins to be performed. Operation S156 may be lastly performed after the mobile robot 100 completes whole driving.

Figure 11:
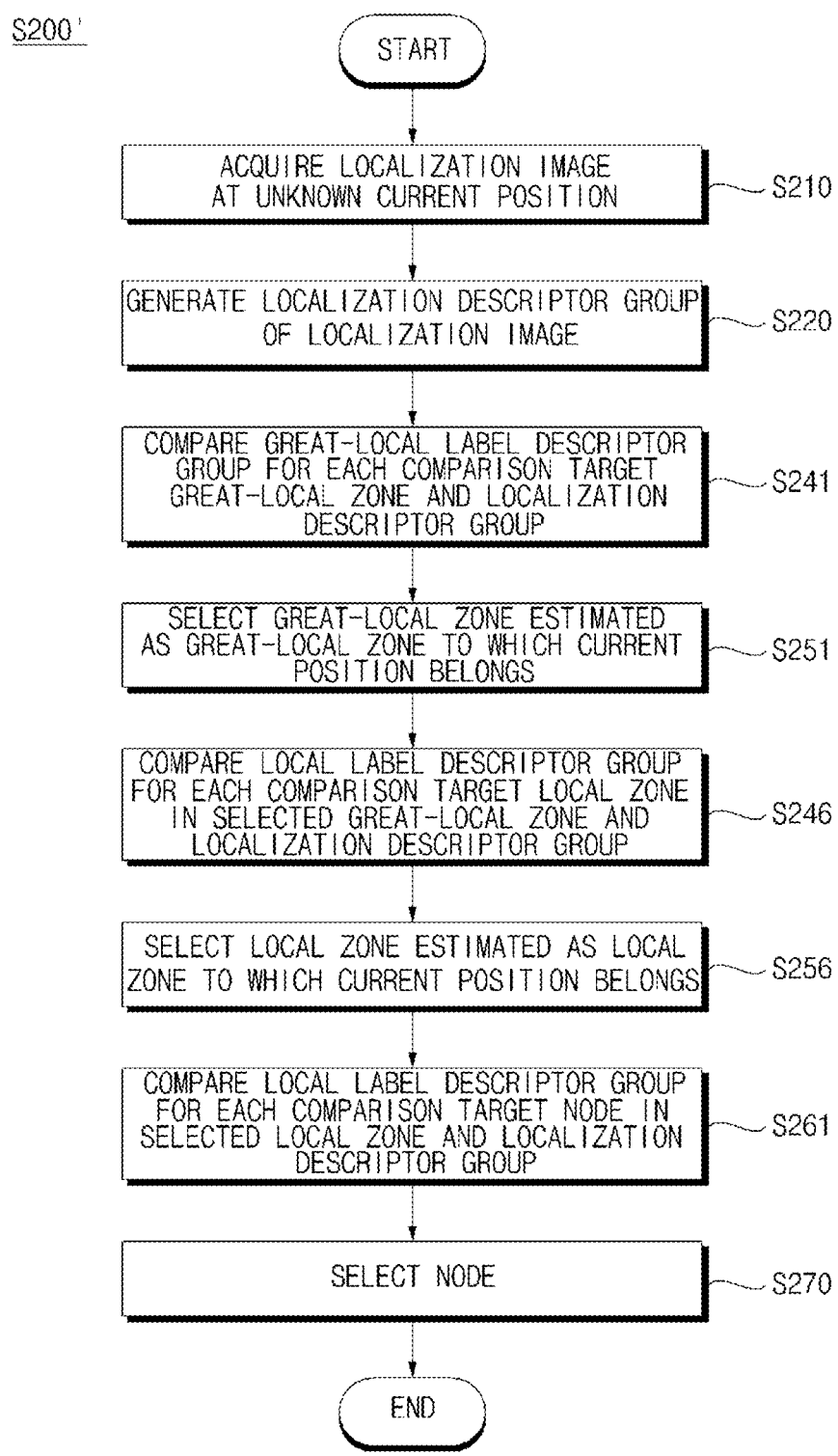

Referring to FIG. 11, the same operations of localization operation S200' according to the second embodiment as those of localization operation S200 according to the first embodiment are denoted by the same reference numerals and, thus, a repeated description will be omitted.

Localization operation S200' may include operation S241 of comparing a plurality of great-local label descriptors in a great-local zone (a great-local label descriptor group) and the plurality of localization descriptors (a localization descriptor group) after operation S220 is performed.

Localization operation S200' may include operation S251 of selecting one great-local zone to which an unknown current position belongs among a plurality of great-local zones after comparison operation S241 is performed.

In comparison operation S241, great-local zone feature distribution may be generated based on types of a plurality of great-local label descriptors in a great-local zone and a weight w for each type.

In comparison operation S241, localization image feature distribution may be compared with great-local feature distribution for each great-local zone to select a great-local zone with the highest similarity (S251). In comparison operation S241, the localization image feature distribution may be generated in a data format comparable for each great-local feature distribution, and localization image feature distribution compared with feature distribution of one great-local zone A may be different from localization image feature distribution compared with feature distribution of another one great-local zone B.

In the second embodiment, in order to compare feature distribution of one great-local zone A and localization image feature distribution to compute similarity therebetween, a plurality of localization descriptors in a localization image may be substituted with the 'great-local label descriptor in the great-local zone A' corresponding to each localization descriptor to generate localization image feature distribution. In order to compare feature distribution of another one great-local zone B and localization image feature distribution to compute similarity therebetween, a plurality of localization descriptors in a localization image may be substituted with the 'great-local label descriptor in the great-local zone B' corresponding to each localization descriptor to generate localization image feature distribution. In this case, a type of the 'great-local label descriptor in the great-local zone A' and a type of the 'great-local label descriptor in the great-local zone B' are different and thus, the 'localization image feature distribution comparable with feature distribution of the great-local zone A' and the 'localization image feature distribution comparable with feature distribution of the great-local zone B' may be differently generated.

In order to generate localization image feature distribution comparable with great-local feature distribution of one great-local zone X1, a plurality of localization descriptors in a localization image may be substituted with a great-local label descriptor closest thereto among a plurality of great-local label descriptors in the great-local zone X1. For example, $\vec{H1}$ and $\vec{H5}$ among localization descriptors $\vec{H1}, \vec{H2}, \vec{H3}, \ldots, \vec{H7}$ may be substituted with $\overrightarrow{X1F4}$ may each be substituted with $\overrightarrow{X1F4}$ closest thereto among a plurality of great-local label descriptors in the great-local zone X1. In this case, a great-local label descriptor $\overrightarrow{X1F4}$ may correspond to localization descriptors $\vec{H1}$ and $\vec{H5}$ according to univalent correspondence. In addition, when a distance between a localization descriptor and a great-local label descriptor closest thereto is greater than a predetermined value, it may also be possible to exclude the corresponding localization descriptor and to generate localization image feature distribution based on only the remaining localization descriptors.

The great-local feature distribution of one great-local zone X1 may be expressed as a great-local feature distribution histogram using a type of each great-local label descriptor as a representative value (a value in the horizontal axis) and a score s2 computed based on a weight w for each type as a degree number (a value in the vertical axis).

The great-local feature distribution of one great-local zone X1 may be expressed as a great-local feature distribution vector using a type of each great-local label descriptor as each dimension and a score s2 computed based on a weight w for each type as a value of each dimension. A plurality of great-local feature distribution vectors corresponding to a plurality of great-local zones X1, X2, . . . Xj on a map according to one-to-one correspondence may be generated (j being a natural number).

In the great-local feature distribution of one great-local zone X1, the score s2 of one great-local label descriptor $\overrightarrow{X1F1}$. may be computed according to Equation 6 below.

$$s2 = \frac{w2}{\sum w} \times IDF2 \qquad \text{[Equation 6]}$$

Here, s2 is a score of one great-local label descriptor $\overrightarrow{X1F1}$. in corresponding great-local feature distribution, w2 is a weight of the great-local label descriptor $\overrightarrow{X1F1}$. in the corresponding great-local zone X1, $\Sigma_w$ is the sum of weights of all great-local label descriptors in the corresponding great-local zone X1, and IDF2 is a value obtained by dividing the 'total number of images' in the corresponding great-local zone X1 by the 'number of images with the generated great-local label descriptor $\overrightarrow{X1F1}$'.

The localization image feature distribution comparable with one comparison target the great-local zone X1 may be expressed as a localization image feature distribution histogram using types of a plurality of great-local label descriptors in a localization image as a representative value (a value in the horizontal axis) and a localization score sh computed based on a localization weight wh for each type as a degree number (a value in the vertical axis).

The localization image feature distribution comparable with one comparison target the great-local zone X1 may be expressed as a localization image feature distribution vector using types of a plurality of great-local label descriptors in a localization image as respective dimensions and a localization score sh2 for each type as a value for each dimension. Localization image feature distribution vectors comparable with respective great-local feature distributions for a plurality of comparison target great-local zones X1, X2, . . . Xj may be generated (j being a natural number).

For example, in the localization image feature distribution of the comparison target great-local zone X1, the localization score sh2 of one great-local label descriptor $\overrightarrow{X1F1}$. may be computed according to Equation 7 below.

$$sh2 = \frac{wh2}{\Sigma wh} \times IDF2 \quad \text{[Equation 7]}$$

Here, sh2 is a localization score of one great-local label descriptor $\overrightarrow{X1F1}$. in the corresponding localization image, wh2 is a localization weight of the great-local label descriptor $\overrightarrow{X1F1}$. in the corresponding localization image, $\Sigma wh$ is the sum of localization weights of all great-local label descriptors in the corresponding localization image, and IDF2 is a value obtained by dividing the 'total number of images' in the corresponding great-local zone X1 by the 'number of images with the generated great-local label descriptor $\overrightarrow{X1F1}$' (which is the same as the definition of Equation 6).

In comparison operation S241, great-local feature distribution and localization feature distribution may be compared for each great-local zone to compute similarity therebetween. For example, the similarity may be computed according to Equation 8 using cosine similarity.

$$\cos\theta = \frac{X \cdot Y}{|\vec{X}| \times |\vec{Y}|} \quad \text{[Equation 8]}$$

Here, cos θ is a possibility that is similarity, $\vec{X}$ is a great-local feature distribution vector of one comparison target great-local zone, $\vec{Y}$ is a localization image feature distribution vector comparable with $\vec{X}$, $|\vec{X}| \times |\vec{Y}|$ is a product of absolute values of two vectors, and $\vec{X} \cdot \vec{Y}$ is an inner product of two vectors.

In local zone selection operation S251, a great-local zone with the highest similarity among similarities computed for each great-local zone may be selected as a great-local zone to which a current position belongs.

Localization operation S200' may include operation S246 of comparing a plurality of local label descriptors in a local zone for each comparison target local zone (a local label descriptor group) with the plurality of localization descriptors (a localization descriptor group) after operation S251 is performed. In comparison operation S246, the comparison target local zone may include a plurality of zones in the great-local zone selected in great-local zone selection operation S251. Comparison operation S246 in the second embodiment is the same as comparison operation S240 in the first embodiment except that a plurality of local zones in the selected great-local zone is a comparison target and operation S246 is performed after operation S251 is performed in the second embodiment.

Localization operation S200' may include operation S256 of selecting one local zone to which an unknown current position belongs among a plurality of local zones after comparison operation S246 is performed. Local zone selection operation S256 in the second embodiment is the same as local zone selection operation S250 in the first embodiment except that local zone selection operation S256 is performed after operation S246 is performed.

Figure 12:
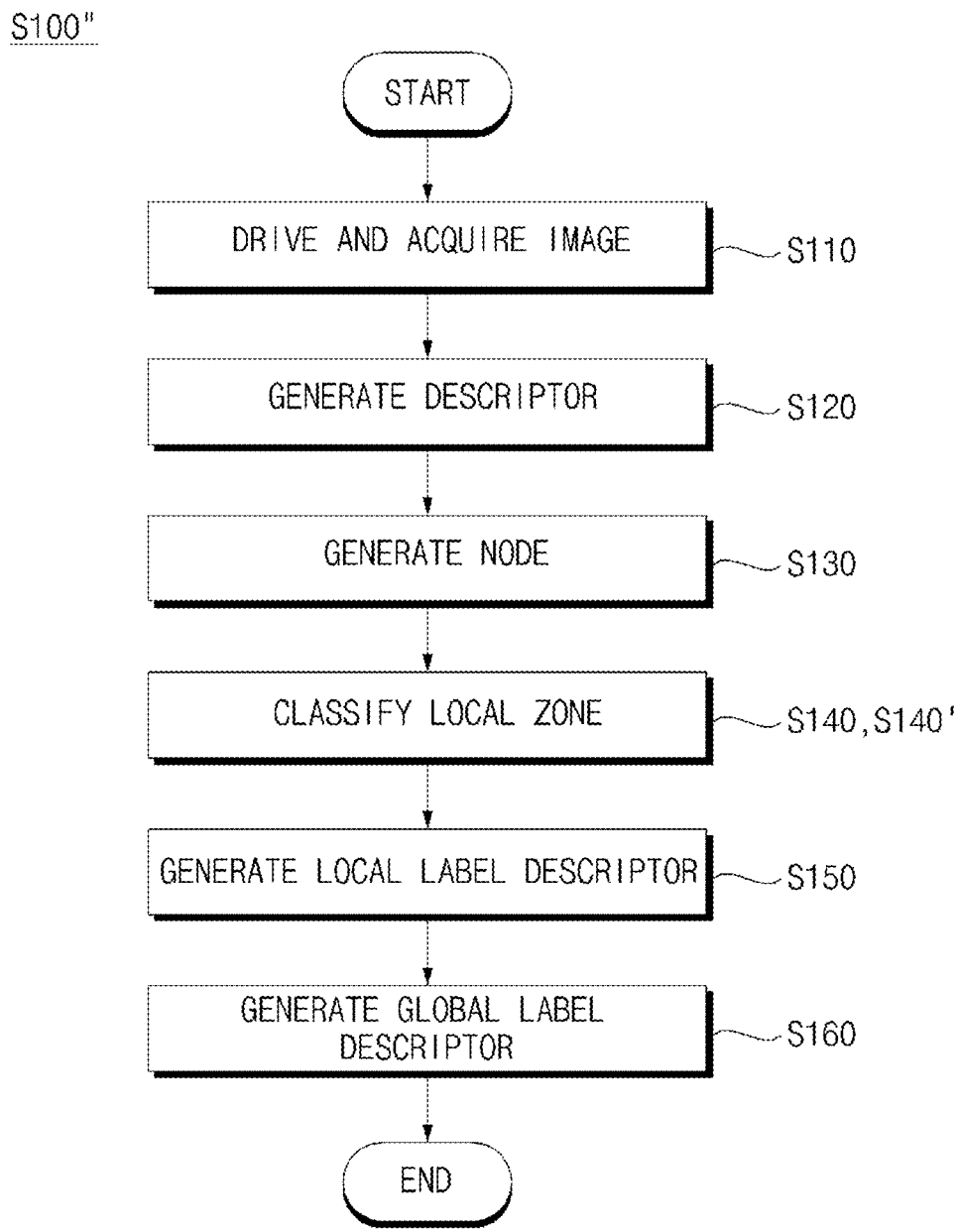
FIGS. 12 and 13 are flowcharts showing learning operation S100" and localization operation S200" according to a third embodiment of the mobile robot of FIG. 1.

Referring to FIG. 12, the same operations of learning operation S100" according to a third embodiment as those of learning operation S100 according to the first embodiment are denoted by the same reference numerals and, thus, a repeated description will be omitted.

Learning operation S100" may include operation S160 of generating a global label descriptor based on the plurality of local label descriptors. Operation S160 may be referred to as second label generation operation S160 or global label generation S160. In operation S160, a plurality of local label descriptors in a global zone may be classified as a plurality of groups. In operation S160, the all generated local label descriptors may be classified as a plurality of groups. In operation S160, local label descriptors respectively generated in a plurality of local zones may be classified as a plurality of groups. In operation S160, a plurality of local label descriptors in a global zone may be classified as a plurality of groups according to a second predetermined classification rule that will be described below. In operation S160, a global label descriptor representing local label descriptors classified as the same group may be generated. In operation S160, a global label descriptor may be generated based on local label descriptors classified as the same group according to a second predetermined label rule that will be described below.

Operation S160 may be performed after operation S150 is performed. Operation S160 may be lastly performed after mobile robot 100 completes whole driving. In a state in which the mobile robot 100 completes whole driving, a current global zone may be determined based on driving and image acquisition operation S110 that has been performed so far. A global zone may be updated every driving and, thus, operation S160 may be performed in a state in which the mobile robot 100 completes whole driving.

Figure 13:
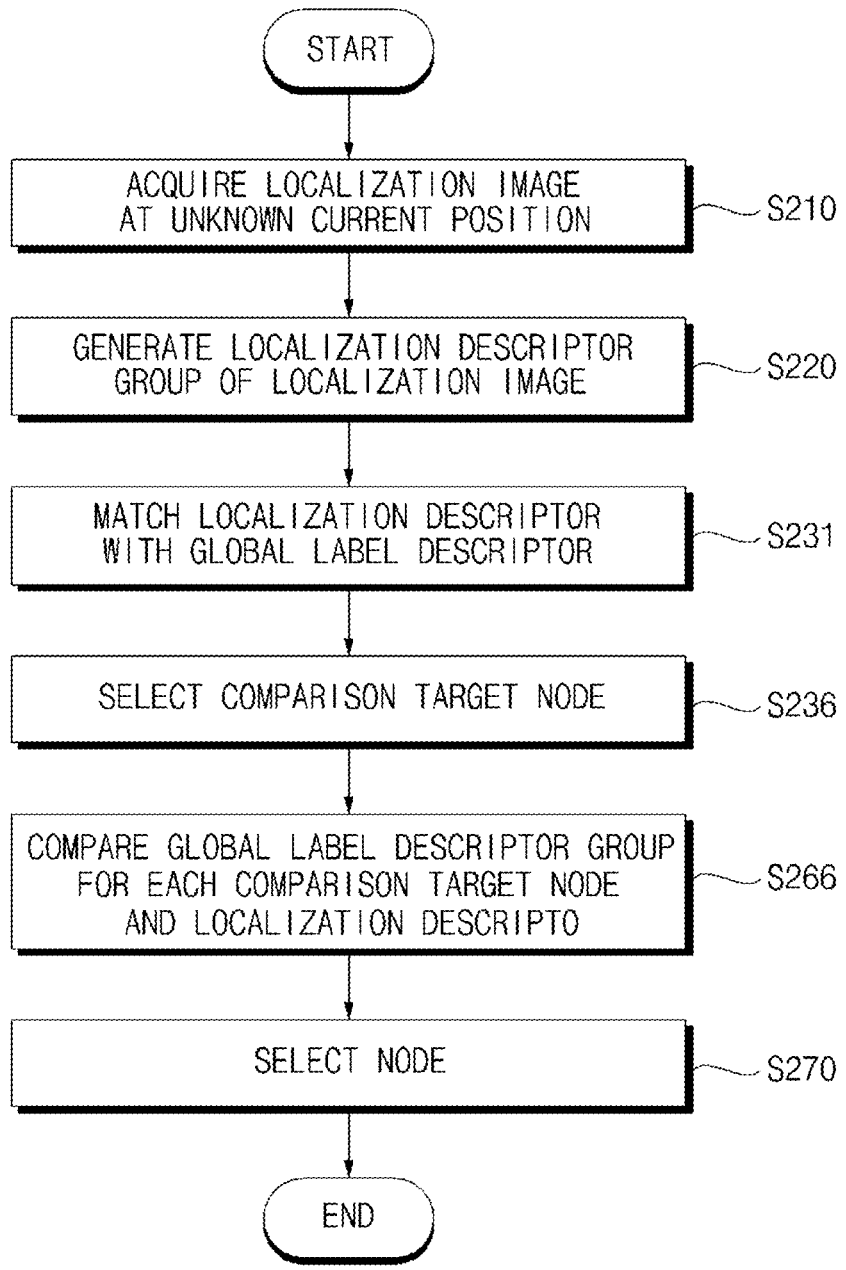

Referring to FIG. 13, the same operations of localization operation S200" according to a third embodiment as those of localization operation S200 according to the first embodiment are denoted by the same reference numerals and, thus, a repeated description will be omitted.

Localization operation S200" may include comparison target selection operations S231 and S236. Comparison target selection operations S231 and S236 may include operation S231 of matching a label descriptor with a localization descriptor and selection operation S236 of a comparison target node.

Localization operation S200" may include operation S231 of respectively matching label descriptors with the localization descriptor generated in operation S220 after operation S220 is performed. In operation S231, the label descriptors may be matched with the localization descriptors based on a distance between the localization descriptor and the label descriptor. In detail, in operation S231, a label descriptor with the distance closest to the localization descriptor may be matched with each of the localization descriptors.

In operation S231, the label descriptor may be a global label descriptor. In operation S231, the global label descriptor may be matched with each of the generated localization descriptors. In operation S231, the global label descriptor may be matched with each of the localization descriptor based on the distance between the localization descriptor and the global label descriptor. In detail, in operation S231, the global label descriptor with a distance closest to the localization descriptor may be matched with each of the localization descriptors.

In operation S231, the label descriptor (global label descriptor) may be matched in such a way that the label descriptors (global label descriptors) correspond to the localization descriptors according to univalent correspondence. Only one global label descriptor corresponds to each of all localization descriptors.

Localization operation S200" may include operation S236 of selecting one or more comparison target nodes corresponding to the matched label descriptor after matching operation S231 is performed. In matching operation S231, when the global label descriptor is matched with each of the localization descriptors, one or more comparison target nodes corresponding to the global label descriptor matched in operation S236 may be selected.

Descriptors may correspond to the label descriptors (global label descriptors) matched in matching operation S231. These descriptors (descriptors corresponding to the label descriptor) may correspond to one or more images. In operation S236, one or more comparison target nodes corresponding to this image (one or images corresponding to descriptors corresponding to the label descriptor) may be selected.

In detail, descriptors may correspond to the label descriptors (global label descriptors) matched in matching operation S231 according to one-to-many correspondence. These descriptors (descriptors corresponding to a label descriptor according to one-to-many correspondence) may correspond to one or more images according to univalent correspondence. In operation S236, one or more comparison target nodes that correspond to this image (one or more corresponding to descriptors, which correspond to the label descriptor according to one-to-many correspondence, according to univalent correspondence) may be selected.

The number of the comparison target nodes selected in comparison target node selection operation S236 is smaller than the total number of nodes in the global zone and, thus, a time taken to perform subsequent comparison operation S266 may be reduced.

Localization operation S200" may include operation S266 of comparing a plurality of global label descriptors (a global label descriptor group) for each comparison target node and the plurality of localization descriptor (localization descriptor groups) after comparison target node selection operation S236 is performed. In comparison operation S266, with respect to an image corresponding to a comparison target node for each comparison target node, a plurality of global label descriptors (a global label descriptor group) in an image and the plurality of localization descriptors (a localization descriptor group) may be compared with each other. Localization operation S200" may include operation s270 of selecting a node estimated as a current position among comparison target nodes after comparison operation S266 is performed.

In comparison operation S266, image feature distribution corresponding to a comparison target node may be generated based on types of a plurality of global label descriptors in an image corresponding to the comparison target node and a weight w of each type. In this case, a plurality of global label descriptors in an image corresponding to a comparison target node may include at least one of global label descriptors corresponding to a plurality of localization descriptors according to matching operation S231. Otherwise, this is because a node corresponding to a corresponding image is not capable of being selected as a comparison target.

In comparison operation S266, the localization image feature distribution may be compared with image feature distribution for each comparison target node to select a node with the highest similarity (S270). In comparison operation S26, a plurality of image feature distributions corresponding to a plurality of comparison target nodes according to one-to-one correspondence is generated based on the same type of label descriptors and, thus, even if the localization image feature distribution is generated in one type, the localization image feature distribution may be comparable with each image feature distribution. For example, it may not be required that localization image feature distribution compared with feature distribution of one image A is different from localization image feature distribution compared with feature distribution of another one image B. As such, it is not required to generate a plurality of localization image feature distributions and, thus, a time taken to generate localization image feature distribution may be reduced.

According to the third embodiment, a plurality of localization descriptors in a localization image may be substituted with global label descriptors respectively corresponding to localization descriptors to generate localization image feature distribution. Feature distribution of one image A may be generated based on the global label descriptor in image A, and feature distribution of another one image B may be generated based on the global label descriptor in image B. All of the localization image feature distribution, the feature distribution of image A, and the feature distribution of image B are generated based on the global label descriptor and, thus, the localization image feature distribution and image feature distribution may be compared with each other to compute similarity therebetween for each comparison target node.

Figure 28:
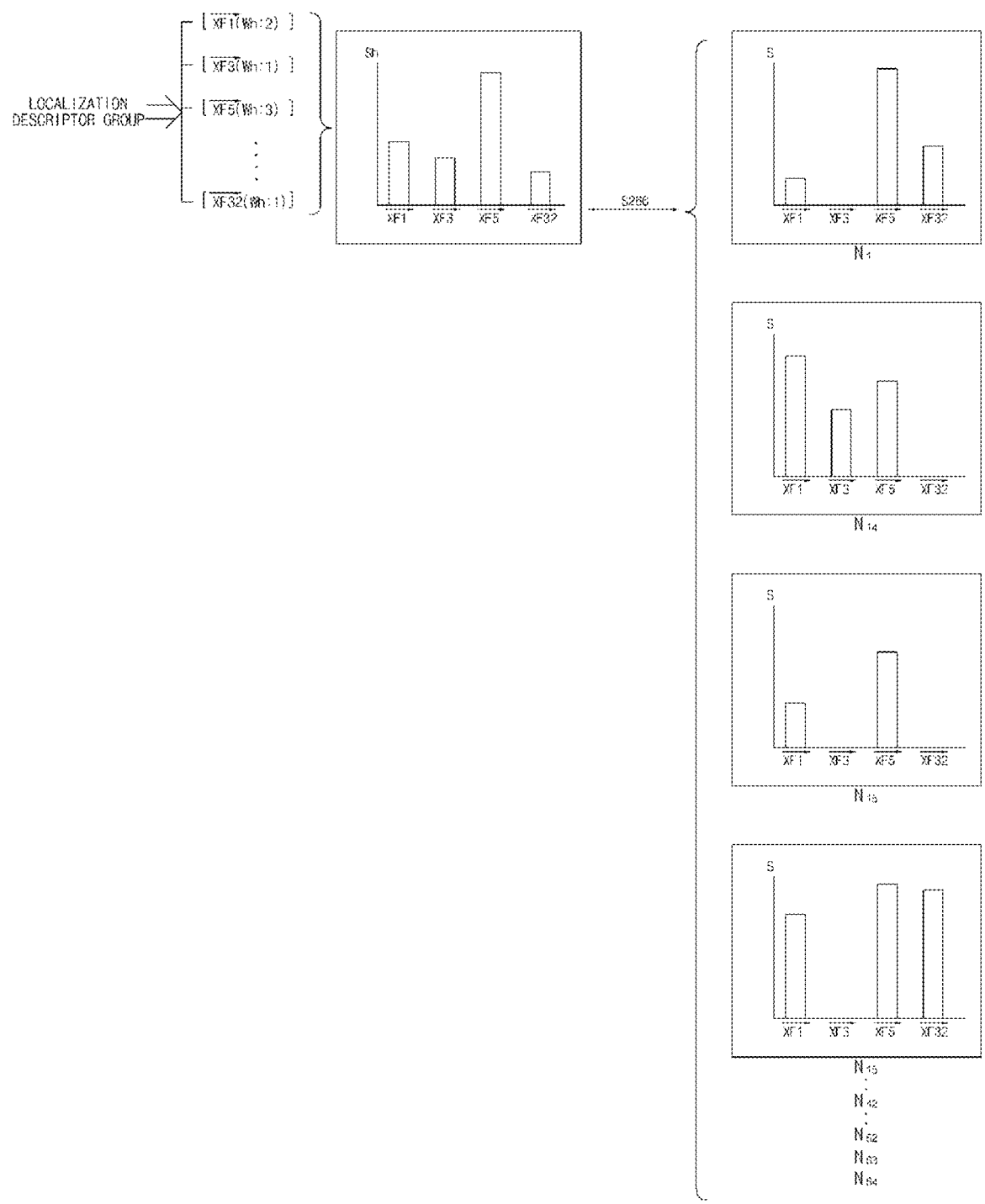
FIG. 28 is a diagram of a concept showing an example of comparison operation S266 of FIG. 13.

Referring to FIG. 28, a plurality of localization descriptors in the localization image may be respectively substituted with global label descriptors closest thereto among a plurality of global label descriptors. For example, $\vec{H1}$ and $\vec{H5}$, among localization descriptor $\vec{H1}, \vec{H2}, \vec{H3}, \ldots, \vec{H7}$ may each be substituted with $\vec{XF1}$ closest thereto among a plurality of global label descriptors $\vec{XF1}, \vec{XF2}, \vec{XF3}, \ldots, \vec{XFl}$ in the global zone X. In this case, the global label descriptor $\vec{XF1}$ may correspond to the localization descriptor $\vec{H1}$ and $\vec{H5}$, according to univalent correspondence. When a distance between a localization descriptor and a global label descriptor closest thereto is greater than a predetermined value, it may also be possible to exclude the corresponding localization descriptor and to generate localization image feature distribution based on only the remaining localization descriptor.

Referring to FIG. 28, the image feature distribution of one comparison target node may be expressed as a image feature distribution histogram using a type of each global label descriptor as a representative value (a value in the horizontal axis) and a score s3 computed based on a weight w for each type as a degree number (a value in the vertical axis).

The image feature distribution of one comparison target node may be expressed as an image feature distribution vector using a type of each global label descriptor as each dimension and a score s3 computed based on a weight w for each type as a value of each dimension. A plurality of image feature distribution vectors corresponding to a plurality of comparison target nodes (e.g., N1, N14, N15, N38, N45, N62, N63, and N64) according to one-to-one correspondence may be generated.

In image feature distribution of a comparison target node corresponding to one image 11, a score s3 of one global label descriptor $\overrightarrow{XF1}$ may be computed according to Equation 9 below.

$$s3 = \frac{w3}{\sum w} \times IDF3 \qquad \text{[Equation 9]}$$

Here, s3 is a score of one global label descriptor $\overrightarrow{XF1}$ in corresponding image feature distribution, w3 is a weight of the global label descriptor $\overrightarrow{XF1}$ in the corresponding image 11, $\Sigma w$ is the sum of weights of all global label descriptors in the corresponding image 11, and IDF3 is a value obtained by dividing the 'total number of images' in the global zone X by the 'number of images with the generated global label descriptor $\overrightarrow{XF1}$'.

Referring to FIG. 28, localization image feature distribution comparable with image feature distribution may be expressed as a localization image feature distribution histogram using types of a plurality of global label descriptors in a localization image as a representative value (a value in the horizontal axis) and a localization score sh computed based on a localization weight wh for each type as a degree number (a value in the vertical axis).

The localization image feature distribution comparable with the image feature distribution may be expressed as a localization image feature distribution vector using types of a plurality of global label descriptors in a localization image as each dimension and a localization score sh2 for each type as a value for each dimension. The localization image feature distribution vector comparable with the image feature distribution may be generated.

For example, in the localization image feature distribution, a localization score sh3 of one global label descriptor $\overrightarrow{XF1}$ may be computed according to Equation 10 below.

$$sh3 = \frac{wh3}{\sum wh} \times IDF3 \qquad \text{[Equation 10]}$$

Here, sh3 is a localization score of one global label descriptor $\overrightarrow{XF1}$ in a corresponding localization image, wh2 is a localization weight of the global label descriptor $\overrightarrow{XF1}$ in the corresponding localization image, $\Sigma wh$ is the sum of localization weights of all global label descriptors in a corresponding localization image, and IDF3 is a value obtained by dividing the 'total number of images' in the corresponding global zone X by the 'number of images with the generated global label descriptor $\overrightarrow{XF1}$' (which is the same as the definition of Equation 9).

Referring to FIG. 28, in comparison operation S266, image feature distribution for each comparison target node and localization feature distribution may be compared with each other to compute similarity therebetween. For example, the similarity may be computed according to Equation 11 using cosine similarity.

$$\cos\theta = \frac{\vec{X} \cdot \vec{Y}}{|\vec{X}| \times |\vec{Y}|} \qquad \text{[Equation 11]}$$

Here, $\cos\theta$ is a possibility that is similarity, $\vec{X}$ is an image feature distribution vector of one comparison target node, $\vec{Y}$ is a localization image feature distribution vector comparable with $|\vec{X}| \times |\vec{Y}|$ is a product of absolute values of two vectors, and $\vec{X} \cdot \vec{Y}$ is an inner product of two vectors.

Localization operation S200 may include operation s270 of selecting a node estimated as a current position among one or more comparison target nodes. Operation S266 and operation s270 may be referred to as last node selection operations S266 and S270. In last node selection operations S266 and S270, node information for each comparison target node and image information acquired at the current position may be compared with each other to select a node estimated as the current position.

In node selection operation S270, a node the highest similarity among similarities computed for each comparison target node may be selected as a node that corresponds to the current position according to univalent correspondence.

In Equations 3, 4, 6, 7, 9, and 10 above, a greater score s may be applied to a label descriptor generated based on a feature point that has a scarcity based on a value of IDF1, IDF2, or IDF3 to select (S250, S251, S256, and S270) a local zone, a great-local zone, or a node with higher reliability.

In Equations 3, 6, and 9, in order to compute greater scores s1, s2, s3 as weights w1, w2, and w3 of one label descriptor in feature distribution as a comparison target (local feature distribution, great-local feature distribution, or image feature distribution) is increased, a label descriptor with a great weight in feature distribution as a comparison target may be a main factor of localization.

In Equations 4, 7, and 10 above, in order to compute greater localization scores sh1, sh2, and sh3 as localization weights wh1, wh2, and wh3 of one label descriptor in localization image feature distribution are increased, a label descriptor with a great weight in the localization image feature distribution may be a main factor of localization.

In some embodiments, the mobile robot 100 may learn a map to localize a current position without classification of a local zone. With reference to FIGS. 12 and 13, as a third modification example of the third embodiment, a learning operation and a localization operation of the mobile robot 100 without operations S140 and S140' of classification of a local zone will be described below.

The learning operation according to the modification example of the third embodiment may be performed by operations obtained by excluding operations S140 and S140' and operation S150 from a flowchart of FIG. 12. The learning operation according to the modification example of the third embodiment may include operation S160 of generating a global label descriptor based on a plurality of descriptors without generation of a local label descriptor. Operation S160 may be referred to as label generation operation S160. In operation S160, all descriptors may be classified as a plurality of groups. In operation S160, descriptors in a global zone may be classified as a plurality of groups. In operation S160, a plurality of local label descriptors in a global zone may be classified as a plurality of groups according to a predetermined classification rule that will be described below. In operation S160, a global label descriptor representing descriptors classified as the same group may be generated. In operation S160, a global label descriptor may be generated based on descriptors classified as the same group according to a predetermined label rule that will be described below. Operation S160 may be performed after descriptor generation operation S120 is performed. Operation S160 may be lastly performed after the mobile robot 100 completes whole driving. In a state in which the mobile robot 100 completes whole driving, a current global zone may be determined based on driving and image acquisition operation S110 that has been performed so far. A global zone may be updated every driving and, thus, operation S160 may be performed in a state in which the mobile robot 100 completes whole driving.

The localization operation according to the modification example of the third embodiment may be performed by the same operations as the flowchart of FIG. 13 and may be the same as localization operation S200" according to the third embodiment.

With reference to FIG. 14, driving and image acquisition operation S110 and descriptor generation operation S120 will be described below in more detail.

In driving and image acquisition operation S110, the image acquisition unit 120 may acquire an image from each of points P1, P2, and P3 during driving of the mobile robot 100. The image may be captured toward an upper side of the mobile robot 100. The image may be captured by photographing a ceiling. The image shown in FIG. 14 may be an image corresponding to the point P3. The mobile robot 100 may generate the node N3 corresponding to the points P3, and the coordinate node D186 corresponding to the node N3 may be generated based on a driving displacement measured by the mobile robot 100. The image shown in FIG. 14 may be an image corresponding to the generated node N3.

In the image shown in FIG. 14, various feature points due to lightings positioned at a ceiling, an edge, a corner, a blob, a ridge, or the like may be checked. The mobile robot 100 may extract a feature point from the image. In the computer vision technology fields, various methods (feature detection) of extracting a feature point from an image are well known. Various feature detectors appropriate to extract these feature points are well known. For example, the feature detectors may include Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, Grey-level blobs detector, or the like.

Referring to FIG. 14, in descriptor generation operation S120, descriptors $\vec{F1}, \vec{F2}, \vec{F3}, \ldots, \vec{Fm}$ may be generated based on a plurality of feature points f1,f2,f3, . . . ,fm extracted from the plurality of acquired images (m being a natural number). A plurality of descriptors $\vec{F1}, \vec{F2}, \vec{F3}, \ldots, \vec{Fm}$ may correspond to a plurality of feature points f1,f2, f3, . . . ,fm according to one-to-one correspondence.

In FIG. 14, F, $\vec{F1}, \vec{F2}, \vec{F3}, \ldots, \vec{Fm}$ refers to an n-dimensional vector. f1(1), f1(2), f1(3), . . . , f1(n) in brace { } of $\vec{F1}$ refer to a value of each dimension configuring $\vec{F1}$. The remaining $\vec{F2}, \vec{F3}, \ldots, \vec{Fm}$ are indicated in the same way and, thus, a description thereof will be omitted.

A plurality of descriptors $\vec{F1}, \vec{F2}, \vec{F3}, \ldots, \vec{Fm}$ corresponding to a plurality of feature points f1,f2,f3, . . . ,fm may be generated using a scale invariant feature transform (SIFT) scheme for feature detection.

For example, the SIFT scheme may be applied to select feature points f1, f2, f3, f4, f5, f6, and f7 that are easily identified from an image and, then, a descriptor as an n-dimensional vector may be generated based on distribution feature (a direction in brightness change and a remarkable degree of change) of brightness gradient of pixels belonging to a predetermined area around each of the feature points f1, f2, f3, f4, f5, f6, and f7. Here, an n-dimensional vector (a descriptor) using a direction of brightness change of a feature point as each dimension and a remarkable degree of change in a direction of each brightness change as a value for each dimension may be generated. The SIFT scheme detects a feature that is not changed with respect to a scale, rotation, and brightness change of a photograph target and, thus, may detect a feature (i.e., a rotation-invariant feature) that is not changed even if the same region is photographed while changing a posture of the mobile robot 100. Needless to say, the present invention is not limited thereto and various other schemes (e.g., histogram of oriented gradient (HOG), Haar feature, Fems, local binary pattern (LBP), and modified census transform (MCT)) may also be applied.

Figure 15:
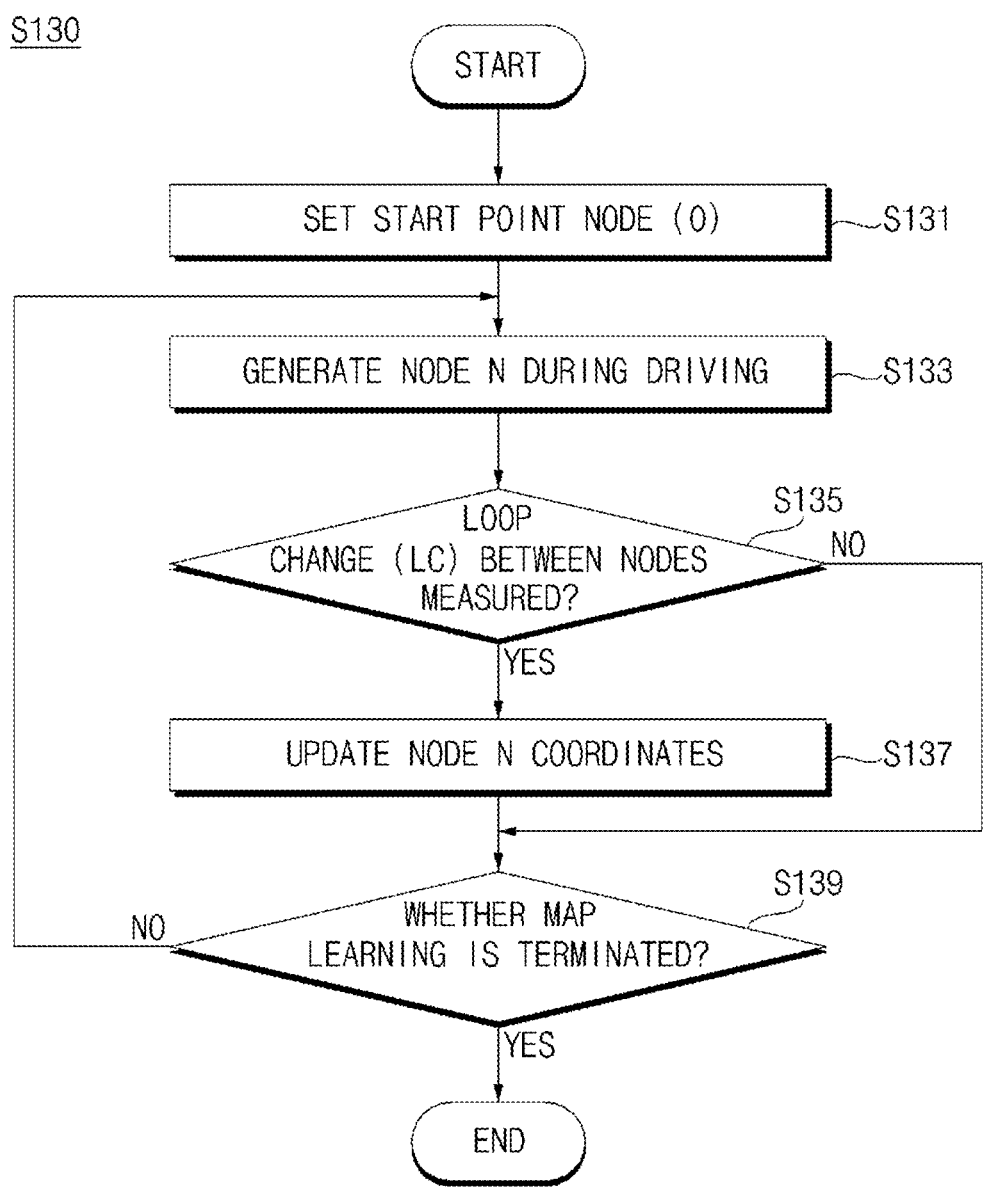
FIG. 15 is a flowchart showing node generation operation S130 of FIGS. 8, 10, and 12 in detail.
Figure 16:
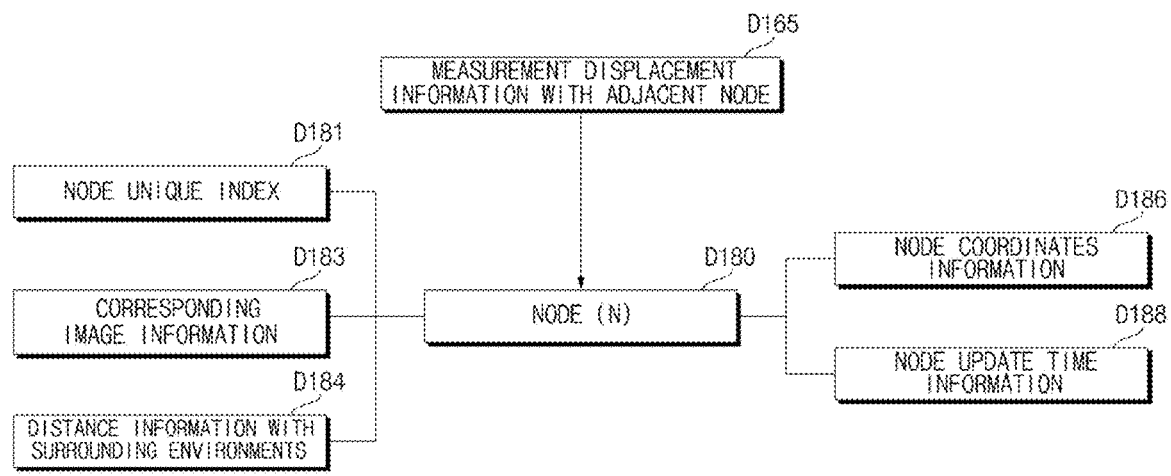
FIG. 16 is a block diagram showing configuration information of node N generated in FIG. 15 and information affecting information on the node N.
Figure 17:
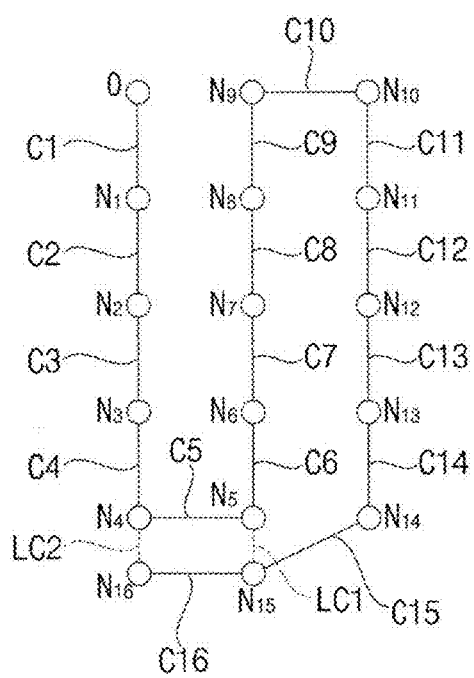
FIG. 17 is a diagram is a concept of a plurality of nodes N generated during movement of the mobile robot and displacement C between nodes in FIG. 15.

With reference to FIGS. 15 to 17, node generation operation S130 will be described below in more detail. A map of the mobile robot 100 may be generated based the node information D180. The node information D180 may be stored as data in the mobile robot 100.

Referring to FIG. 15, the learning operation may include operation S130 of setting the start point node O. The start point node O may be a reference point on a map. The node coordinate information D186 may be generated by adding a driving displacement to the start point node O. Even if the node coordinate information D186 is updated, the start point node O may not be changed.

The learning operation may include operation S133 of generating the node N during driving of the mobile robot 100 when operation S130 of setting the start point node O is performed. In operation S133, the mobile robot 100 may generate the node information D180.

The learning operation may include operation S135 of determining whether a loop constraint LC between nodes N is measured. In determination operation S135, when loop constraint LC is measured, operation S137 of updating the coordinate node D186 of the node N may be performed, and when loop constraint LC is not measured, operation S139 of determining whether map learning of the mobile robot 100 is terminated may be performed. In operation S139 of determining whether the map learning is terminated, when map learning is not terminated, operation S133 of generating node information may be re-performed during driving. FIG. 15 is a flowchart showing an embodiment and, an order of operation S133 of generating node information during driving and operation S135 of determining whether loop constraint LC between nodes is measured may be reversed, or operation S133 and operation S135 may be simultaneously performed.

Referring to FIG. 16, the node information D180 may include a node unique index D181 for identifying a node corresponding to the node information D180 among the plurality of pieces of node information D180.

The node information D180 may include the image information D183 corresponding to the corresponding node N. The corresponding image information D183 may correspond to an image acquired through the image acquisition unit 120 from a point in a driving area corresponding to the corresponding node N.

The node information D180 may include distance information with surrounding environments D184 in the corresponding node N. The distance information with surrounding environments D184 may be data of a distance measured at a point corresponding to the corresponding node N by the obstacle detection sensor 131.

The node information D180 may include the node coordinate information D186. The coordinate node D186 of the node N may be generated based on the start point node O and the driving displacement.

The node information D180 may include node update time information D188. The node update time information D188 may be data on a time point when the node information D180 is generated or updated. For example, when receiving the node information D180 with the same node unique index D181 as the previous node information D180 from the outside, the mobile robot 100 may determine whether the node information D180 is updated based on the node update time information D188. The node update time information D188 may facilitate determination of whether information is updated to the latest node information D180.

The node update time information D188 may be generated at a time point when the node information D180 is generated. In this case, the node unique index D181 of the generated node N2 may be generated. The image information D183 corresponding to the generated node N2 may be matched with the corresponding node N2. The distance information with surrounding environments D184 of the generated node N2 may be matched with the corresponding node N2 of the distance information with surrounding environments D184.

The node information D180 may be updated based on measurement displacement information with adjacent node D165. The measurement displacement information with adjacent node D165 may include data of the driving displacement. The measurement displacement information with adjacent node D165 may include loop constraint LC that will be described below. When the measurement displacement information with adjacent node D165 is input to the controller 140, the pre-stored node information D180 may be generated or updated.

Update of the node information D180 may be update of the node coordinate information and the node update time information D188. Update of the node information D180 may be update of the corresponding image information D183.

Referring to FIG. 17, a driving displacement C1 may be measured to generate the information D180 of the node N1 in a state in which the start point node O is set. Then, the driving displacement C2 may be added to the coordinate node D186 of the node N1 at a time point when the driving displacement C2 is measured to generate the coordinate node D186 of the node N2 that is an end point of the driving displacement C2. A driving displacement C3 may be measured to generate the information D180 of the node N3 in a state in which the information D180 of the node N2 is generated. As such, the information D180 of nodes N1, N2, N3, . . . ,N16 may be sequentially generated based on the driving displacements C1,C2,C3, . . . ,C16 that are sequentially measured.

When a node C15 that is a time point of one driving displacement C15 is defined as a 'basic node' of a node 16 that is an end point of the corresponding driving displacement C15, loop constraint LC may refer to a value obtained by measuring a displacement between one node N15 and other adjacent node N5, but not the 'basic node N14' of the node N15.

Figure 19:
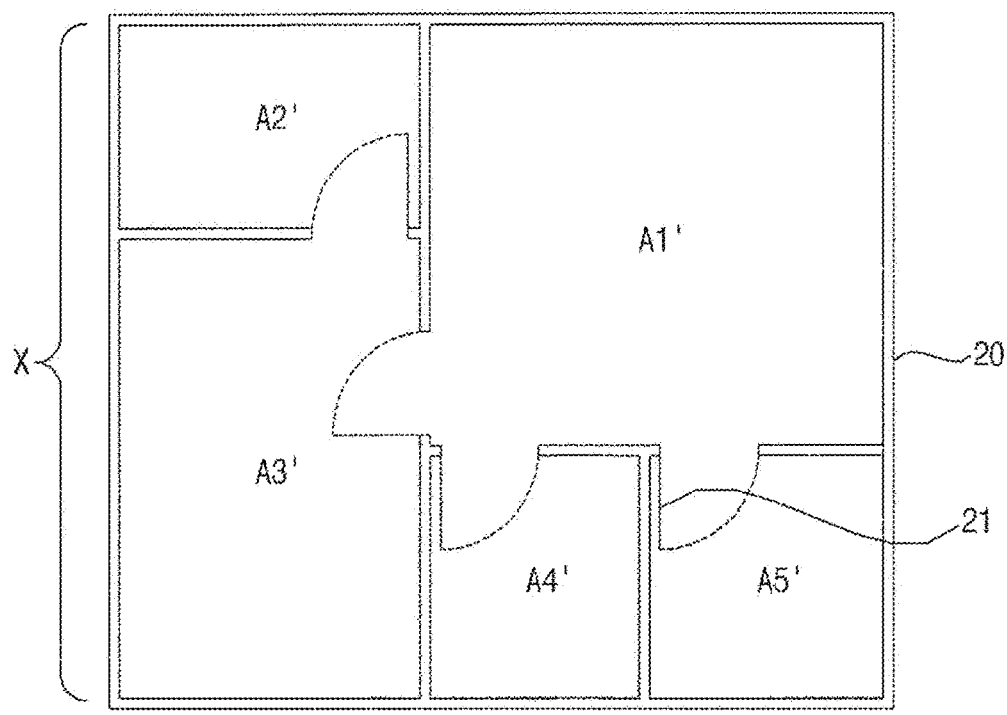
FIG. 19 is a diagram of a concept of a plurality of local zones A1', A2', A3', A4', and A5' classified according to another embodiment of local zone classification operation S140' of FIGS. 8, 10, and 12.

For example, the acquired image information D183 corresponding to one node N15 and the acquired image information D183 corresponding to another adjacent N5 may be compared with each other to measure loop constraint LC between two nodes N15 and N5. As another example, the distance information with surrounding environments D184 of one node N15 and the distance information with surrounding environments D184 of another adjacent node N5 may be compared with each other to measure loop constraint LC between two nodes N15 and N5. FIG. 19 shows an example of loop constraint LC1 measured between node N5 and node N15, and loop constraint LC2 measured between node N4 and node N16.

The information D180 of one node N5 generated based on the driving displacement may include the node coordinate information D186 and the image information D183 corresponding to the corresponding node N5. When there is another node N15 adjacent to the node N5, and the image information D183 corresponding to the node N15 and the image information D183 corresponding to the node N5 are compared, the loop constraint LC1 between two nodes N5 and N15 may be measured. When the 'the loop constraint LC1' and the 'displacement computed based on the coordinate node D186 of the pre-stored two nodes N5 and N15 are different, it deems that an error occurs in the node coordinate information D186 and the coordinate node D186 between the two nodes N5 and N15 may be updated. In this case, the coordinate node D186 of other nodes N6, N7, N8, N9, N10, N11, N12, N13, and N14 connected to the two nodes N5 and N15 may also be updated. In addition, the node coordinate information D186 that is updated one may also be repeatedly updated via the above operation.

This will be described below in more detail. The two nodes N for measuring the loop constraint LC may be defined as a first loop node and a second loop node. A difference ($\Delta x_1 - \Delta x_2$, $\Delta y_1 - \Delta y_2$, $\theta_1 - \theta_2$) between the 'computation displacement ($\Delta x_1$, $\Delta y_1$, $\theta_1$)' (which is computed by a difference between coordinate values), computed by the node coordinate information D186 of the pre-stored first loop node and the node coordinate information D186 of the second loop node and the loop constraint LC ($\Delta x_2$, $\Delta y_2$, $\theta_2$) may be generated. When the difference is generated, the node coordinate information D186 may be updated by considering the different as an error, and under the assumption that the loop constraint LC is a more accurate value than the computation displacement, the node coordinate information D186 may be updated.

When the node coordinate information D186 is updated, only the node coordinate information D186 of the first loop node and the second loop node may be updated, but the error occurs due to accumulation of driving displacements and, thus, the error may be distributed to also update the node coordinate information D186 of other nodes. For example, the error value may be distributed to all nodes generated by the driving displacement between the first loop node and second loop node to update the node coordinate information D186. Referring to FIG. 17, when the loop constraint LC1 is measured to compute the error, the error may be distributed to nodes N6 to N14 between the first loop node N15 and the second loop node N5 to slightly update the node coordinate information D186 of the nodes N5 to N15. Needless to say, such error distribution may be expanded to update the node coordinate information D186 of other nodes N1 to N4 therewith.

Figure 18:
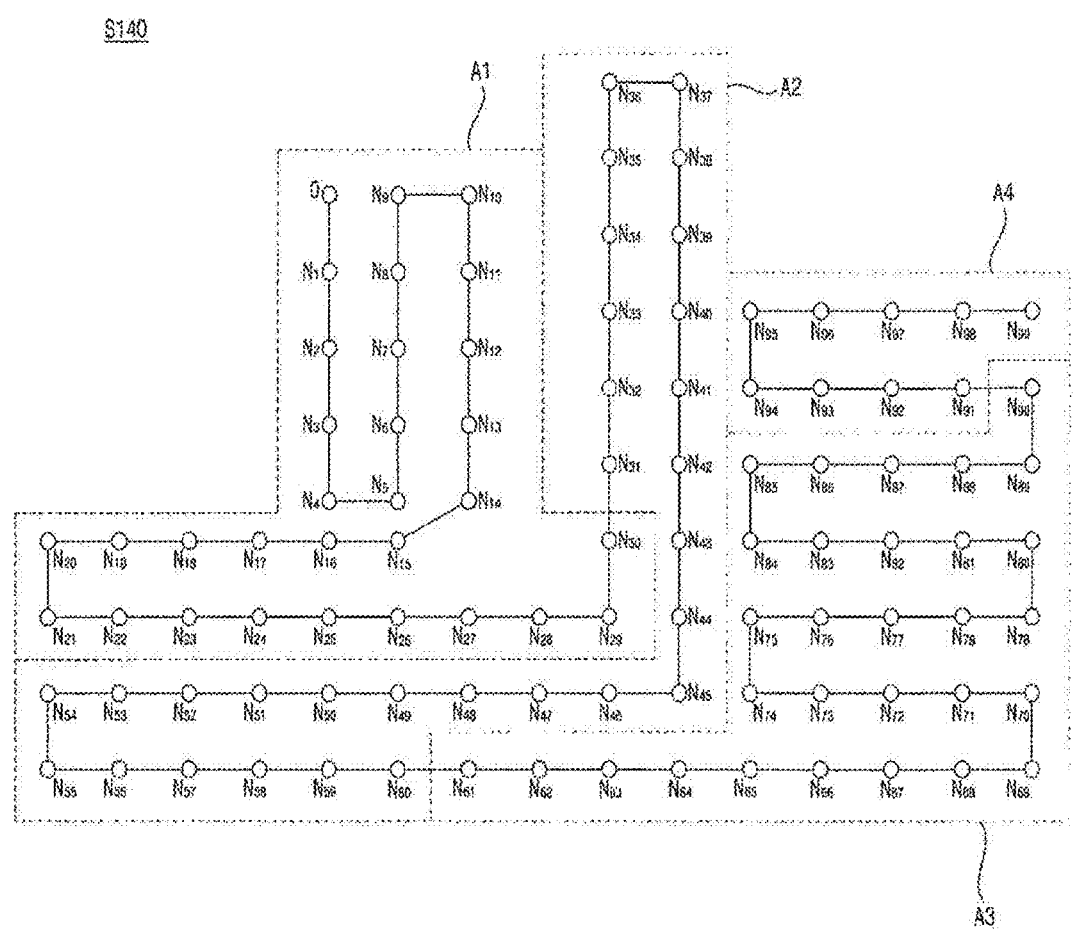
FIG. 18 is a diagram of a concept of a plurality of local zones A1, A2, A3, and A4 classified according to an embodiment of local zone classification operation S140 of FIGS. 8, 10, and 12.

Referring to FIGS. 18 and 19, a predetermined local zone classification condition or a predetermined great-local zone classification condition in local zone classification operations S140 and S140' will be described below in detail.

Referring to FIG. 18, in local zone classification operation S140 according to an embodiment, a predetermined local zone classification condition may be set based on the number of nodes. The local zone classification condition according to an embodiment may include a 'condition in which the number of continuously generated new nodes reaches "a"' (first condition). When the local zone classification condition according to an embodiment is satisfied, "a" new nodes that are additionally generated may be grouped and classified as one local zone. Here, "a" may be preset to a fixed natural value or may be preset to a natural value that is changed according to a predetermined reference.

For example, in the first condition, a=30 may be preset. When the number of continuously generated new nodes reaches 30, the local zone classification condition may be satisfied. When the local zone classification condition is satisfied, 30 new nodes that are additionally generated may be grouped and classified as one local zone. In detail, the nodes N1 to N30 may be grouped and classified as one local zone A1, the nodes N31 to N60 may be may be grouped and classified as one local zone A2, and the nodes N61 to N90 may be may be grouped and classified as one local zone A1.

The local zone classification condition according to an embodiment may further include a 'condition in which a newly generated node that is not grouped to a local zone is present in a first condition when driving is terminated' (second condition). When the first condition or the second condition is satisfied, the local zone classification condition according to an embodiment may be satisfied.

For example, when the mobile robot 100 sequentially generates the node N1 to the node N90, the first condition for classifying the three local zones A1, A2, and A3 may be satisfied. Then, when the mobile robot 100 sequentially generates the node N91 to the node N99 and driving is terminated in a state in which the first condition is not satisfied, the second condition may be satisfied and the newly generated nodes N91 to N99 may be grouped and classified as one local zone A4.

Although not shown in the drawings, when the mobile robot 100 generates a new node during driving and, then, begins to penetrate an already mapped area, an additional node may not be generated and, when the mobile robot 100 terminates penetration into the already mapped area, additional nodes may be generated. In this case, continuity on a map may disappear between first node groups that are newly generated before penetration into the already mapped area and second node groups that are newly generated after penetration into the already mapped area. The local zone classification condition according to an embodiment may include an exception condition for mapping the first node group and the second node group to other local zones even if the 'at least one node of the first node group' and 'at least one node of the second node group' are grouped and classified as the same local zone according to the first condition or the second condition.

Referring to FIG. 19, in local zone classification operation S140' according to another embodiment, a predetermined local zone classification condition may be set based on a division shape of a driving area. The local zone classification condition according to another embodiment may be a condition for classifying an area on a map corresponding to an actual area formed by dividing each room or the like as a local zone. The mobile robot 100 may recognize a wall 20 of each room and doors 21 to be closed or open in the driving area and may perform local zone classification operation S140' according to another embodiment. In the local zone classification operation S140' according to another embodiment, nodes may be grouped and classified as a local zone based on each room in the global zone X. FIG. 19 illustrates an example of a dividing shape of an actual driving area that is a reference of classification of local zones A1', A2', A3', A4', and A5' on the map.

Although not shown, in a local zone classification operation according to another first embodiment, a predetermined local zone classification condition may be set based on an area of a divided area. According to another first embodiment, the mobile robot 100 may divide the driving area into division regions with an area based on the predetermined reference and may group and classify nodes belonging to each division region as a local zone. For example, rectangular regions with almost the same size may be classified as a driving area, and the remaining region that is not the rectangular region may also be classified as regions with almost the same size as other region.

Although not shown, in a local zone classification operation according to another second embodiment, a predetermined local zone classification condition may be set based on a descriptor in an image corresponding to each node. According to another second embodiment, a local zone may be classified based on similarity based on a predetermined reference between images corresponding to the respective nodes. For example, when there is similarity with a predetermined value or greater based on descriptors in a first image corresponding to a first node and descriptors in a second image corresponding to a second node, the first node and the second node may be grouped as the same local zone.

Figure 20:
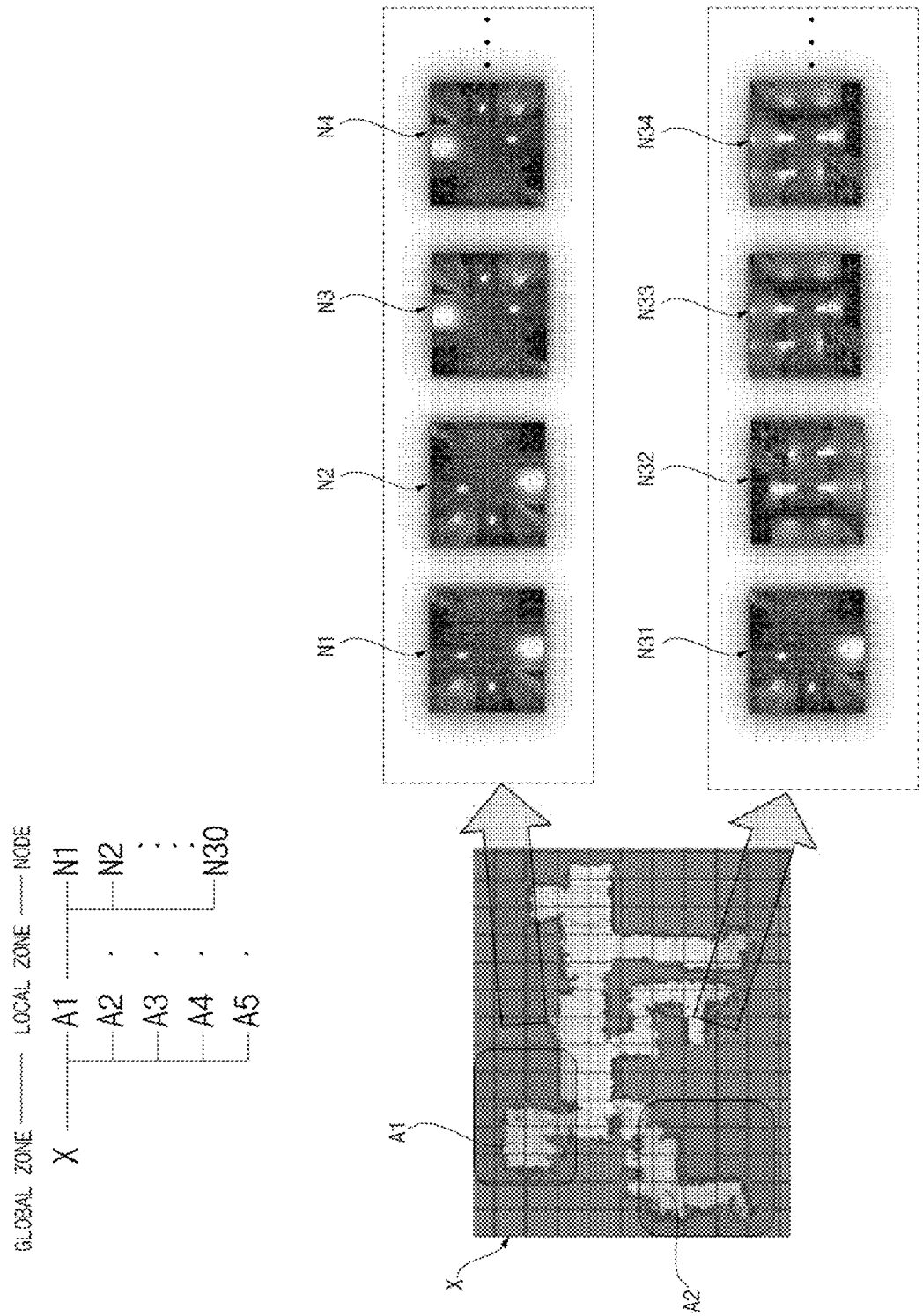
FIG. 20 illustrates an example of a plurality of local zones A1 and A2 classified according to local zone classification operations S140 and S140' of FIGS. 8, 10, and 12 and is a diagram of a concept of acquisition images that respectively correspond to a plurality of nodes N1, N2, N3, N4, . . . , N31, N32, N33, N34, . . . in each of local zones A1 and A2.

FIG. 20 illustrates an example of a relationship of the global zone X, a plurality of local zones A1 to A5 according to the predetermined local zone classification condition, and a plurality of nodes N1 to N30. FIG. 20 illustrates a plurality of images that correspond to a plurality of nodes according to one-to-one correspondence. A plurality of nodes (e.g., N1 to N30) may be grouped and classified as a local zone (e.g., A1). All local zones (e.g., A1 to A5) on a map may be summed and may be referred to as the global zone X. All nodes on the map may be summed and may be referred to as the global zone X.

Although not shown, a predetermined great-local zone classification condition will now be described. The great-local zone classification condition according to an embodiment may be set based on the number of local zones. The great-local zone classification condition according to an embodiment may include a 'condition in which the number of classified new local zones reaches "b"' (a first great-local zone condition). When the great-local zone classification condition according to an embodiment is satisfied, "b" new nodes that are additionally generated may be grouped and classified as one great-local zone. Here, "b" may be preset to a fixed natural value or may be preset to a natural value that is changed according to a predetermined reference.

For example, in the first great-local zone condition, b=5 may be preset. When the number of continuously classified new local zones reaches 5, the great-local zone classification condition may be satisfied. When the great-local zone classification condition is satisfied, 5 new local zones that are additionally generated may be classified as one local zone. In detail, the local zones A1 to A5 may be grouped and classified as one great-local zone X1.

The great-local zone classification condition according to an embodiment may further include a 'condition in which a newly classified local zone that is not grouped to a great-local zone is present in a first great-local zone condition when driving is terminated' (second great-local zone condition). When the first great-local zone condition or the second great-local zone condition is satisfied, the great-local zone classification condition according to an embodiment may be satisfied.

For example, when the mobile robot 100 generates local zones A1 to A15, the first great-local zone condition for classifying three great-local zones X1, X2, and X3 may be satisfied. Then, when the mobile robot 100 additionally classifies local zones A16 and A17 and additionally terminates driving in a state in which the first great-local zone condition is not satisfied, the second great-local zone condition may be satisfied and the newly classified local zones A16 and A17 may be grouped and classified as one great-local zone X4.

The mobile robot 100 may newly classify 'local zones'(a first local zone group) and 'other local zones' (a second local zone group) without continuity on a map. The great-local zone classification condition according to an embodiment may include a great-local zone exception condition for grouping the first local zone group and the second local zone group as different great-local zones even if 'at least one local zone of the first local zone group' and 'at least one local zone of the second local zone group' are grouped as the same great-local zone according to the first great-local zone condition or the second great-local zone condition.

The great-local zone classification condition according to another embodiment may be set based on whether a great-local zone is divided depending on the driving capability of the mobile robot. The divided area depending on the driving capability of the mobile robot 100 means that the local zone is divided in such a way that the mobile robot 100 is not capable of moving from one area to another area. For example, two indoor spaces that are completely separate based on a moving line may be classified as two great-local zones, respectively. For example, despite the same indoor space, the great-local zone may be classified based on each layer of the global zone X.

A plurality of local zones (e.g., A1 to A5) may be grouped and classified as the great-local zone X1. All great-local zones on a map may be summed and may be referred to as the global zone X.

It may not be required that the present invention is limited to the above example, and a local zone or a great-local zone may be classified using various well-known methods.

With reference to FIGS. 21 to 24, label descriptor generation operations S150, S156, and S160 will be described in more detail. In detail, a description is given based on local label descriptor generation operation S150 and global label descriptor generation operation S160 according to the third embodiment, which may also be modified and applied to great-local label descriptor generation operation S156 according to the third embodiment within an obvious range.

In label descriptor generation operations S150, S156, and S160, the predetermined classification rule may include a rule for classifying a plurality of descriptors based on a distance between the descriptors and grouping descriptors with a relatively adjacent distance as the same group. Here, the relatively adjacent distance refers the case in which an average distance between descriptors in one group G1 classified according to the classification rule is smaller than an average distance between descriptors that belong to the different groups G1 and G2, respectively. The classification rule may include a first predetermined classification rule and/or a second predetermined classification rule that will be described below.

In label descriptor generation operations S150, S156, and S160, the predetermined label rule may include a rule for labeling a representative value computed based on descriptors classified as the same group according to the classification rule, as a label descriptor. According to an embodiment, the representative value may be an average value classified as the same group. According to another embodiment, the representative value may be an intermediate value of the descriptors classified as the same group. According to another embodiment, the representative value may be a value obtained by subtracting a 'correction value' from the 'average value or intermediate value' according to predetermined reference. The label rule may include a first predetermined label rule and/or a second predetermined label rule that will be described below.

Figure 21:
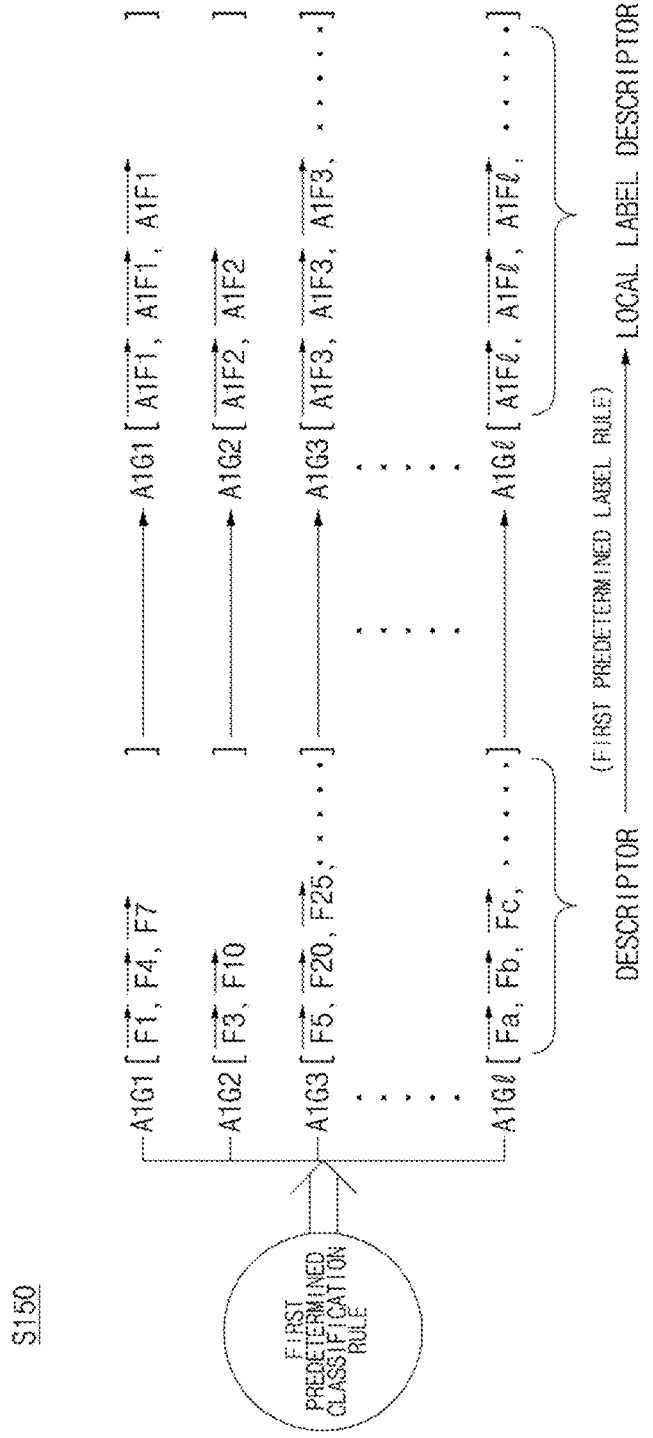
FIG. 21 is a diagram of a concept showing local label descriptor generation operation S150 shown in FIGS. 8, 10, and 12 in detail.

Referring to FIG. 21, the first predetermined classification rule may include a rule for classifying a plurality of descriptors in the local zone A1 based on a distance between the descriptors and grouping descriptors with a relatively adjacent distance as the same group A1G1, A1 G2, A1G3, . . . , A1Gl (l being a natural number).

Referring to FIG. 21, the first predetermined label rule may include a rule for labeling a representative value computed based on descriptors $\vec{F1}$, $\vec{F4}$, $\vec{F7}$ classified as the same group A1G1 according to the first predetermined classification rule, as a local label descriptor $\overrightarrow{A1F1}$.

Figure 22:
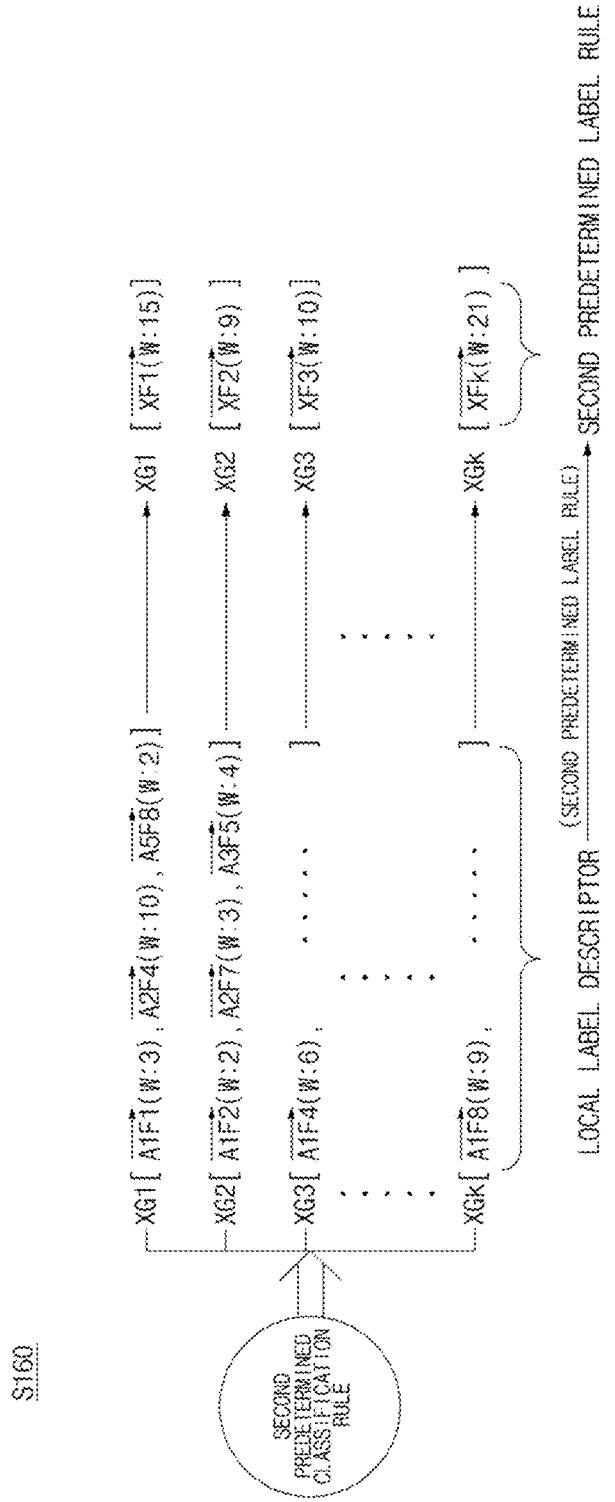
FIG. 22 is a diagram of a concept showing global label descriptor generation operation S160 of FIG. 12 in detail.

Referring to FIG. 22, the second predetermined classification rule may include a rule for classifying a plurality of local label descriptors in the global zone X based on a distance between local label descriptors and grouping local label descriptors with a relatively adjacent distance as the same group XG1, XG2, XG3, . . . , XGk (k being a natural number).

Referring to FIG. 22, the second predetermined label rule may include a rule for labeling a representative value computed based on local label descriptors ($\overrightarrow{A1F1}$. of weight 3, $\overrightarrow{A2F4}$ of weight 10, and $\overrightarrow{A5F8}$ of weight 2) classified as the same group XG1 according to the second predetermined classification rule, as a global label descriptor.

In FIG. 21, A1G1, A1G2, A1G3, . . . , A1Gl show respective groups grouped by classifying a plurality of descriptors in the local zone A1 according to the first predetermined classification rule. At least one descriptor classified as the same group is indicated in a square bracket [ ]. For example, descriptors classified as one group A1G1 may be $\vec{F1}, \vec{F4}, \vec{F7}$. The remaining A1G2, A1G3, . . . , A1Gl are indicated in the same way and, thus, a description thereof will be omitted.

Figure 23:
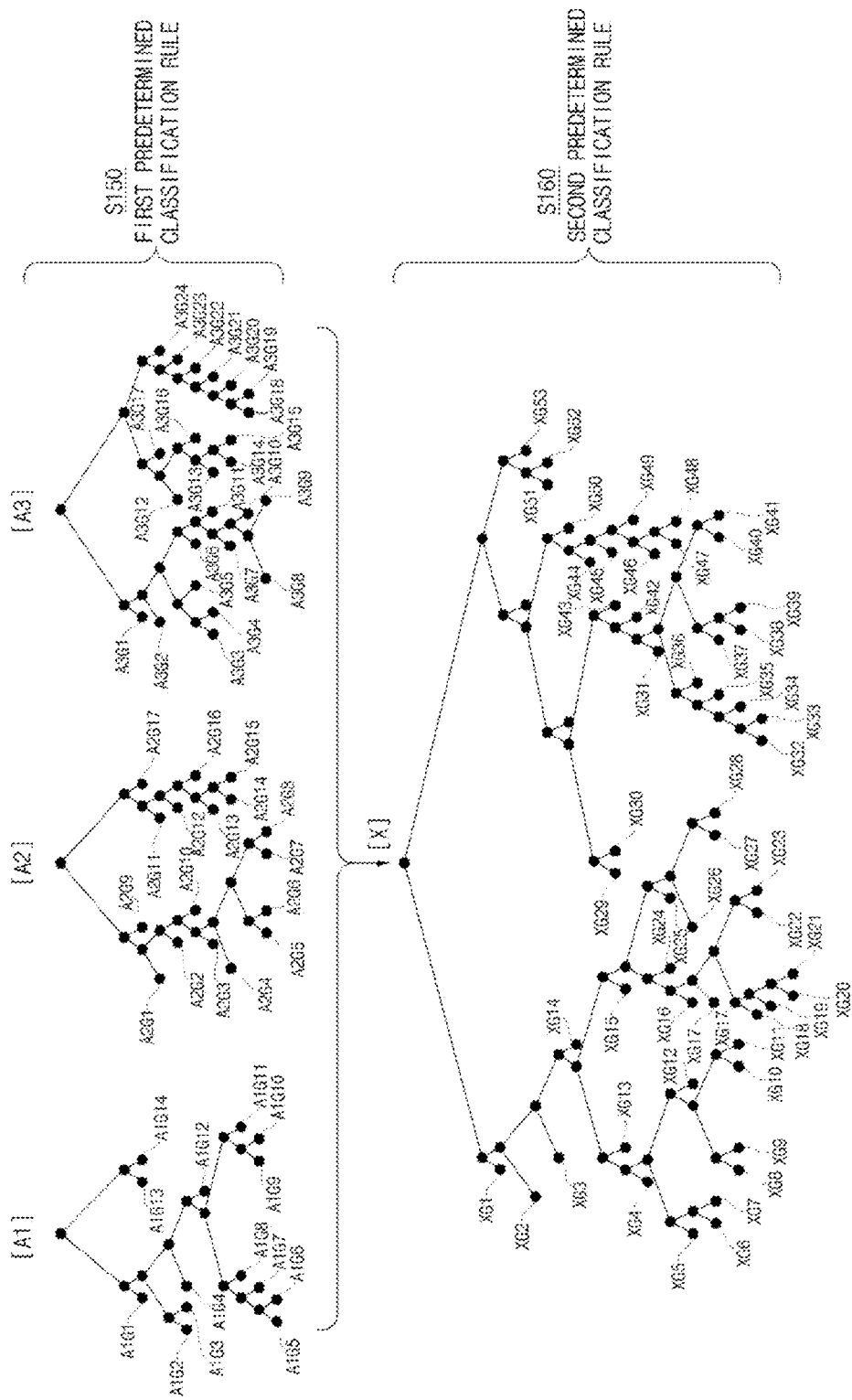
FIG. 23 is a diagram of a concept showing an embodiment of the first predetermined classification rule of FIG. 21 and an embodiment of the second predetermined classification rule of FIG. 22.

FIG. 23 shows operation S150 of classifying a plurality of descriptors in a local zone as a plurality of groups based on a first predetermined classification rule according to an embodiment. FIG. 23 shows a tree structure that extends downward using a method of indicating lines branched to two lines from one dot and indicating a dot at a lower end of each line. The diagram in which one dot is divided downward into two dots in the tree structure of operation S150 shows an 'operation of dividing a plurality of descriptors into two groups' (a dividing operation). Dots A1G1 to A1G14, A2G1 to A2G17, and A3G1 to A3G24 included in lower ends in the tree structure of operation S150 indicate groups obtained by lastly dividing a plurality of descriptors according to the first predetermined classification rule.

An operation of classifying a plurality of descriptors in a local zone as a plurality of groups based on the first predetermined classification rule according to an embodiment may include the dividing operation. In the dividing operation, a plurality of descriptors as a division target may be defined as a 'head group' and two groups classified as two branches may be defined as a 'branch group'. The two branch groups generated in one dividing operation may each be the head group in a next dividing operation. In the present embodiment, the case in which the dividing operation is performed once to divide one head group into two branch groups has been described, but the dividing operation may be performed once to divide one head group into three or more branch groups.

In the dividing operation, a head group may be divided into k1 branch groups based on a distance between a plurality of descriptors in the head group (k1 being a natural number equal to or greater than 2). Hereinafter, one dividing operation will be described in detail. The dividing operation may include a primary temporary operation of arbitrarily selecting k1 descriptors among a plurality of descriptors in a head group and grouping the remaining descriptors the head group, which are not selected, along with a descriptor closest thereto in terms of a distance among the k1 selected descriptors to generate k1 'primary temporary groups'. The dividing operation may include a secondary temporary operation of computing a primary average value of descriptors in each primary temporary group and grouping descriptors matched with the same primary average value to generate k1 'secondary temporary groups' under the assumption that all descriptors in a head group are matched with a primary average value closest thereto in terms of a distance among k1 primary average values, after the primary temporary operation is performed. The dividing operation may include primary to mth temporary operations (m being a natural number equal to or greater than 2). The dividing operation may include an mth temporary operation of computing an (m−1)th average value of descriptors in each (m−1)th temporary group and grouping descriptors matched with the same (m−1)th average value to generate k1 'secondary temporary groups' under the assumption that all descriptors in a head group are matched with a (m−1)th average value closest thereto in terms of a distance among k1 (m−1)th average values, after the (m−1)th temporary operation is performed. As the temporary operation is repeatedly performed to an mth turn from a primary turn, grouping of descriptors may converge to one form, and k1 mth temporary groups generated after an mth temporary operation may be k1 branch groups.

The first predetermined classification rule according to an embodiment may include a 'basic rule' for repeatedly performing the dividing operation k2 times in total on a plurality of descriptors in one local zone, and an 'exception rule' for precluding the dividing operation of classifying the branch group as a head group from proceeding any longer when the number of descriptors in one branch group is equal to or less than k3 (k2 and k3 being a natural number). For example, the first predetermined classification rule may include a basic rule with n=9 and an exception rule with m=1. According to the basic rule, the dividing operation may be performed on one head group to generate two branch groups, and the dividing operation may be repeatedly performed using the generated branch group as a head group. When the number of descriptors in the branch group is equal to less than m, the dividing operation using the branch group as a head group may not be performed any longer according to the exception rule irrespective of the basic rule.

In FIG. 23, based on the first predetermined classification rule according to an embodiment, a plurality of descriptors in local zone A1 may be classified as a plurality of groups A1G1 to A1G14, a plurality of descriptors in local zone A2 may be classified as a plurality of groups A2G1 to A2G17, and a plurality of descriptors in local zone A3 may be classified as a plurality of groups A3G1 to A3G24.

Although not shown in the drawings, the first predetermined classification rule according to another embodiment may include a rule of classifying descriptors with a distance therebetween of a predetermined value ST1 or less as the same group.

In FIG. 21, $\overrightarrow{A1F1}, \overrightarrow{A1F2}, \overrightarrow{A1F3}, \ldots, \overrightarrow{A1Fl}$ indicate local label descriptors generated according to the first predetermined label rule. The local label descriptor may be generated according to the first predetermined label rule based on a plurality of descriptors classified as the same group according to the first predetermined classification rule. For example, a local label descriptor $\overrightarrow{A1F1}$ of a weight 3 may be generated according to the first predetermined label rule based on a plurality of descriptor $\vec{F1}, \vec{F4}, \vec{F7}$ in one group A1G1. In terms of another aspect, it deems that the plurality of descriptors $\vec{F1}, \vec{F4}, \vec{F7}$ are each converted into a local label descriptor $\overrightarrow{A1F1}$. according to the first predetermined label rule. Each local label descriptor with each weight may be generated according to the first predetermined label rule based on descriptors in the remaining groups A1G2, A1 G3, . . . , A1Gl.

Figure 24:
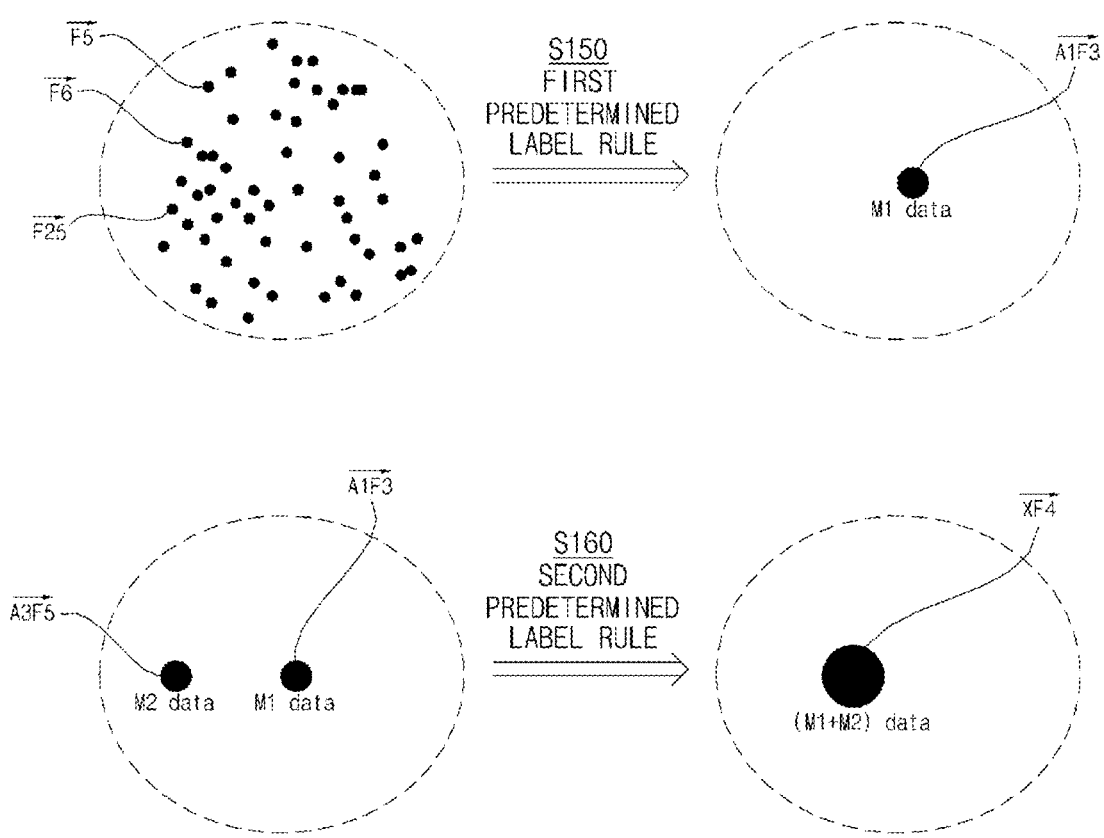
FIG. 24 is a diagram of a concept showing an embodiment of the first predetermined label rule of FIG. 21 and an embodiment of the second predetermined label rule of FIG. 2

FIG. 24 illustrates operation S150 of generating a local label descriptor (A1F3) with a weight M1 based on a plurality of descriptors based on the first predetermined label rule according to an embodiment (M1 being a natural number). The first predetermined label rule may include a rule using an average value of at least one descriptor classified as the same group as a local label descriptor.

In FIG. 22, XG1, XG2, XG3, . . . , XGk illustrates each group obtained by classifying all local label descriptors in the global zone X according to the second predetermined classification rule. At least one local label descriptor classified as the same group is indicated in a square bracket '[ ]'. A weight w of each local label descriptor is indicated in a right parenthesis '( )' of each local label descriptor. For example, local label descriptors classified as one group XG1 may indicate $\overrightarrow{A1F1}$. of a weight 3, $\overrightarrow{A2F4}$ of a weight 10, and $\overrightarrow{A5F8}$ of weight 2. $\overrightarrow{A1F1}$. may indicate any one of local label descriptors of the local zone A1, $\overrightarrow{A2F4}$ may indicate any one of local label descriptors of the local zone A2, $\overrightarrow{A5F8}$ may indicate any one of local label descriptors of the local zone A5. The remaining XG2, XG3, . . . , XGk are indicated in the same way and, thus, a description thereof will be omitted.

FIG. 23 shows operation S160 of classifying all local label descriptors in the global zone X as a plurality of groups based on the second predetermined classification rule according to an embodiment. As described above, in FIG. 23, a description of a tree structure with a dot and two branched lines is the same as the above description. The diagram in which two dots are branched downward from one dot in the tree structure of operation S160 indicates an 'operation of dividing a plurality of local label descriptors into two groups' (a global dividing operation or a global dividing process). Dots XG1 to XG53 included in lower ends in the tree structure of operation S160 indicate groups obtained by lastly dividing a plurality of local label descriptors according to the second predetermined classification rule.

An operation of classifying a plurality of local label descriptors in a global zone as a plurality of groups based on the second predetermined classification rule according to an embodiment may include the global dividing operation. In the global dividing operation, a plurality of local label descriptors as a division target may be defined as a 'global head group' and two groups classified as two branches may be defined as a 'global branch group'. The two global branch groups generated in one global dividing operation may each be the global head group in a next global dividing operation. According to the present embodiment, although the case in which one global head group is divided into two global branch groups through one global dividing operation has been described, it may be possible to divide one global head group into three or more global branch groups through one global dividing operation.

In the global dividing operation, the global head group may be divided into g1 global branch groups based on a distance between a plurality of local label descriptors in the global head group (g1 being a natural number equal to or greater than 2). Hereinafter, one global dividing operation will be described in detail. The global dividing operation may include a primary global temporary operation of arbitrarily selecting g1 local label descriptors among a plurality of local label descriptors in a global head group, and grouping the remaining local label descriptors in the global head group, which are not selected, along with a descriptor closest thereto in terms of a distance among the g1 selected descriptors to generate g1 'primary global temporary groups'. The global dividing operation may include a secondary global temporary operation of computing a primary average value of local label descriptors of each primary global temporary group and grouping local label descriptors matched with the same primary average value to generate g1 'secondary global temporary groups' under the assumption that all local label descriptors in the global head group are matched with a primary average value closest thereto in terms of a distance among g1 primary average values, after the primary global temporary operation is performed. The global dividing operation may include primary to mth global temporary operations (m being a natural number equal to or greater than 2). The global dividing operation may include an mth global temporary operation of computing an (m−1)th average value of local label descriptors in each (m−1)th global temporary group and grouping descriptors matched with the same (m−1)th average value to generate g1 'secondary (m−1)th global temporary group' under the assumption that all local label descriptors in the global head group are matched with a (m−1)th average value closest thereto in terms of a distance among g1 (m−1)th average values, after the (m−1)th global temporary operation is performed. As the global temporary operation is repeatedly performed to an mth turn from a primary turn, grouping of local label descriptors may converge to one form, and g1 mth global temporary group generated after an mth global temporary operation may be g1 global branch groups.

The second predetermined classification rule according to an embodiment may include a 'basic rule' for repeatedly performing the global dividing operation k2 times in total on a plurality of local label descriptors in one local zone, and an 'exception rule' for precluding the global dividing operation of classifying the global branch group as a global head group from proceeding any longer when the number of local label descriptors in one global branch group is equal to or less than g3 (g2 and g3 being a natural number). For example, the second predetermined classification rule may include a basic rule with n=14 and an exception rule with m=1. According to the basic rule, the global dividing operation may be performed on one global head group to generate two global branch groups, and the global dividing operation may be repeatedly performed using the generated global branch group as a global head group. When the number of local label descriptors in the global branch group is equal to or less than m, the global dividing operation may not be performed any longer according to the exception rule irrespective of the basic rule.

In FIG. 23, based on the second predetermined classification rule according to an embodiment, a plurality of descriptors in the global zone X may be classified as a plurality of groups XG1 to XG53.

Although not shown in the drawings, the second predetermined classification rule according to another embodiment may include a rule of classifying local label descriptors with a distance therebetween of a predetermined value ST2 or less as the same group.

In FIG. 22, $\overrightarrow{XF1}, \overrightarrow{XF2}, \overrightarrow{XF3}, \ldots \overrightarrow{XFk}$ indicate global label descriptors generated according to the second predetermined label rule (k being a natural number). The global label descriptor may be generated according to the second predetermined label rule based on a plurality of local label descriptors classified as the same group according to the second predetermined classification rule. For example, a global label descriptor $\overrightarrow{XF1}$ of a weight 15 may be generated according to the second predetermined label rule based on a plurality of local label descriptors ($\overrightarrow{A1F1}$ of a weight 3, $\overrightarrow{A2F4}$ of a weight 10, and $\overrightarrow{A5F8}$ of a weight 2) in one group XG1. In terms of another aspect, it deems that the plurality of local label descriptors ($\overrightarrow{A1F1}$ of a weight 3, $\overrightarrow{A2F4}$ of a weight 10, and $\overrightarrow{A5F8}$ of a weight 2) each converted into a global label descriptor according to the second predetermined label rule. The remaining XG2, XG3, . . . , XGk groups are indicated in the same way and, thus, a description thereof will be omitted.

FIG. 24 illustrates operation S160 of generating a global label descriptor $\overrightarrow{XF4}$ of a weight M1+M2 based on a plurality of local label descriptors (($\overrightarrow{A1F3}$) of a weight M1 and $\overrightarrow{A5F8}$ of a weight M2) according to the second predetermined label rule in an embodiment (M1 and M2 being a natural number). The second predetermined label rule may include a rule using an average value of at least one local label descriptor classified as the same group as a local label descriptor. In this case, the average value may be computed in consideration of a weight of each local label descriptor according to Equation 12 below.

$$\vec{X} = \frac{M1 \cdot \vec{X1} + M2 \cdot \vec{X2} + M3 \cdot \vec{X3} + \ldots + Mx \cdot \vec{Xx}}{M1 + M2 + M3 + \ldots + Mx}$$ [Equation 12]

Here, $\vec{X}$ is a global label descriptor, $\vec{X1}, \vec{X2}, \vec{X3}, \ldots, \vec{Xx}$ are respective local label descriptors, M1, M2, M3, ..., Mx are respective weights of $\vec{X1}, \vec{X2}, \vec{X3}, \ldots, \vec{Xx}$, and A weight of $\vec{X}$ is 1+M2+M3+ . . . +Mx.

While learning initial operations S110, S120, and S130 are performed, first label generation operations S150 and S151 may begin to be performed. In detail, while learning initial operations S110, S120, and S130 are performed, if at least one local zone A1 is classified in the local zone classification operation, first label generation operations S150 and S151 of generating the local label descriptor of the local zone A1 may be performed. As such, after driving is wholly terminated, a time period taken to completely generate the great-local label descriptor or the global label descriptor may be reduced and, thus, learning operations S100' and S100" may be advantageously and effectively performed.

With reference to FIG. 25, acquisition operation S210 of a localization image and generation operation S220 of a localization descriptor will be described below in more detail.

Due to occurrence of a jumping case, when a current point Pu of the mobile robot 100 is in an unknown state, acquisition operation S210 of a localization image may begin. The image acquisition unit 120 may acquire the localization image at the unknown current point Pu. The localization image may be captured via photograph upward based on the mobile robot 100. The localization image may be captured by photographing a ceiling. An image shown in FIG. 25 may be a localization image corresponding to the current point Pu.

Referring to FIG. 25, in localization descriptor generation operation S220, a plurality of localization descriptors $\vec{H1}, \vec{H2}, \vec{H3}, \ldots, \vec{H7}$ may be generated based on a plurality of localization feature points h1,h2,h3, . . . ,h7 extracted from the localization image. The plurality of localization descriptors $\vec{H1}, \vec{H2}, \vec{H3}, \ldots, \vec{H7}$ may correspond to the localization feature points h1,h2,h3, . . . ,h7 according to one-to-one correspondence.

In FIG. 25, $\vec{H1}, \vec{H2}, \vec{H3}, \ldots, \vec{H7}$ may refer to an n-dimensional vector. h1(1), h1(2), h1(3), . . . ,h1(n) which are indicated in a brace { } of refer to a value of each dimension configuring $\vec{H1}$. The remaining $\vec{H2}, \vec{H3}, \ldots, \vec{H7}$ are indicated in the same way and, thus, a description thereof will be omitted.

A plurality of localization descriptors $\vec{H1}, \vec{H2}, \vec{H3}, \ldots, \vec{H7}$ corresponding to a plurality of localization feature points h1,h2,h3, . . . ,h7 may be generated using the SIFT scheme for feature detection. In the computer vision technology fields, a description of various methods of extracting a feature point from an image and various feature detectors appropriate to extract these feature points is the same as the above description.

Figure 26:
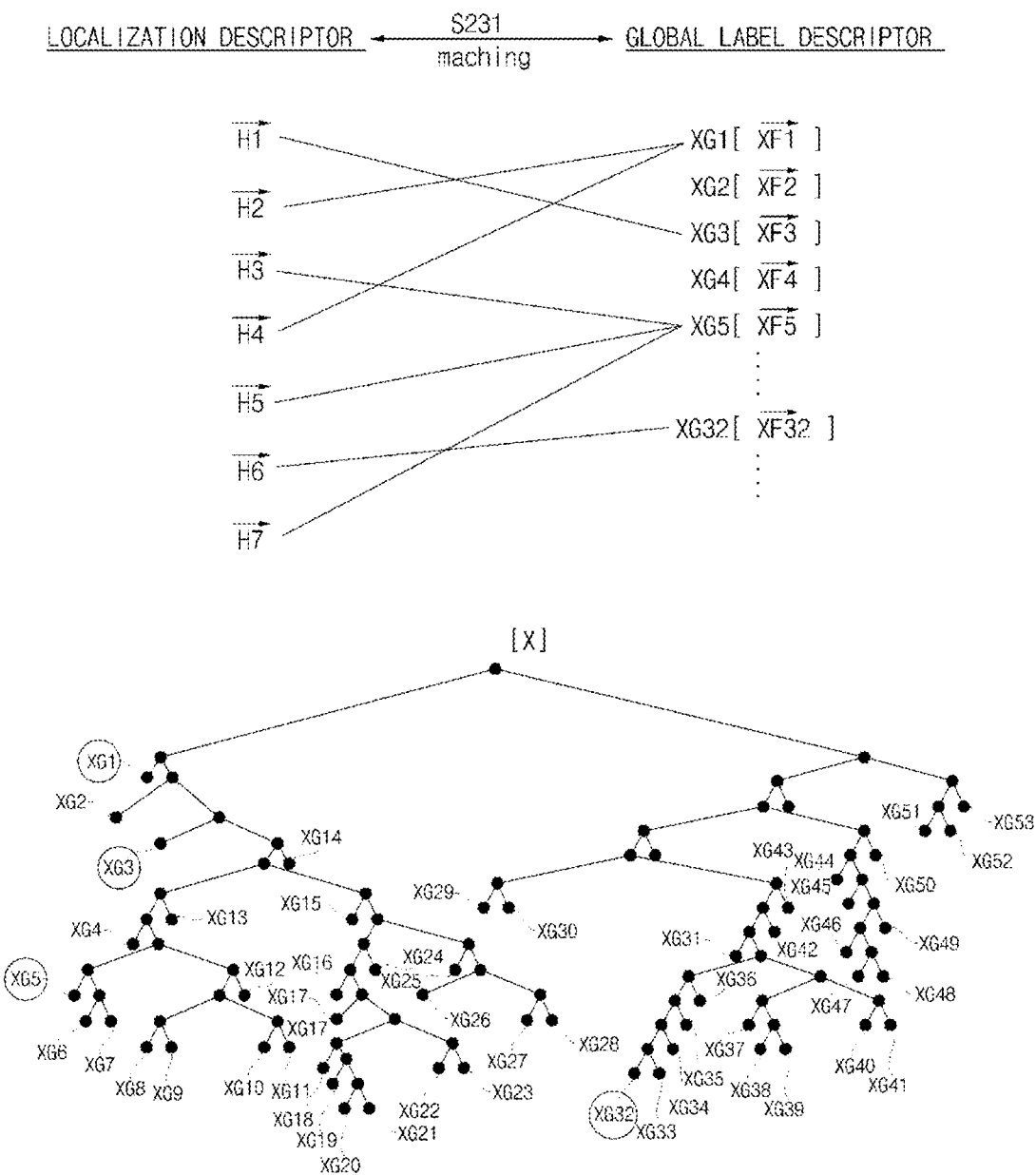
FIG. 26 is a diagram of a concept of an example of matching operation S231 of FIG. 13.

With reference to FIG. 26, matching operation S231 will be described in more detail. In matching operation S231, a global label descriptor closest to a localization descriptor in terms of a distance may be matched with a plurality of localization descriptors $\vec{H1}, \vec{H2}, \vec{H3}, \ldots, \vec{H7}$ in the localization image. In FIG. 25, a correspondence relationship between the localization descriptor and the global label descriptor is indicated as a matching line. When matching operation S231 is performed, a plurality of global label descriptors $\vec{XF1}, \vec{XF2}, \vec{XF3}, \ldots \vec{XF53}$ may correspond to a plurality of localization descriptors $\vec{H1}, \vec{H2}, \vec{H3}, \ldots, \vec{H7}$ according to univalent correspondence.

For example, a global label descriptor closest to a localization descriptor $\vec{H1}$ in terms of a distance may be $\vec{XF3}$ and the global label descriptor $\vec{XF3}$ may correspond to the localization descriptor $\vec{H1}$. A global label descriptor closest to a localization descriptor $\vec{H2}, \vec{H4}$ in terms of a distance may be $\vec{XF1}$, and the global label descriptor $\vec{XF1}$ may correspond to the localization descriptor $\vec{H2},\vec{H4}$. A global label descriptor closest to a localization descriptor $\vec{H3},\vec{H5},\vec{H7}$ in terms of a distance may be $\vec{XF5}$ and the global label descriptor $\vec{XF5}$ may correspond to the localization descriptor $\vec{H3},\vec{H5},\vec{H7}$. A global label descriptor closest to a localization descriptor $\vec{H6}$ may be $\vec{XF32}$, and the global label descriptor $\vec{XF32}$ may correspond to the localization descriptor $\vec{H6}$. In this case, a global label descriptor matched with a plurality of localization descriptors $\vec{H1}, \vec{H2}, \vec{H3}, \ldots, \vec{H7}$ among all global label descriptors in the global zone X may be $\vec{XF1}, \vec{XF3}, \vec{XF5}, \vec{XP32}$. In FIG. 26, groups XG1, XG3, XG5, and XG32 that are based to generate the matched global label descriptors $\vec{XF1}, \vec{XF3}, \vec{XF5}, \vec{XP32}$ may be marked.

Figure 27:
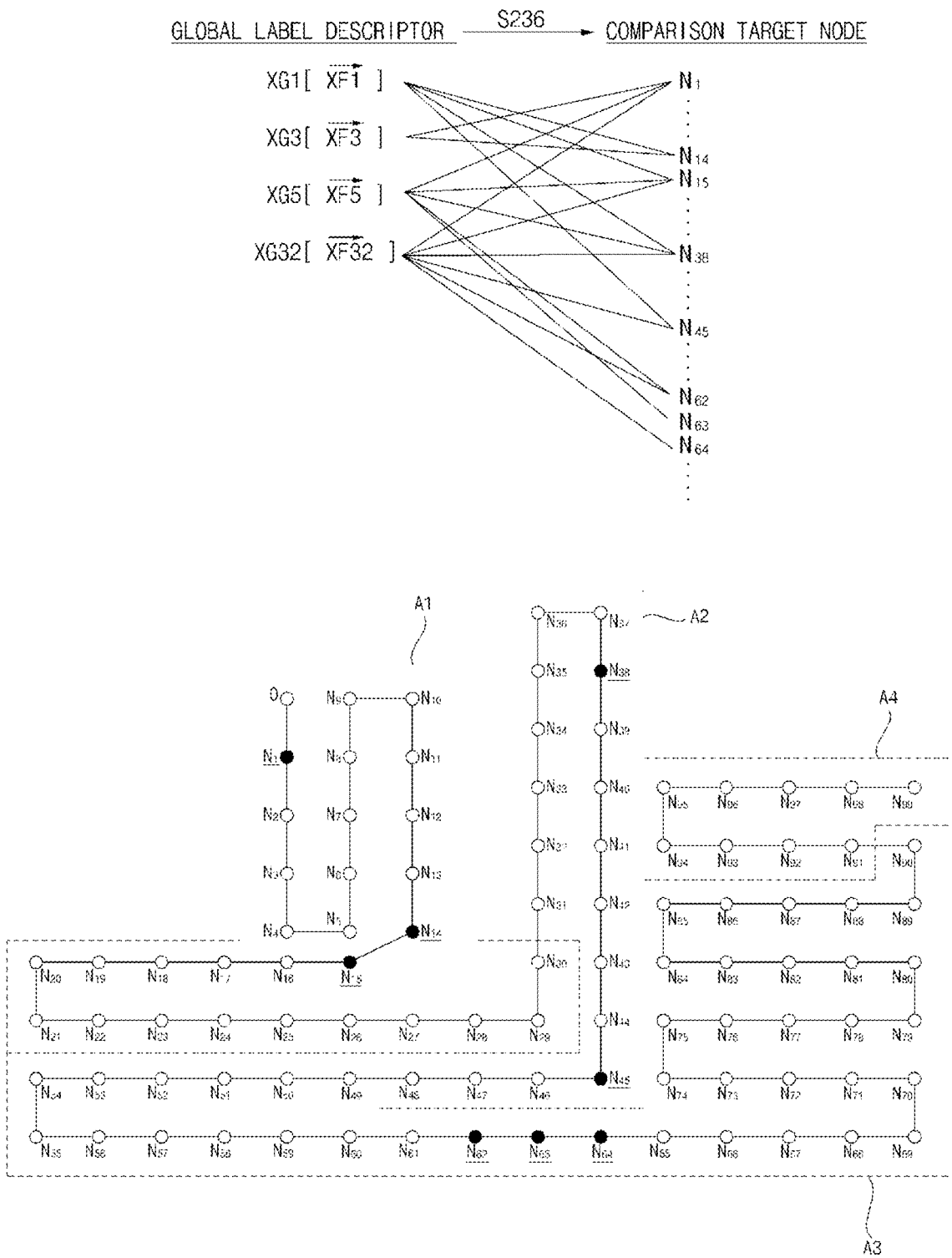
FIG. 27 is a diagram illustrating an example of selection operation S236 of a comparison target node of FIG. 13.

With reference to FIG. 27, selection operation S236 of a comparison target node will be described in more detail. In selection operation S236, the comparison target node corresponding to the matched global label descriptors $\vec{XF1}, \vec{XF3}, \vec{XF5}, \vec{XP32}$ may be selected. A plurality of nodes may correspond to the plurality of matched global label descriptors $\vec{XF1}, \vec{XF3}, \vec{XF5}, \vec{XP32}$ according to one-to-many correspondence.

For example, comparison target nodes corresponding to the plurality of global label descriptors $\vec{XF1}, \vec{XF3}, \vec{XF5}, \vec{XP32}$ may be N1, N14, N15, N38, N62, N63, and N64. A plurality of global label descriptors in each of the selected comparison target nodes N1, N14, N15, N38, N62, N63, and N64 may include at least one of the matched global label descriptors $\vec{XF1}, \vec{XF3}, \vec{XF5}, \vec{XP32}$. A plurality of global label descriptors in the remaining nodes that are not selected may not include all the matched global label descriptors $\vec{XF1}, \vec{XF3}, \vec{XF5}, \vec{XP32}$.

In detail, descriptors that is based to generate the matched global label descriptors $\overrightarrow{XF1}$, $\overrightarrow{XF3}$, $\overrightarrow{XF5}$, $\overrightarrow{XP32}$ may be selected, images that is based to generate the selected descriptors, and nodes corresponding to the selected images may be used as comparison target nodes.

For example, when one descriptor A is classified as group A1G1 according to a predetermined classification rule (a first predetermined classification rule), a local label descriptor B is generated according to a predetermined label rule (a first predetermined label rule) based on descriptors in the group A1G1 and, then, a local label descriptor B is classified as a group XG5 according to a predetermined classification rule (a second predetermined classification rule), and a global label descriptor C is generated according to a predetermined label rule (a second predetermined label rule) based on local label descriptors in the group XG5, the expression 'descriptor A is based to generate the global label descriptor C' may be used. When there is a descriptor A among a plurality of descriptors in an image D, the expression 'image D is based to generate the descriptor A' may be used. In addition, the expression 'image D is based to generate the global label descriptor C' may be expressed.

In selection operation S236, images based to generate the matched global label descriptors $\overrightarrow{XF1}$, $\overrightarrow{XF3}$, $\overrightarrow{XF5}$, $\overrightarrow{XP32}$ among a plurality of images may be selected, and comparison target nodes that correspond to the selected images according to one-to-one correspondence may be selected among all nodes. In FIG. 27, the selected comparison target nodes N1, N14, N15, N38, N62, N63, and N64 may be indicated by black dots.

With reference to FIG. 28, an example of comparison operation S266 for each comparison target node will be described. In comparison operation S266, only images corresponding to the comparison target nodes N1, N14, N15, N38, N62, N63, and N64 selected in selection operation S236 may be compared with a localization image. A comparison target node corresponding to an image with similarity computed to be highest as a comparison result may be selected as a last node.

In comparison operation S266, image feature distribution (e.g., an image feature distribution vector) corresponding to each of nodes N1, N14, N15, N38, N62, N63, and N64 may be generated with respect to only the comparison target nodes N1, N14, N15, N38, N62, N63, and N64 selected in selection operation S236. In comparison operation S266, localization image feature distribution (e.g., a localization image feature distribution vector) comparable with image feature distribution of the comparison target nodes N1, N14, N15, N38, N62, N63, and N64 may be generated. In comparison operation S266, image feature distribution and localization image feature distribution may be compared for each of comparison target nodes N1, N14, N15, N38, N62, N63, and N64 to select one node with the highest similarity as a last node (a node estimated as a current point). A description of a detailed method thereof is the same as that of Equations 9 to 11 above.

In FIG. 28, a left histogram is an example of the localization image feature distribution histogram. The localization image feature distribution may be generated based on the matched global label descriptors $\overrightarrow{XF1}$, $\overrightarrow{XF3}$, $\overrightarrow{XF5}$, $\overrightarrow{XP32}$. The localization score sh of the matched global label descriptors $\overrightarrow{XF1}$, $\overrightarrow{XF3}$, $\overrightarrow{XF5}$, $\overrightarrow{XP32}$ may be computed according to Equation 10 above.

In FIG. 28, right histograms are examples of an image feature distribution histogram for each comparison target node. The image feature distribution may be generated based on the matched global label descriptors $\overrightarrow{XF1}$, $\overrightarrow{XF3}$, $\overrightarrow{XF5}$, $\overrightarrow{XP32}$. The localization score sh of the matched global label descriptors may be computed according to Equation 9 above.

In a plurality of global label descriptors in an image, there may be other global label descriptors (e.g., $\overrightarrow{XF17}$) other than the matched global label descriptors $\overrightarrow{XF1}$, $\overrightarrow{XF3}$, $\overrightarrow{XF5}$, $\overrightarrow{XP32}$. It may not be required that the other global label descriptor $\overrightarrow{XF17}$ is a representative value of the image feature distribution histogram. However, a weight of the other global label descriptor $\overrightarrow{XF17}$ may affect the score s of the matched global label descriptors $\overrightarrow{XF1}$, $\overrightarrow{XF3}$, $\overrightarrow{XF5}$, $\overrightarrow{XP32}$ (this is because the weight of the other global label descriptor $\overrightarrow{XF17}$ affects a value of $\Sigma w$ in Equation 9 above).

Figure 29:
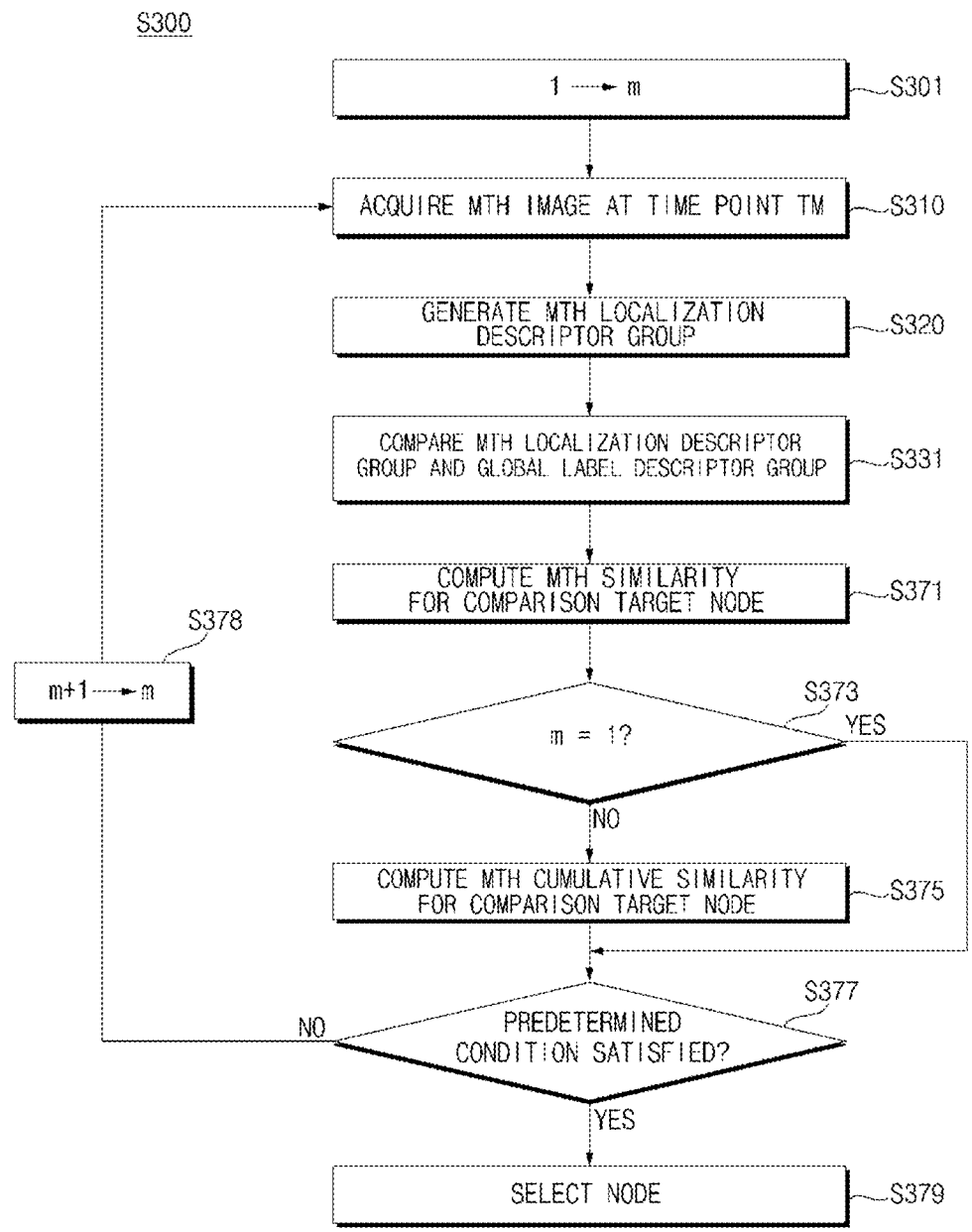
FIG. 29 is a flowchart showing localization operation S300 according to a fourth embodiment of the mobile robot of FIG. 1.
Figure 30:
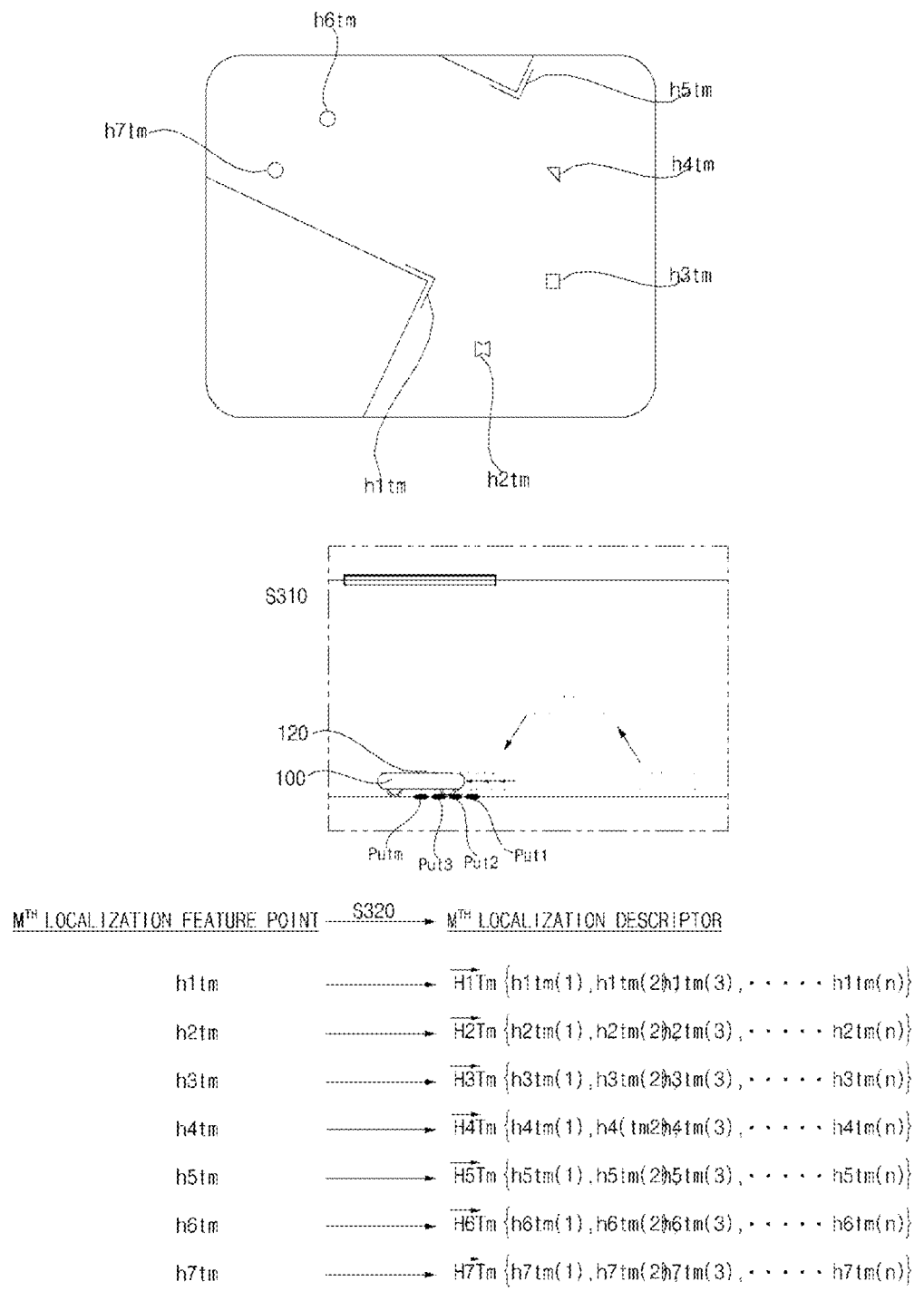
FIG. 30 is a diagram of a concept showing an example of operation S310 of acquiring an mth image and operation S320 of generating an mth localization descriptor of FIG. 29.
Figure 31:
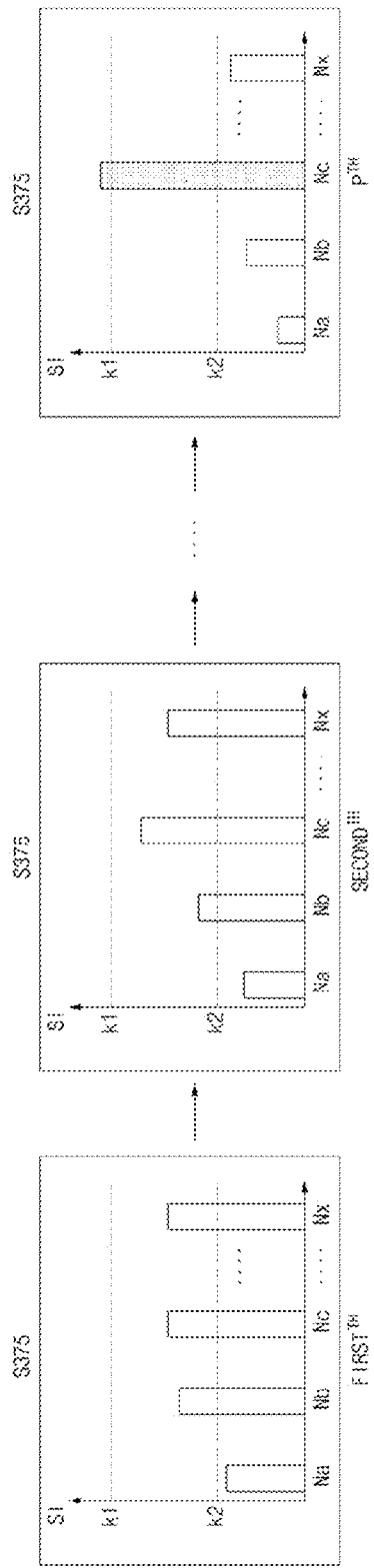
FIG. 31 is a diagram of a concept showing an example of mth cumulative similarity computing operation S385 of FIG. 29.

With reference to FIGS. 29 to 31, localization operation S300 according to a fourth embodiment will be described below. Localization operation S300 according to the fourth embodiment may be a supplementary operation of the localization operation S200'' according to the third embodiment. Localization operation S300 according to the fourth embodiment may also be applied to the modification examples of the first, second, and third embodiments except that comparison targets are different. Hereinafter, p is a natural number equal to or greater than 2, and m is an arbitrary natural number equal to or greater than 1 and is equal to or less than p.

Localization operation S300 may include a localization initial operation. The localization initial operation may include operation S310 an mth localization image and operation S20 of generating an mth localization descriptor group.

Referring to FIG. 29, localization operation S300 may include operation S310 of acquiring primary to pth localization images while the mobile robot 100 changes a point or a photograph angle. In operation S310 of acquiring primary to the pth localization images, the mobile robot 100 may acquire the primary to pth localization images at a predetermined time interval. In this case, according to a time sequence for acquiring a localization image, a primary image, a secondary image, a third image, a pth image may be defined. According to a time sequence, time points of acquiring respective localization images may be defined as t1, t2, t3, . . . , tp. That is, the primary localization image may be acquired at a time point t1, the secondary localization image may be acquired at a time point t2, and the pth localization image may be acquired at a time point tp. tm may refer to a time point at which the mth localization image is acquired.

FIG. 30 illustrates an mth localization image acquired at a time point tm by the mobile robot 100 through the image acquisition unit 120 in an unknown current area. A plurality of mth localization feature points h1$tm$, h2$tm$, h3$tm$, h4$tm$, h5$tm$, h6$tm$, and h7$tm$ may be extracted from the mth image acquired in the unknown current area. The primary localization feature point may be extracted from the primary image, the secondary localization feature point may be extracted from the secondary image, and the pth localization feature point may be extracted from the pth localization feature point. The number and types of localization feature points checked every image may be changed even in the same area and, in order to differentiate these, a time point tm may be additionally indicated to a sign of the mth localization feature point.

Referring to FIG. 30, for example, in operation S310 of acquiring the localization image, the mobile robot 100 may be moved to acquire localization images at a plurality of points, respectively. In operation S310 of acquiring the localization image, the primary to pth localization images may be acquired at respective points while the current points Put1, Put2, Put3, . . . ,Putm in which the mobile robot 100 is positioned is changed. A point at which the mth localization image is acquired may be different from a point at which the (m−1)th localization image is acquired and may be different from a point at which an (m+1)th localization image is acquired.

As another example, in operation S310 of acquiring the localization image, the mobile robot 100 may acquire a plurality of localization images while changing a photograph angle of the image acquisition unit 120.

As such, the mth image may be different from the (m−1)th and (m+1)th images and data may be extracted from various images different from the mth image to estimate a current area, thereby enhancing reliability of estimation.

Operation S310 of acquiring the mth localization image at one point Putm may be materially the same as localization image acquisition operation S210 described above.

Referring to FIG. 29, localization operation S300 may include operation S320 of generating the primary to pth localization descriptors (primary to pth localization descriptor groups) based on the primary to pth localization images. In detail, the primary to pth localization feature points may be extracted from the primary to pth localization image, respectively and the primary to pth localization descriptors corresponding to the primary to pth localization feature points may be generated. Operation S320 of generating mth localization descriptors (an mth localization descriptor group) based on one mth localization image may be the same as localization descriptor generation operation S220 described above.

The primary localization descriptor may be generated based on the primary image, the secondary localization descriptor may be generated based on the secondary image, and the pth localization descriptor may be computed based on the pth image. An operation of generating the mth localization descriptor based on the mth image generated in image acquisition operation S310 may be defined as mth localization descriptor generation operation S320.

Referring to FIG. 30, in operation S320, mth localization descriptors $\overrightarrow{H1Tm}$, $\overrightarrow{H2Tm}$, $\overrightarrow{H3Tm}$, . . . , $\overrightarrow{H7Tm}$ that correspond to the mth localization feature points h1*tm*, h2*tm*, h3*tm*, h4*tm*, h5*tm*, h6*tm*, and h7*tm*, respectively may be generated. h1*tm*(1), h1*tm*(2), h1*tm*(3), . . . ,h1*tm*(n) in a brace { } of $\overrightarrow{H1Tm}$ may refer to a value of each dimension configuring $\overrightarrow{H1Tm}$, $\overrightarrow{H2Tm}$, $\overrightarrow{H3Tm}$, . . . , $\overrightarrow{H7Tm}$ are indicated in the same way and, thus, a description thereof will be omitted.

FIG. 30 illustrates operation of generating one mth localization descriptor while the first to pth localization descriptors are generated, but this may also be applied to an operation of computing localization descriptors with different orders.

Referring to FIG. 29, localization operation S300 may include a comparison target selection operation (not shown) of matching label descriptors (global label descriptors) with the primary to pth localization descriptors and selecting one or more comparison target nodes corresponding to the matched label descriptors (global label descriptors). An operation of matching a global label descriptor with any one of mth localization descriptors in the comparison target selection operation according to the fourth embodiment may be materially the same as matching operation S231 described above. An operation of selecting a comparison target node corresponding to a global label descriptor matched in the comparison target selection operation according to the fourth embodiment may be materially the same as comparison target node selection operation S236 described above.

Referring to FIG. 29, localization operation S300 may include operation S381 of computing mth similarity for each comparison target node. Localization operation S300 may include operation S381 of computing pth similarity for each comparison target node. In localization operation S300, primary to pth similarities for each comparison target node may be calculated.

In operation S381, mth localization image feature distribution may be generated based on a matched global label descriptor in the mth localization image. In operation S381, the mth similarity for each comparison target node may be computed. The image feature distribution corresponding to the comparison target node and localization image feature distribution comparable therewith may be compared with each other to compute the primary to pth similarities for each comparison target node. Here, the mth similarity may refer to similarity computed based on comparison between the mth localization image feature distribution and the image feature distribution.

In the case of comparison with one comparison target node, image feature distribution of the comparison target node and the mth localization image feature distribution may be generated based on a type, a score, and a localization score of the matched global label descriptor, which will be understood from the above description of operation S266 according to the third embodiment.

In mth similarity computing operation S381, image feature distribution corresponding to each comparison target node may be compared with the mth localization image feature distribution may be compared with each other to compute mth similarity for each comparison target node. For example, similarity between an image feature distribution vector of one comparison target node and an mth localization image feature distribution vector may be computed according to Equation 13 below (cosine similarity).

$$\cos\theta(Tm, Nj) = \frac{\overrightarrow{X(Nj)} \cdot \overrightarrow{Y(Tm)}}{|\overrightarrow{X(Nj)}| \times |\overrightarrow{Y(Tm)}|} \quad [\text{Equation 13}]$$

Here, cos θ(Tm,Nj) is mth similarity with respect to a comparison target node Nj, $\overrightarrow{X(Nj)}$ is an image feature distribution vector of the comparison target node Nj, $\overrightarrow{Y(Tm)}$ is an mth localization image feature distribution vector comparable with $\overrightarrow{X(Aj)}$, $|\overrightarrow{X(Aj)}| \times |\overrightarrow{Y(Tm)}|$ is a product of absolute values of two vectors, X(Aj)·Y(Tm) is an inner product of the two vectors, and m and j are arbitrary natural numbers.

Table 1 below summarize similarity for each of orders T1,T2, . . . ,Tm, . . . ,Tp computed according to Equation 13 above and for each of comparison target nodes N1, N2, . . . ,Nj, . . . ,Nk (p and k being a natural number)

TABLE 1

| Division | Node N1 | Node N2 | ... Node Nj | ... Node Nk |
|---|---|---|---|---|
| Primary | cos⊖(T1, N1) | cos⊖(T1, N2) | ... cos⊖(T1, Nj) | ... cos⊖(T1, Nk) |
| Secondary | cos⊖(T2, N1) | cos⊖(T2, N2) | ... cos⊖(T2, Nj) | ... cos⊖(T2, Nk) |
| ... | ... | ... | ... ... | ... ... |
| $m^{th}$ | cos⊖(Tm, N1) | cos⊖(Tm, N2) | ... cos⊖(Tm, Nj) | ... cos⊖(Tm, Nk) |
| ... | ... | ... | ... ... | ... ... |
| $p^{th}$ | cos⊖(Tp, N1) | cos⊖(Tp, N2) | ... cos⊖(Tp, Nj) | ... cos⊖(Tp, Nk) |

In Table 1 above, similarities with the same order are indicted for each order in the same row, and similarities with the same node are indicated for each comparison target node in the same column. Here, p and k refers to a natural number equal to or greater than 2, m is an arbitrary natural number equal to or greater than 1 and is equal to or less than p, and j is an arbitrary natural number equal to or greater than 1 and is equal to or less than k. In Table 1 above, the expression ' . . . ' refers to the omitted parts. When the total number of comparison target nodes is k and up to an operation of computing similarity for each pth area is performed, total p*k similarities may be computed. For example, similarity for each mth area may refer to similarities of a row indicated by the 'mth' of Table 1 above.

Referring to FIG. 29, localization operation S300 may include operation S385 of computing mth cumulative similarity for each comparison target node. Localization operation S300 may include operation S385 of computing pth cumulative similarity for each comparison target node. In localization operation S300, primary to pth cumulative similarities for each comparison target node may be computed.

In operation S385, cumulative similarity for each comparison target node may be computed based on similarity for each comparison target node according to a predetermined cumulative rule. When up to pth similarity for each comparison target node is also computed, the primary to pth cumulative similarities for each comparison target node may be computed according to a predetermined cumulative rule in cumulative similarity computing operation S385. When up to similarity for each mth comparison target node is computed, mth cumulative similarity for each comparison target node may be computed based on (m−1)th cumulative similarity for each comparison target node and mth similarity for each comparison target node according to a predetermined cumulative rule.

Referring to FIG. 31, the predetermined cumulative rule may include a computing rule for multiplying primary to pth similarities for each comparison target node with respect to similarities with respect to the same node. Cumulative similarity for each comparison target node may be a cumulative value of similarity of all dimension calculated until cumulative similarity computing operation S385 proceeds according to the predetermined cumulative rule.

mth cumulative similarity for each comparison target node may be computed by multiplying primary to mth similarities for each comparison target node. The mth cumulative similarity for each comparison target node may be computed by multiplying (m−1)th cumulative similarity for each comparison target node and mth similarity for each comparison target node.

The cumulative similarity for each comparison target node may be computed via normalizing. For example, normalizing may be a process in which the sum of mth cumulative similarities for respective comparison target nodes (which is the sum of mth cumulative similarities for the respective comparison target nodes) is 1.

For example, the predetermined cumulative rule for obtaining the mth cumulative similarity with respect to a comparison target node Nj may be represented according to Equations 14 and 15 below. N1, N2, N3, . . . , Nk are assumed to be selected as a comparison target node, and j is an arbitrary natural number equal to or greater than 1 and is equal to or less than k. m is a natural number equal to or greater than 2.

$$P(T_m, N_j) = \cos \theta(T_1, N_j) \times \cos \theta(T_2, N_j) \times \ldots \times \cos \theta(T_m, N_j) = P(T_{m-1}, N_j) \times \cos \theta(T_m, N_j) \quad \text{[Equation 14]}$$

Here, $PN(T_m, N_j)$ is mth cumulative similarity that is not normalized with respect to a comparison target area Nj, $\cos \theta(T_m, A_j)$ is mth similarity with respect to a comparison target area Nj and is computed according to Equation 13, and m and j are each an arbitrary natural number.

Referring to Equation 14 above, mth cumulative similarity $PN(T_m, N_j)$ that is not normalized with respect to a comparison target node Nj may be obtained by multiplying the primary to mth similarities $\cos \theta(T_1, N_j) \times \cos \theta(T_2, N_j) \times \ldots \times \cos \theta(T_m, N_j)$ with respect to the comparison target node Nj or may be obtained by multiplying (m−1)th cumulative similarity $P(T_{m-1}, A_j)$ that is not normalized with respect to the comparison target node Nj by mth similarity $\cos \theta(T_m, A_j)$ with respect to the comparison target node Nj.

$$PN(T_m, N_j) = \frac{PN(T_m, N_j)}{\sum_{j=1}^{k} P(T_m, N_j)} = \frac{PN(T_{m-1}, N_j) \times \cos\theta(T_m, N_j)}{\sum_{j=1}^{k} [PN(T_{m-1}, N_j) \times \cos\theta(T_m, N_j)]} \quad \text{[Equation 15]}$$

Here, $PN(T_m, N_j)$ is mth cumulative similarity that is normalized with respect to the comparison target node Nj, $PN(T_m, N_j)$ is mth cumulative similarity that is not normalized with respect to the comparison target node Nj, $\sum_{j=1}^{k} P(T_m, N_j)$ is a value of summing mth cumulative similarities of all comparison target nodes (N1 to Nk), which are not normalized, $\cos \theta(T_m, N_j)$ is an mth similarity with respect to the comparison target area Nj and is computed according to Equation 13 above, and m and j are arbitrary natural numbers.

Referring to Equation 15 above, mth cumulative similarity $PN(T_m, N_j)$ that is normalized with respect to a comparison target node Nj may be obtained by dividing mth cumulative similarity $P(T_m, N_j)$ that is not normalized with respect to the comparison target node Nj by the sum $\sum_{j=1}^{k} P(T_m, N_j)$ of mth cumulative similarities of all comparison target nodes N1 to Nk, which are not normalized. In addition, a value obtained by multiplying (m−1)th cumulative similarity $PN(T_{m-1},N_j)$ that is normalized with respect to the comparison target node Nj by mth similarity $\cos\theta(Tm,Nj)$ with respect to the comparison target node Nj may also be obtained by multiplying normalized (m−1)th cumulative similarity and mth similarity for each comparison target node and then summing all the resulting values $\Sigma_{j=1}^{k}[PN(T_{m-1},A_j)\times\cos\theta(T_m,A_j)]$.

Hereinafter, the 'cumulative similarity' is described to refer to normalized cumulative similarity, but it may not be required that the present invention is not limited thereto.

In the primary cumulative similarity, a plurality of similarities is not present as cumulative and multiplying targets and, thus, may have the same meaning as the primary similarity. The primary cumulative similarity may be defined as a value computed by performing normalizing on the primary similarity.

FIG. 31 is a diagram showing a concept showing an embodiment in which an order of cumulative similarity for each comparison target node is increased. FIG. 31 shows a histogram in which a size of similarity is indicated by a degree for each of comparison target nodes N1, N2, N3, . . . , Nx). According to the predetermined cumulative rule, the primary to pth cumulative similarities may be sequentially computed for each comparison target node.

p may be determined based on whether a predetermined condition of cumulative similarity for each comparison target node is satisfied (S387). That is, a last order p for applying the predetermined cumulative rule to obtain cumulative similarity for each comparison target node may be determined based on whether a predetermined condition is satisfied.

Localization operation S300 may include operation S387 of determining whether the predetermined condition is satisfied after mth cumulative similarity computing operation S385 is performed. When the predetermined condition is satisfied based on the mth cumulative similarity for each comparison target node, a node in which the mobile robot 100 is estimated to be positioned may be selected (S370). When the predetermined condition is not satisfied, (m+1)th cumulative similarity for each comparison target node may be calculated and, then, whether the predetermined condition is satisfied may be re-determined.

In the localization operation, when the predetermined condition is satisfied based on cumulative similarity for each newest comparison target node, a node estimated as a position of the mobile robot 100 may be selected and, when the predetermined condition is not satisfied, similarity computing operation S381 and cumulative similarity computing operation S385 may be additionally performed based on the acquired image. When the predetermined condition is not satisfied, localization image acquisition operation S310 and localization descriptor generation operation S320 may be re-performed or an operation of generating localization descriptor from a pre-acquired and pre-stored localization image may be re-performed. Then, cumulative similarity generation operation S385 may be additionally performed.

Referring to FIG. 31, the predetermined condition may include a reliable condition in which cumulative similarity of one area is greater than a predetermined reliable value k1 (k1 being a constant). The reliable condition may be considered as a condition in which only cumulative similarity of one comparison target node is greater than the reliable value k1 and cumulative similarities of the remaining comparison target nodes are not greater than the reliable value k1. In the example of FIG. 31, primary to (p−1)th cumulative similarity histograms for each comparison target node, only cumulative similarity of one area is not greater than the reliable value k1 and, in a pth cumulative similarity histogram for each comparison target node, only pth cumulative similarity of node Nc is greater than the reliable value k1 and, in this case, node Nc may be selected as a node corresponding to the current position without necessity of computation of cumulative similarity any longer.

Referring to FIG. 31, the predetermined condition may include a drop condition in which cumulative similarities of the remaining nodes other than a node corresponding to cumulative similarity greater than the reliable value k1 are less than predetermined drop value k2. When the drop condition is set to a condition that is satisfied simultaneously with the reliable condition, the predetermined condition that is more difficult to be satisfied but further enhances reliability may be set. The drop value k2 may be set to be less than the reliable value k1. As seen from the example of FIG. 31, in a cumulative similarity histogram for each of primary to (p−1)th comparison target nodes, at least one of the reliable condition or the drop condition is not satisfied and, then, in a pth cumulative similarity histogram for each comparison target node, only the pth cumulative similarity of an area Nc is greater than the reliable value k1 to satisfy the reliable condition and, simultaneously, the pth cumulative similarity of the remaining nodes Na, Nb, Nd, to Nx may be less than the drop value k2 and the drop condition may also be satisfied. In this case, node Nc may be selected as a node corresponding to the current position without necessity of computation of cumulative similarity any longer.

The predetermined condition may include a distance condition in which the mobile robot 100 is moved by a predetermined distance k3 or greater. For example, the mobile robot 100 may be moved to acquire primary to mth localization images and, when a moving distance to a position at which an mth localization image is obtained from a position at which a primary localization image is obtained is equal to or greater than the distance k3, the predetermined condition may be considered to be satisfied, and a comparison target node with mth cumulative similarity having the highest value among mth cumulative similarities for each comparison target node may be selected as a node estimated as a current position. The distance condition may be set to a parallel condition ('OR' condition) of the reliable condition and the drop condition. That is, when the distance condition is satisfied, even if the reliable condition or the drop condition is not satisfied, the predetermined condition may be considered to be satisfied. This is because, when the moving distance is excessively increased, the mobile robot 100 may be moved out of the current area to rather degrade reliability of estimation and excessively many operations for estimation of the current position are needed.

The predetermined condition may include a condition of a number of times, in which m is greater than a predetermined number of times k4 in a state in which up to cumulative similarity for each mth comparison target node is computed. That is, an upper limit of m may be set and, when m us greater than the predetermined number of times k4, a comparison target node with an mth cumulative similarity having a highest value among mth cumulative similarities for respective comparison target nodes may be determined as a node estimated as a current position. The condition of a number of times may be set to a parallel condition ('OR' condition) of the reliable condition and the drop condition. That is, when the condition of a number of times is satisfied, even if the reliable condition or the drop condition is not satisfied, the predetermined condition may be considered to be satisfied. This is because, when an order of computing cumulative similarities is excessively increased, excessively much time is taken to estimate the current by the mobile robot 100.

According to an embodiment, the predetermined condition may be set to be satisfied when i. the reliable condition, ii. the distance condition, or iii. the condition of a number of times is satisfied. According to another embodiment, the predetermined condition may be satisfied when i. reliable condition and drop condition, ii the distance condition, or iii the condition of a number of times is satisfied.

Figure 32:
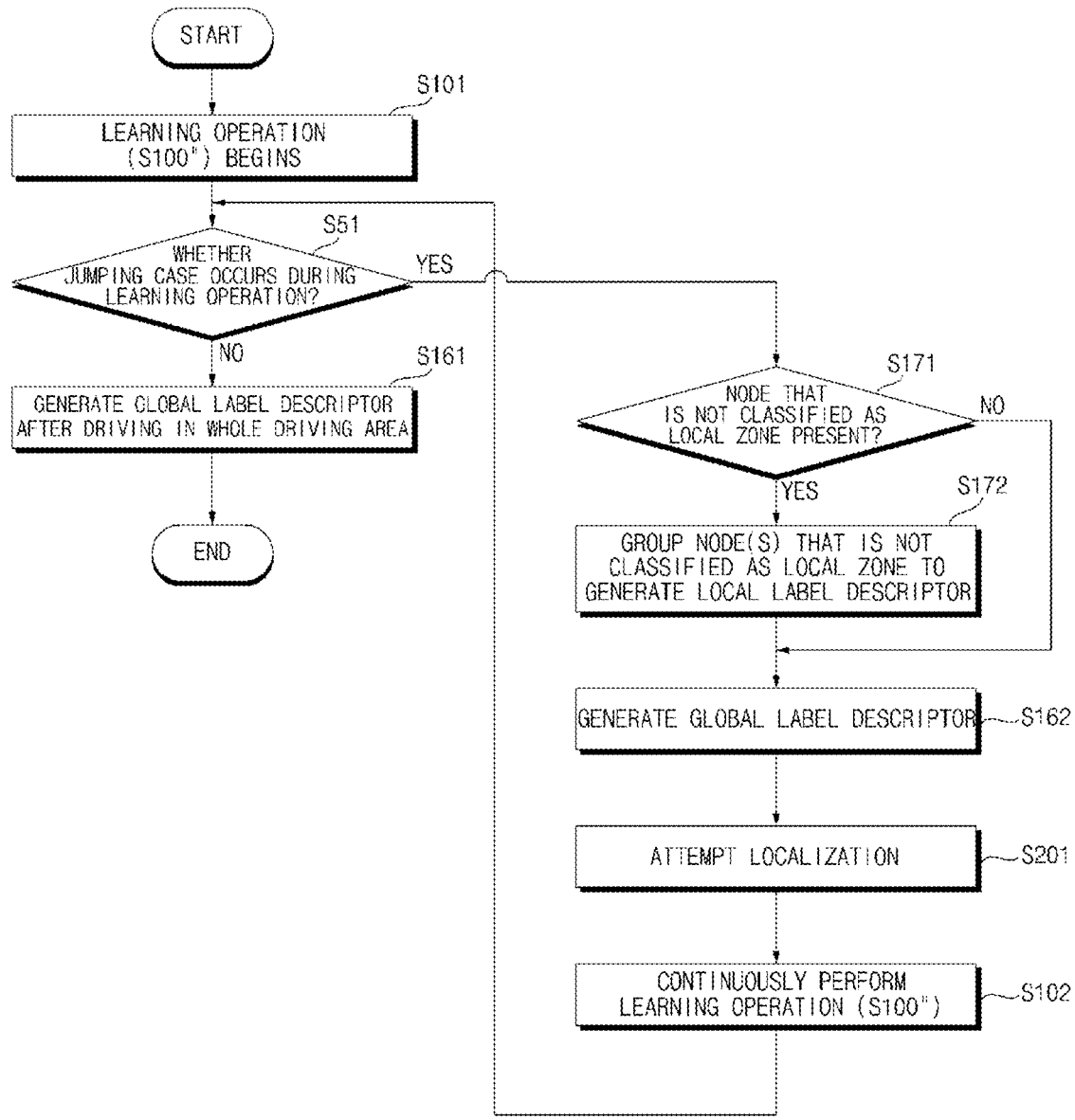
FIGS. 32 and 33 are a flowchart and a diagram of a concept of another embodiment of learning operation S100" and localization operation S200" of FIGS. 13 and 14.
Figure 33:
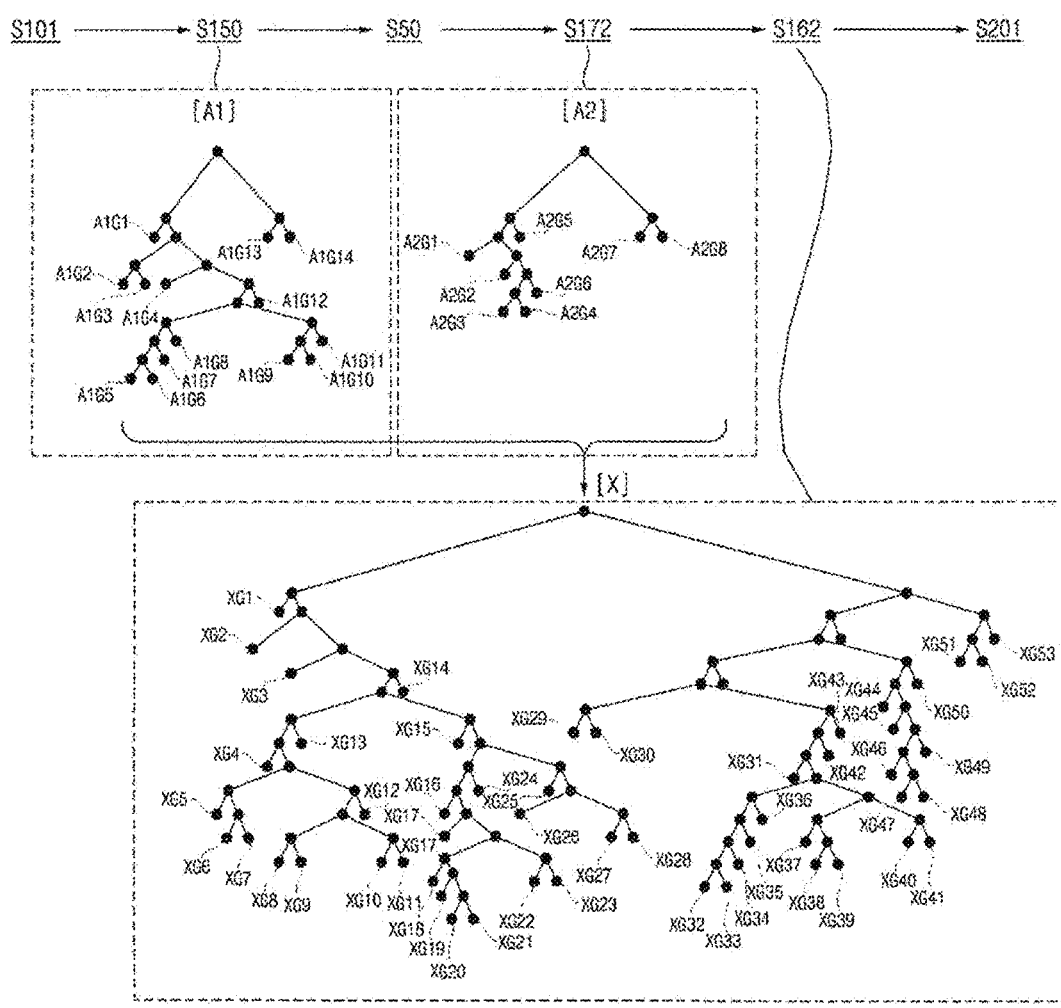

With reference to FIGS. 32 and 33, another embodiment of learning operation S100" and localization operation S200" according to the third embodiment will be described below. Referring to FIG. 12, the controller 140 may perform control to acquire an image for each point during driving (S110). The controller 140 may generate descriptors respectively corresponding to a plurality of feature points extracted from the image (S120). The controller 140 may generate nodes that respectively correspond to images acquired at the points, respectively (S130). The controller 140 may be preset to classify the plurality of nodes as a local zone according to a predetermined reference (S140 and S140'). The controller 140 may be preset to classify a plurality of descriptors in a local zone for each local zone as a plurality of groups and to generate a local label descriptor representing descriptors classified as the same group (S150). The controller 140 may be preset to classify local label descriptors that are respectively generated in the plurality of local zones as a plurality of groups and to generate a global label descriptor representing local label descriptors classified as the same group (S160).

Referring to FIG. 13, the controller 140 may perform control to acquire a localization image when a jumping case occurs (S50) (S210). The controller 140 may generate localization descriptors respectively corresponding to the plurality of localization feature points extracted from the localization image (S220). The controller 140 may match global label descriptor with the localization descriptor (S231). The controller 140 may select one or more comparison target nodes corresponding to the matched global label descriptor (S236). The controller 140 may be preset to select a node estimated as the current position among the one or more comparison target nodes (S266 and S270).

Referring to FIGS. 32 and 33, when at least one local zone is classified during driving, the controller 140 may be preset to generate the local label descriptor of the classified local zone during driving. In detail, after learning initial operations S110, S120, and S130 begins to be performed (S101), the controller 140 may generate the local label descriptor prior to driving of the whole driving area (S150). That is, when some of pre-generated nodes are classified as the local zone before all nodes in the global zone are generated, the local label descriptor of the classified local zone may be generated (S150).

FIGS. 32 and 33 are diagrams showing examples of an algorithm that is differently controlled at a time point when a jumping case occurs. When a jumping case occur during learning operation S100", a time point at which the global label descriptor is generated may be changed. Referring to FIGS. 32 and 23, when a jumping case does not occur until all nodes in the global zone are generated, the controller 140 may be preset to generate all nodes in the global zone and then to begin to generate the global label descriptor (S161). When a jumping case does not occur during learning operation S100", after all learning initial operations S110, S120, and S130 are completed, the global label descriptor may begin to be generated (S161). When a jumping case does not occur during learning operation S100", after the mobile robot 100 drives on the whole driving area, the global label descriptor may be generated (S161).

Referring to FIG. 23, when a jumping case does not occur during learning operation S100', the local label descriptor may be generated during driving (S150) and, after all nodes in the global zone are generated, the global label descriptor may be generated based on the local label descriptor (S160).

Referring to FIGS. 32 and 33, when a jumping case occurs before all nodes in the global zone are generated (S50), the controller 140 may be preset to begin to generate the global label descriptor after the jumping case occurs (S162). In this case, the controller 140 may generate the global label descriptor based on the plurality of nodes that are generated up to a time point when the jumping case occurs (S162). When a jumping case occurs during learning operation S100", learning initial operations S110, S120, and S130 may be immediately stopped and the global label descriptor may begin to be generated (S161). When a jumping case occurs during learning operation S100", the global label descriptor may be generated (S161) and localization may be attempted using the generated global label descriptor (S201).

When the mobile robot 100 jumps into an area in which driving is completed during learning operation S100", the controller 140 may localize the current position using the global label descriptor generated based on only nodes that are generated up to a time point when a jumping case occurs.

When the mobile robot 100 jumps into an area in which driving is not performed and local localization fails during first learning operation S100", second learning operation S100" of generating a new map may newly begin. Here, when the mobile robot 100 moves in an area that overlaps a non-completed map of first learning operation S100" that has been previously performed, during second learning operation S100", the controller 140 may localize a position in the non-completed map of first learning operation S100" and may continuously re-perform first learning operation S100".

When a jumping case occurs in both cases in which learning operation S100" is performed and after learning operation S100" is terminated, the global label descriptor may be generated (S161 and S162). When a jumping case occurs, the controller 140 may be preset to select a node estimated as the current position based on the acquired localization image and the global label descriptor. A description of control based on the acquired localization image and the global label descriptor is the same as the above description.

When a jumping case occurs during learning operation S100", there may be node(s) that are not classified as a local zone among nodes generated prior to a time point when the jumping case occurs. That is, the predetermined local zone classification condition is not satisfied still and, thus, an example of an algorithm when a jumping case occurs in a state in which there is node(s) that is not grouped as a local zone will be described below.

Referring to FIGS. 33 and 34, the controller 140 may classify at least one node Nx as a local zone Δx and may generate local label descriptor based on a plurality of descriptors in the local zone Δx when a jumping case occurs in a state in which there is at least one node Nx that is not classified as a local zone among at least one generated node (S172). The controller 140 may be preset to begin to generate the global label descriptor (S162).

Referring to the scenario of FIG. 33, after learning operation S100" begins (S101), nodes of a portion of the driving area may be generated. When nodes that are generated while learning operation S100" is continuously performed are classified as the local zone A1 according to the predetermined local zone classification reference, the local label descriptor of the local zone A1 may be generated while learning initial operations S110, S120, and S130 (S150). Then, when a jumping case occurs (S50) in a state in which an additional node is generated but an additional local zone A2 is not classified, nodes that are not classified as a local zone may be classified as the local zone A2 to generate the local label descriptor of the local zone A2 (S172). Then, the global label descriptor may be generated based on the local label descriptor of the generated local zones A1 and A2 (S162). The controller 140 may attempt localization using the generated global label descriptor (S201).

A control method in terms of an algorithm will be described with FIGS. 32 and 33. The control method may include operation S101 in which learning operation S100" begins to be performed. The control method may include an operation S51 of determining whether a jumping case occurs during learning operation S100". When determining that a jumping case does not occur during learning operation S100" in operation S51, operation S161 of generating the global label descriptor may be performed after the mobile robot 100 completes the whole driving area. When determining that a jumping case occurs during learning operation S100" in operation S51, operation S171 of determining whether at least one node that is not classified as a local zone is present among node(s) generated before a jumping case occurs may be performed. When determining that at least one node that is not classified as a local zone in operation S171 is present, operation S172 of grouping and classifying node(s) that are not classified as a local zone and generating a local label descriptor of the classified local zone may be performed. After operation S172 is performed, operation S162 of generating a global label descriptor may be performed based on the local label descriptor generated based on a current time point. When determining that a node that is not classified as a local zone is not present in operation S171, operation S162 may be immediately performed without operation S172. After operation S162 is performed, operation S201 in which localization is attempted may be performed based on the generated global label descriptor and the localization descriptor in the localization image. After operation S201 is performed, learning operation S100" may be continuously performed. As described above, when localization on a map is successful in operation S201, the map that is being learned may be continuously learned.

What is claimed is:

1. A method of controlling a mobile robot, the method comprising;
a learning initial operation of acquiring images for respective points, generating descriptors that respectively correspond to a plurality of feature points extracted from the images, and generating nodes that correspond to the images acquired at the respective points;
a label generation operation of generating a label descriptor based on the plurality of descriptors;
a localization initial operation of acquiring a localization image when a jumping case occurs, and generating respective localization descriptors corresponding to a plurality of localization feature points extracted from the localization image;
a comparison target selection operation of matching the label descriptor to each of the localization descriptors and selecting one or more comparison target nodes corresponding to the matched label descriptor; and
a last node selection operation of selecting a node estimated as the current position among the one or more comparison target nodes.

2. The method of claim 1, wherein the label generation operation includes classifying the plurality of descriptors as a plurality of groups based on a distance between the descriptors and generating a label descriptor representing descriptors classified as the same group.

3. The method of claim 1, wherein the label generation operation includes classifying the plurality of descriptors as a plurality of groups according to a predetermined classification rule and generating a label descriptor from descriptors classified as the same group according to a predetermined label rule.

4. The method of claim 3, wherein the predetermined classification rule includes a rule for classifying the plurality of descriptors based on a distance between the descriptors and grouping descriptors with a relatively adjacent distance as the same group.

5. The method of claim 3, wherein the predetermined label rule includes a rule for labeling a representative value computed based on descriptors classified as the same group, as the label descriptor.

6. The method of claim 3, wherein the label generation operation is performed when a predetermined reference is satisfied while the learning initial operation is performed.

7. The method of claim 1, further comprising:
a local zone classification operation of classifying the plurality of nodes as a local zone according to a predetermined reference,
wherein the label generation operation includes:
a first label generation operation of classifying a plurality of descriptors in a local zone as a plurality of groups, for each local zone, and generating a local label descriptor representing descriptors classified as the same group; and
a second label generation operation of classifying local label descriptors that are respectively generated in the plurality of local zones, and generating a great-local label descriptor or a global label descriptor representing local label descriptors classified as the same group.

8. The method of claim 7, wherein the local zone classification operation is performed when a new node is generated to satisfy the predetermined reference while the learning initial operation is performed.

9. The method of claim 8, wherein, when at least one local zone is classified in the local zone classification operation while the learning initial operation is performed, the first label generation operation of generating the local label descriptor of the classified local zone is performed.

10. The method of claim 1, further comprising:
a local zone classification operation of classifying the plurality of nodes as a local zone according to a predetermined reference,
wherein the label generation operation includes:
a local zone label generation operation of classifying a plurality of descriptors in a local zone as a plurality of groups according to a first predetermined classification rule for each local zone, and generating a local label descriptor based on the descriptors classified as the same group according to a first predetermined label rule; and
a global label generation operation of classifying a plurality of local label descriptors in a global zone as a plurality of groups according to a second predetermined classification rule and generating a global label descriptor based on local label descriptors classified as the same group according to a second predetermined label rule.

11. The method of claim 10, wherein, in the comparison target selection operation, the label descriptor is a global label descriptor.

12. The method of claim 10, wherein:
the first predetermined classification rule includes a rule for classifying the plurality of descriptors based on a distance between the descriptors and grouping descriptors with a relatively adjacent distance as the same group; and
the second predetermined classification rule includes a rule for classifying the local label descriptors based on a distance between the local label descriptors and grouping descriptors with a relatively adjacent distance as the same group.

13. The method of claim 10, wherein:
the first predetermined label rule includes a rule for labeling a representative value computed based on descriptors classified as the same group, as the local label descriptor; and
the second predetermined label rule includes a rule for labeling a representative value computed based on local label descriptors classified as the same group, as the global label descriptor.

14. The method of claim 1, wherein the comparison target selection operation includes matching a label descriptor with a shortest distance from the localization descriptor with the localization descriptors based on a distance between the localization descriptor and the label descriptor.

15. The method of claim 1, wherein the comparison target selection operation includes matching the label descriptor to allow the label descriptors to correspond to at least some of the localization descriptors according to univalent correspondence.

16. The method of claim 1, wherein the comparison target selection operation includes selecting one or more comparison target nodes corresponding to one or more images that correspond to descriptors, which corresponding to the matched label descriptors according to one-to-many correspondence, according to univalent correspondence.

17. The method of claim 1, wherein the last node selection operation includes comparing node information for each comparison target node and image information acquired at the current position to select a node estimated as the current position.

18. The method of claim 1, wherein:
the localization initial operation includes acquiring primary to pth localization images while the mobile robot changes a point or a photograph angle and generating primary to pth localization descriptors based on the primary to pth localization images; and
the last node selection operation includes computing pth cumulative similarity for each comparison target node and selecting a node estimated as the current position, p being a natural number equal to or greater than 2.

19. The method of claim 18, wherein, in the comparison target selection operation, the localization descriptors includes the primary to pth localization descriptors.

20. A mobile robot comprising:
a driving unit configured to move a main body;
an image acquisition unit configured to acquire an image around the main body; and
a controller configured to perform control to acquire images for respective points while driving, to generate descriptors that respectively correspond to a plurality of feature points extracted from the images, to generate nodes that correspond to the images acquired at the respective points, to be preset to classify the plurality of nodes as a local zone according to a predetermined reference, to be preset to classify a plurality of descriptors in a local zone for each local zone as a plurality of groups and to generate a local label descriptor representing descriptors classified as the same group, and to be preset to classify local label descriptors that are respectively generated in the plurality of local zones, as a plurality of groups and to generate a global label descriptor representing local label descriptors classified as the same group.

21. The mobile robot of claim 20, wherein the controller performs control to acquire a localization image when a jumping case occurs, generates respective localization descriptors corresponding to a plurality of localization feature points extracted from the localization image, matches the label descriptor to each of the localization descriptors, selecting one or more comparison target nodes corresponding to the matched label descriptor, and is preset to select a node estimated as the current position among the one or more comparison target nodes.

22. The mobile robot of claim 20, wherein, when at least one local zone is classified during driving, the controller is preset to generate the local label descriptor of the classified local zone during driving.

23. The mobile robot of claim 20, wherein the controller
i. is preset to start generation of the global label descriptor after all nodes in the global zone are generated when a jumping case does not occur until all nodes in the global zone are generated,
ii. is preset to start generating of the global label descriptor after the jumping case occurs based on a plurality of nodes generated up to a time point when the jumping case occurs when the jumping case occurs before all nodes in the global zone are generated, and
iii is preset to select a node estimated as a current position based on the acquired localization image and the global label descriptor when the jumping case occurs.

24. The mobile robot of claim 23, wherein the controller is preset to start generation of the global label descriptor after at least one node Nx is classified as a local zone Δx and the local label descriptor is generated based a plurality of descriptors in the local zone Δx when the jumping case occurs in a state in which there is at least one node Nx that is not classified as a local zone among the at least one generated node.

* * * * *